US005602616A

United States Patent [19]
Sato et al.

[11] Patent Number: 5,602,616
[45] Date of Patent: Feb. 11, 1997

[54] EXPOSURE CONTROL APPARATUS OF CAMERA

[75] Inventors: Osamu Sato; Satoshi Nakano; Isamu Hirai; Toshiyuki Kitazawa; Takayuki Sensui; Masato Yamamoto; Toshimasa Yamanaka; Takenao Shishikura; Akio Takahashi; Nobuhiko Matsudo, all of Tokyo, Japan

[73] Assignee: Asahi Kogaku Kogyo Kabushiki Kaisha, Tokyo, Japan

[21] Appl. No.: 380,314

[22] Filed: Jan. 30, 1995

Related U.S. Application Data

[63] Continuation of Ser. No. 167,634, Dec. 14, 1993, abandoned, which is a continuation of Ser. No. 868,833, Apr. 15, 1992, abandoned.

[30] Foreign Application Priority Data

| Apr. 15, 1991 | [JP] | Japan | 3-173491 |
| Apr. 15, 1991 | [JP] | Japan | 3-173492 |
| Apr. 15, 1991 | [JP] | Japan | 3-173493 |
| Apr. 15, 1991 | [JP] | Japan | 3-173494 |
| Nov. 28, 1991 | [JP] | Japan | 3-339656 |
| Nov. 28, 1991 | [JP] | Japan | 3-361197 |
| Nov. 28, 1991 | [JP] | Japan | 3-361200 |
| Nov. 28, 1991 | [JP] | Japan | 3-361201 |
| Nov. 28, 1991 | [JP] | Japan | 3-361202 |

[51] Int. Cl.$^6$ .................................................. G03B 7/08
[52] U.S. Cl. .................... 396/238; 396/242; 396/239; 396/245
[58] Field of Search .................................. 354/441, 442, 354/443

[56] References Cited

U.S. PATENT DOCUMENTS

| 3,964,073 | 6/1976 | Kobori et al. |
| 4,174,160 | 11/1979 | Nanba et al. |
| 4,320,944 | 5/1982 | Nakai |
| 4,344,681 | 8/1982 | Yamada |

(List continued on next page.)

FOREIGN PATENT DOCUMENTS

| 3505306 | 9/1985 | Germany |
| 63-184719 | of 0000 | Japan |
| 60-242437 | 12/1985 | Japan |
| 60-242438 | 12/1985 | Japan |

(List continued on next page.)

OTHER PUBLICATIONS

Nikon FA, company brochure.
English language translation of the German Office Action posted Feb. 1, 1994.

Primary Examiner—Russell E. Adams
Attorney, Agent, or Firm—Greenblum & Bernstein P.L.C.

[57] ABSTRACT

A camera having a manually actuable switch for temporarily shifting the camera to an optimum exposure value so that exposure factors, based upon a manually set shutter speed and a manually set aperture value, are replaced by optimum exposure factors based upon a metered brightness of the object to be photographed when the camera is set to a non-program exposure mode. A clear button associated with the camera functions as a manually actuable switch for temporarily shifting an exposure mode of the camera to another exposure mode when the camera is set to a hyper-manual exposure mode. In the hyper-manual exposure mode, a photographer sets exposure factors by actuating a Tv electronic dial and an Av electronic dial. Actuation of the clear button when the camera is set to the hyper-manual exposure mode causes the set exposure factors to be replaced with optimum exposure factors that are automatically calculated in accordance with an object brightness Bv. Thus, operating the clear button (manually actuable switch for temporarily shifting to another exposure mode) results in the mode of the camera being changed from a mode in which exposure factors are manually set by a photographer (via the setting of a shutter speed and an aperture value) to a mode in which optimum exposure factors are set based upon a calculation performed by a processor of the camera.

71 Claims, 61 Drawing Sheets

U.S. PATENT DOCUMENTS

| | | |
|---|---|---|
| 4,653,893 | 3/1987 | Inoue et al. . |
| 4,745,428 | 5/1988 | Miyasaka . |
| 4,779,115 | 10/1988 | Fujino et al. . |
| 4,841,322 | 6/1989 | Kawasaki et al. . |
| 4,945,376 | 7/1990 | Kawasaki et al. . |
| 5,005,033 | 4/1991 | Miyasaka . |
| 5,012,268 | 4/1991 | Hirai . |
| 5,280,319 | 1/1994 | Sato et al. . |
| 5,382,997 | 1/1995 | Sato et al. . |

FOREIGN PATENT DOCUMENTS

| | | |
|---|---|---|
| 60-242439 | 12/1985 | Japan . |
| 60-258523 | 12/1985 | Japan . |
| 60-242436 | 12/1985 | Japan . |
| 61-99130 | 6/1986 | Japan . |
| 62-168123 | 7/1987 | Japan . |
| 62-212635 | 9/1987 | Japan . |
| 2059612 | 4/1981 | United Kingdom . |
| 2069156 | 8/1981 | United Kingdom . |
| 2125977 | 3/1984 | United Kingdom . |

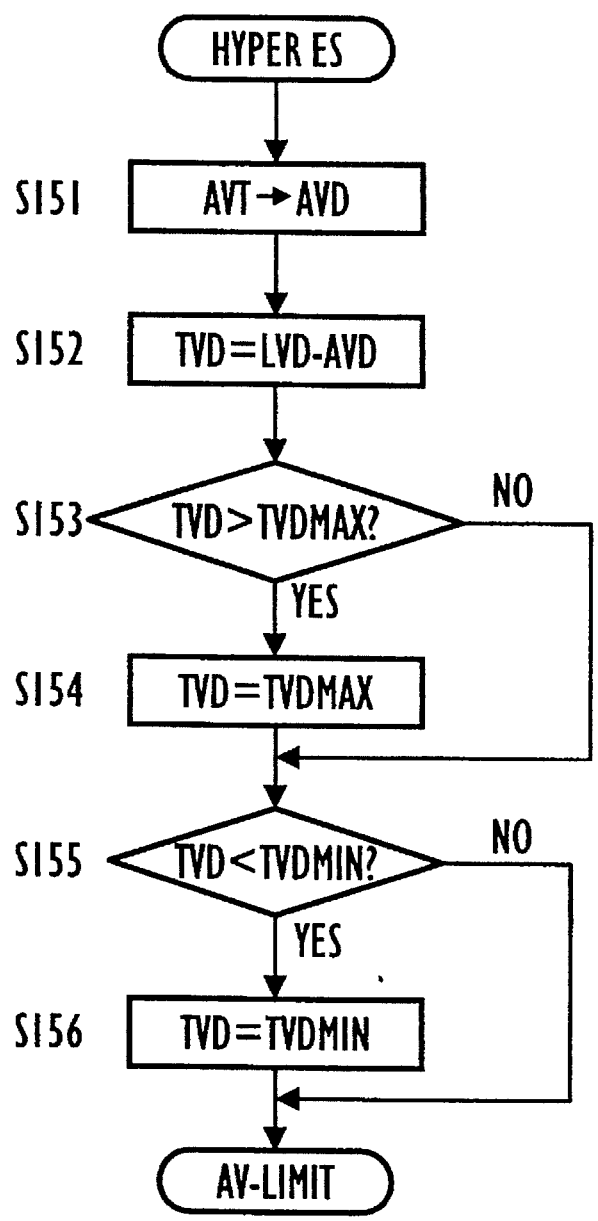

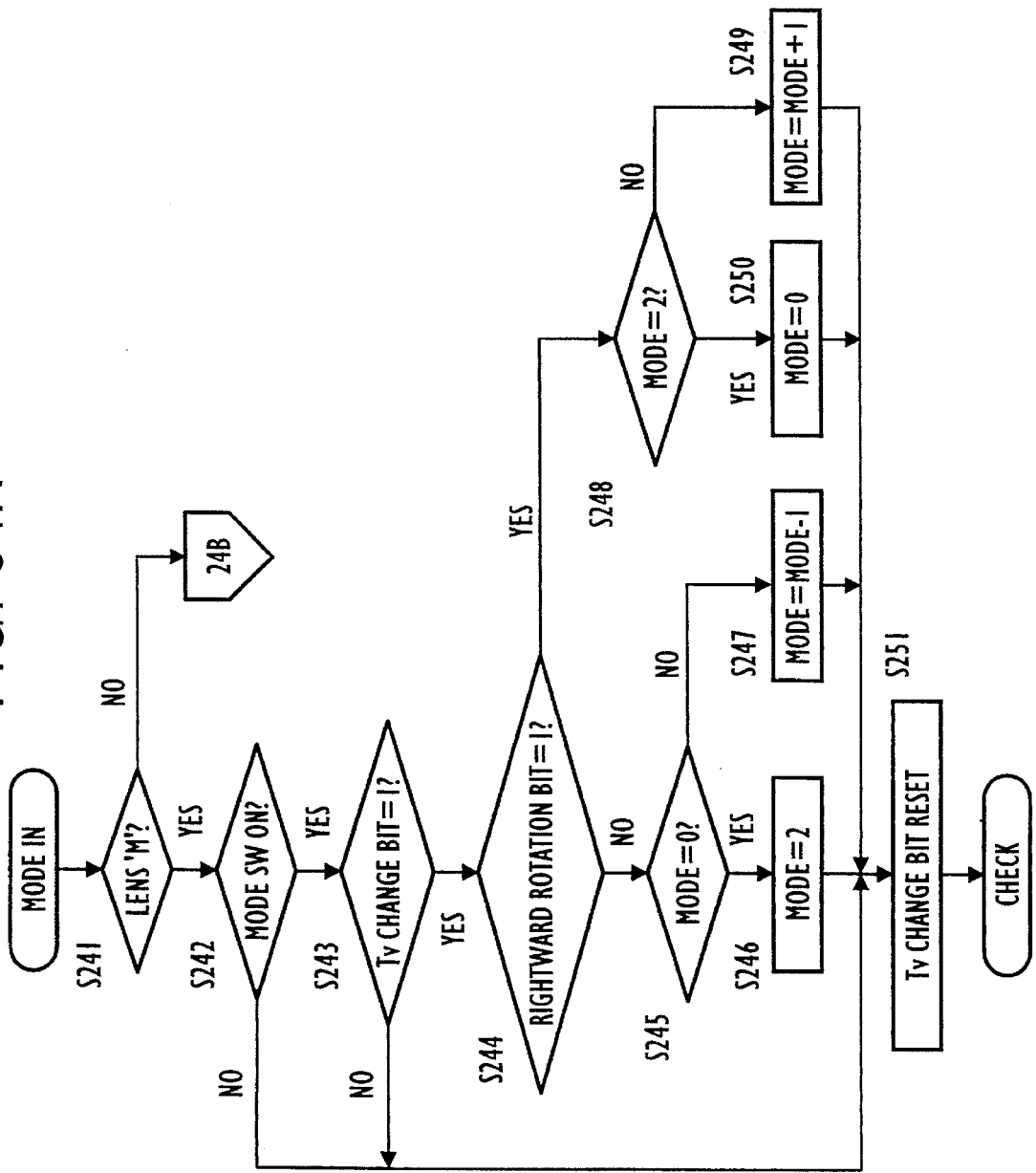

Fig.50

| | control value (TVD) (AVD) | Indicated value (TVT) (AVT) |
|---|---|---|
| IF switch ON | optimum value $\begin{pmatrix} Tv = 8 \frac{1}{8} \\ Av = 5 \frac{7}{8} \end{pmatrix}$ | series value $\begin{pmatrix} Tv = 8 \frac{0}{8} \\ Av = 6 \frac{0}{8} \end{pmatrix}$ |
| IF switch OFF | series value $\begin{pmatrix} Tv = 8 \frac{1}{8} \\ Av = 5 \frac{7}{8} \end{pmatrix}$ | series value $\begin{pmatrix} Tv = 8 \frac{0}{8} \\ Av = 6 \frac{0}{8} \end{pmatrix}$ |
| Av dial 2 steps | series value $\begin{pmatrix} Tv = 8 \frac{0}{8} \\ Av = 5 \frac{0}{8} \end{pmatrix}$ | series value $\begin{pmatrix} Tv = 8 \frac{0}{8} \\ Av = 5 \frac{0}{8} \end{pmatrix}$ |

Fig.51

| | control value (TVD) (AVD) | Indicated value (TVT) (AVT) |
|---|---|---|
| IF switch ON | optimum value $\begin{pmatrix} Tv = 8\frac{1}{8} \\ Av = 5\frac{7}{8} \end{pmatrix}$ | series value $\begin{pmatrix} Tv = 8\frac{0}{8} \\ Av = 6\frac{0}{8} \end{pmatrix}$ |
| IF switch OFF | optimum value $\begin{pmatrix} Tv = 8\frac{1}{8} \\ Av = 5\frac{7}{8} \end{pmatrix}$ | series value $\begin{pmatrix} Tv = 8\frac{0}{8} \\ Av = 6\frac{0}{8} \end{pmatrix}$ |
| Av dial 2 steps | optimum value $\begin{pmatrix} Tv = 8\frac{1}{8} \\ Av = 4\frac{7}{8} \end{pmatrix}$ | series value $\begin{pmatrix} Tv = 8\frac{0}{8} \\ Av = 5\frac{0}{8} \end{pmatrix}$ |

005,602,616

EXPOSURE CONTROL APPARATUS OF CAMERA

This application is a continuation of application Ser. No. 08/167,634, filed Dec. 14, 1993, now abandoned, which is a continuation of application Ser. No. 07/868,833, filed Apr. 15, 1992, now abandoned.

BACKGROUND OF THE INVENTION

1. Field of the Invention

The present invention relates to an exposure control apparatus of a camera having a plurality of exposure modes.

2. Description of Related Art

In a conventional camera having a plurality of exposure modes, a photographer can select a desired exposure by actuating an associated switch or button, etc.

In particular, in a recent camera having modes other than the exposure modes, such as a continuous shot mode, etc., the mode selection is effected by actuating a plurality of switches in combination.

However, ordinary photographers do not frequently use all of the exposure modes. Namely, only a few specific exposure modes are used. Therefore, for ordinary photographers, the need to actuate several switches in combination to select a mode is troublesome and complicated.

Furthermore, in a program exposure mode of a known camera, a shutter speed and a diaphragm value are automatically determined in a certain relationship (combination). Accordingly it is impossible for the photographer to set optional shutter speed and diaphragm values which do not satisfy the predetermined relationship while in the same mode. Furthermore, in a conventional program shifting mode, the shutter speed and the diaphragm value are always modified simultaneously while maintaining a specific relationship therebetween when the switch is actuated in the program exposure mode. Accordingly, it is impossible for the photographer to vary only the diaphragm value or shutter speed while in the program exposure mode.

Therefore, in the known camera, if the photographer wants to vary only one of the shutter speed or diaphragm value while in the program exposure mode, it is necessary for him or her to first shift the program exposure mode to another exposure mode, for example, a shutter speed priority (EE) automatic exposure mode or diaphragm priority (ES) automatic exposure mode. This, however, is troublesome. Furthermore, a desired exposure mode must be troublesomely selected from among many exposure modes in the mode shift operation.

In a manual exposure mode of a known camera, the photographer determines whether or not the exposure value is an optimum value, by observing an exposure meter provided in the field of view of a finder and manually setting the optimum shutter speed and diaphragm value to obtain an optimum exposure value. Namely, the photographer must manually set all of the exposure factors. Accordingly, freedom in the combination of the shutter speed and diaphragm value is increased. This makes it possible for the photographer to create more artistic or technical pictures.

However, it is not easy for ordinary photographers to manually adjust the optimum shutter speed and diaphragm value. In the particular, when there is a frequent change in brightness of an object to be taken, depending on the composition, it is very difficult or next to impossible for the photographer to adjust the shutter speed and the diaphragm value as quickly as the brightness changes. Furthermore it is difficult to adjust the optimum shutter speed and diaphragm value during manual zooming. The difficulty becomes more significant when it is necessary to change the mode, for example, from the manual exposure mode to the automatic exposure mode or vice versa, since the mode shift requires the operation of more than one switch.

A conventional camera has several exposure modes including a manual exposure mode in which both shutter speed and diaphragm value are manually set by a photographer, a shutter priority or diaphragm priority automatic exposure mode in which one of the two exposure factors (i.e., the shutter speed and the diaphragm value) is manually set by the photographer while the other factor is automatically adjusted to be set in accordance with the manually set diaphragm value or shutter speed, brightness of the object to be taken, sensitivity of a film to be used, etc., and a program exposure mode in which both the shutter speed and the diaphragm value are automatically set in accordance with a program diagram. The control of these exposure modes is usually performed by a microcomputer. To this end, the object brightness, the shutter speed, etc., are converted to digital APEX values before calculation.

In the prior art, the accuracy of the APEX values of the the shutter speed and the diaphragm value was generally 4/8 (½) step at the manual setting and ⅛ step at the automatic setting. Namely, the manual setting is less accurate than that of the automatic setting. Furthermore, the shutter speed Tv and the diaphragm value Av which can be manually set are values on an arithmetic progression having a difference of ½, such as 1⁴/₈, 1⁴/₈, 2⁴/₈, . . . , i.e., mixed numbers (which will be referred to as manual series values hereinafter) having an antilogarithm portion represented by 0/2 or ½. On the other hand, the shutter speed Tv and the diaphragm value Av which can be automatically set are values of an arithmetic progression having a difference of ⅛, such as 1⁰/₈, 1⅛, 1²/₈, 1 ⅜, . . . , i.e., mixed numbers (which will be referred to as auto series values or optimum value hereinafter) having an antilogarithm portion represented by 0/8, 1/8 . . . . Consequently, upon manual setting, it is impossible to obtain values other than the manual series values which can be set in the automatic setting, such as 1 1/8, 1 2/8, etc. In addition to the foregoing, the accuracy of the exposure value Ev and the exposure values which can be set at the manual setting are ½ Ev and the manual series values at the manual exposure mode and ⅛ Ev and the auto series values at the automatic exposure mode and the program exposure mode, respectively.

However, if the accuracy of the exposure factors which can be manually set and the series valises thereof are fixed, as mentioned above, it is impossible for the photographer to compose a fine detail on a picture. Conversely, if the accuracy, corresponding to the steps (intervals) between the values which can be manually set, is increased to that of the values which can be automatically set, the number of steps becomes encumbering for the photographer.

SUMMARY OF THE INVENTION

A primary object of the present invention is to provide a camera with a manually actuable switch to temporarily shift the camera to an optimum exposure value, so that exposure factors based upon a manually set shutter speed and a manually set aperture value are replaced by optimum exposure factors that are based upon a metered brightness of the object to be photographed when the camera is set to a non-program exposure mode.

According to the instant invention, a clear button associated with the camera also functions as a manually actuable switch to temporarily shift an exposure mode of the camera to another exposure mode when the camera is set to a hyper-manual exposure mode. In the hyper-manual exposure mode, a photographer sets exposure factors by actuating a Tv electronic dial and an Av electronic dial. Actuation of the clear button when the camera is set to the hypermanual exposure mode causes the set exposure factors to be replaced with optimum exposure factors that are automatically calculated in accordance with an object brightness Bv. That is, operation of the clear button (also referred to as a manually actuable switch for temporarily shifting to another exposure mode) results in the mode of the camera being changed from a mode in which exposure factors are manually set by a photographer (via the setting of a shutter speed and an aperture value) to a mode in which optimum exposure factors are set based upon a calculation performed by a processor of the camera.

According to an object of the present invention, an exposure control apparatus of a camera comprises photometering means for metering a brightness of an object to be photographed, means for manually setting a shutter speed, means for manually setting an aperture value, mode changing means for selecting an exposure mode from among a plurality of exposure modes, including a manual exposure mode in which a shutter speed and an aperture value are manually set by the manually setting shutter speed means and by the manually setting aperture value means, and an automatic exposure mode in which at least one of the shutter speed and the aperture value is automatically set in accordance with an other of the at least one of the shutter speed and the aperture value, and the object brightness. Exposure factor determining means are provided for automatically determining at least one of the shutter speed and the diaphragm value, the exposure factor determining means being actuated when a presently selected mode is the automatic exposure mode. A manually actuable switch for replacing the manually set shutter speed and manually set aperture value with at least one automatically set shutter speed and aperture value when the manually actuable switch is actuated while the presently selected mode is the manual exposure mode is also provided.

According to an advantage of the present invention, an exposure control apparatus comprises photometering means for metering a brightness of an object to be photographed, manual exposure factor setting means for manually setting exposure factors, including a shutter speed and an aperture value, the shutter speed and the aperture value being set with a first APEX value accuracy, automatic exposure factor setting means for automatically setting exposure factors with a second APEX value accuracy in accordance with the object brightness detected by the photometering means, the second APEX value accuracy being higher than the first APEX value accuracy, exposure control means for controlling an exposure operation in accordance with the set exposure factors, exposure factor modifying means for modifying at least one of the shutter speed and the aperture value of the manually set exposure factors to values having the second APEX value accuracy in accordance with the object brightness, and an exposure factor modifying switch for replacing the manually set exposure factors with automatically set exposure factors when a manual exposure mode is selected and the exposure factor modifying switch is actuated.

According to another advantage of the present invention, an exposure control apparatus of a camera comprises means for manually setting a shutter speed, means for manually setting an aperture value, means for selecting a desired exposure mode from among a plurality of automatic exposure modes and a manual exposure mode, the selected automatic exposure mode determining optimum exposure factors based upon at least one of the shutter speed and the aperture value in accordance with an object brightness of an object to be photographed, while the selected manual exposure mode sets the shutter speed and the aperture value in accordance with the manually setting shutter speed means and the manually setting aperture value means, means for modifying the desired exposure mode selected by the selecting means, and means for replacing exposure factors based upon the manually set shutter speed and the manually set aperture value with the optimum exposure factors when the desired exposure mode is switched from the selected automatic exposure mode to the manual exposure mode and the modifying means is actuated.

In another object of the present invention, an exposure controlling apparatus comprises means for manually setting a shutter speed with a first APEX value accuracy, means for manually setting an aperture value with a second APEX value accuracy, a manual exposure factor being defined in accordance with the manually set shutter speed and the manually set aperture value, means for setting a shutter speed and a diaphragm value that define an automatic exposure factor with a predetermined APEX value accuracy based upon a brightness of an object to be photographed, means for modifying the automatically set exposure factor based upon at least one of the manually set shutter speed and the manually set aperture value, and means for switching a manual exposure factor with the automatic exposure factor to effect an exposure operation of the object in which the shutter speed and aperture value are set in accordance with the object brightness when a non-programmed exposure mode is selected and the switching means is actuated.

According to an advantage of the present invention, an exposure control apparatus of a camera comprises photometering means for metering a brightness of an object to be photographed, means for manually setting a shutter speed, means for manually setting an aperture value, mode changing means for selecting an exposure mode from among a plurality of exposure modes, including a manual exposure mode in which a shutter speed and an aperture value are manually set by the manually setting shutter speed means and by the manually setting aperture value means, and an automatic exposure mode in which at least one of the shutter speed and the aperture value is automatically set in accordance with an other of the at least one of the shutter speed and the aperture value, and the object brightness, exposure factor determining means for determining an optimum exposure value in response to the metered object brightness, the exposure factor determining means being actuated when a presently selected mode is the automatic exposure mode, and a manually actuable switch for replacing an exposure factor related to the manually set shutter speed and manually set aperture value with the optimum exposure factor when the manually actuable switch is actuated while the presently selected mode is the manual exposure mode.

The present invention is particularly illustrated in FIGS. 19, 20 and 24 of the drawings.

BRIEF DESCRIPTION OF THE DRAWINGS

The invention will be described below in detail with reference to the accompanying drawings, in which:

FIG. 17 is a flow chart of a hyper-diaphragm priority automatic exposure mode operation, according to another embodiment of the present invention;

FIGS. 34A and 34B are together a flow chart of a mode selecting operation;

FIGS. 50 and 51 are diagrams showing control values and indicated values which are modified by Av and Tv electronic dials in first and second exposure value modifying modes, respectively;

DESCRIPTION OF THE PREFERRED EMBODIMENTS

The invention will be discussed below with reference to the preferred embodiments of the present invention.

Figure 1:
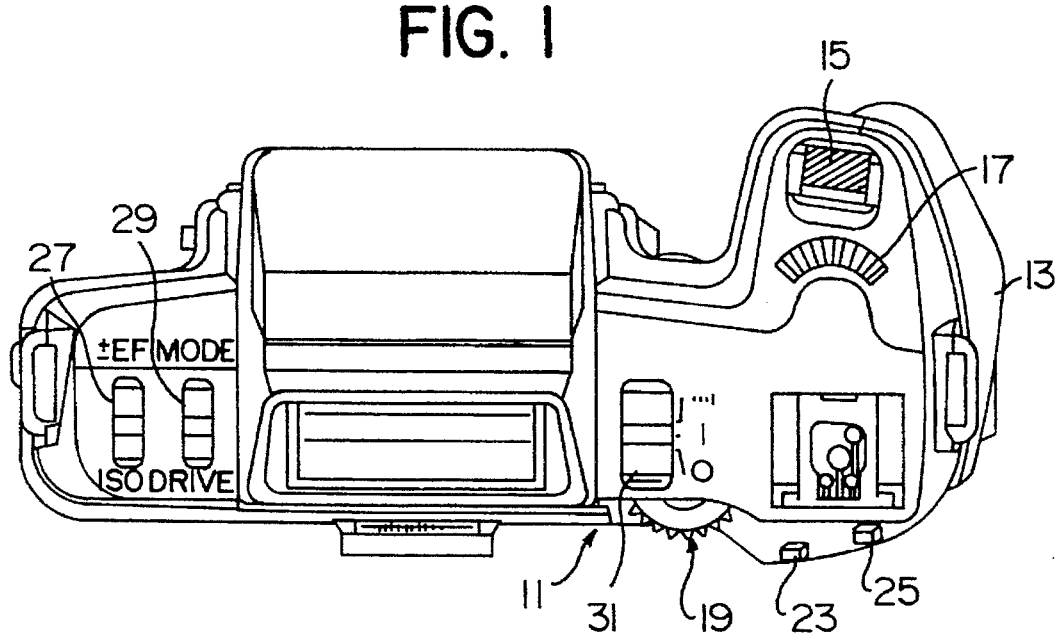
FIG. 1 is a plan view of a single lens reflex camera to which the present invention is applied.
Figure 2:
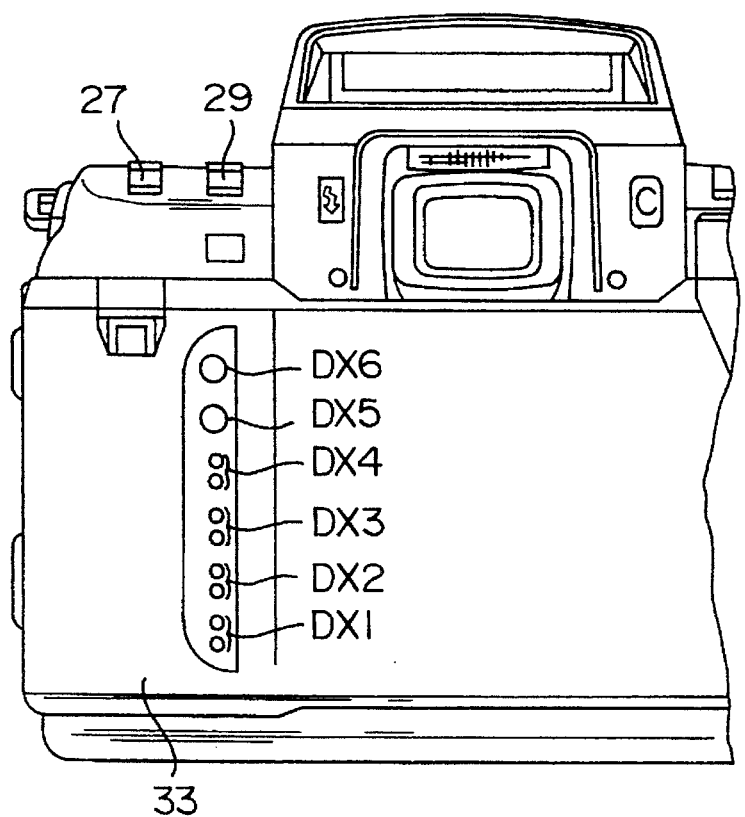
FIGS. 2 and 3 are a back view and a front elevational view of a main part of a single lens reflex camera shown in FIG. 1, respectively.
Figure 3:
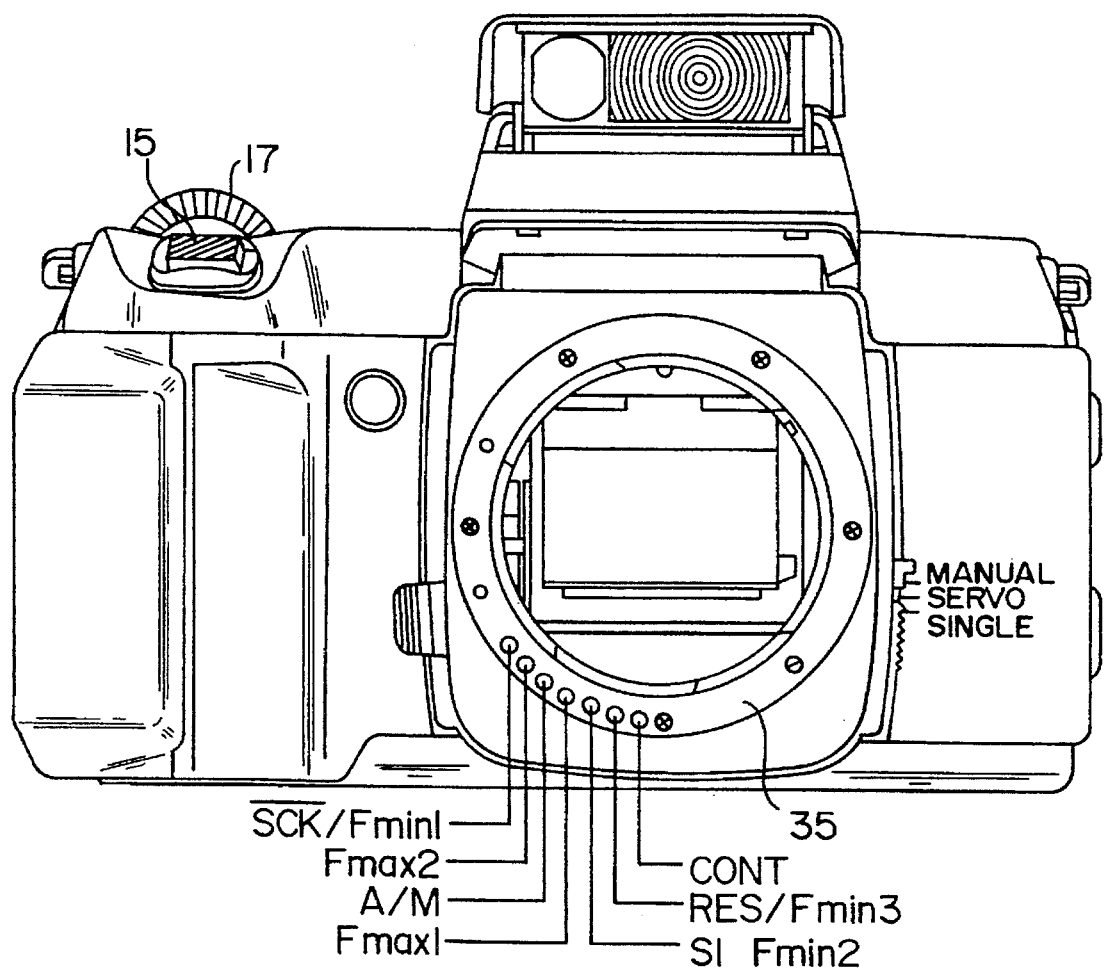

FIGS. 1 and 3 are a plan view and a front elevational view of a single lens reflex camera body having an exposure control apparatus according to the present invention, respectively. FIG. 2 is a back view of a DX code reading portion of the camera body shown in FIGS. 1 and 3.

The camera body 11 has a grip portion 13 which is provided, on a front end (i.e., the object side) of an upper surface thereof, with a shutter button 15. A Tv electronic dial 17 and an Av electronic dial 19 are provided behind the shutter button 15 and on an upper end of the back surface of the grip portion 13, respectively. Both the Tv electronic dial 17 and the Av electronic dial 19 are in the form of rotary dials, which will be discussed below in detail. When the Tv electronic dial 17 and the Av electronic dial 19 are rotated, the shutter speed Tv, the diaphragm value Av and the exposure mode can be changed. The Tv electronic dial 17 and the Av electronic dial 19 constitute part of a first and second manual setting means or a first and second shutter speed and diaphragm value manual setting means, respectively.

A clear button 23 is provided on the upper portion of the back surface of the camera body 11 in the vicinity of the Av electronic dial 19. A hold button 25 is provided on the right side of the clear button 23. The clear button 23 constitutes a part of a clear switch means.

The electronic dials 17 and 19, the clear button 23, and the hold button 25 are arranged so that when a photographer holds the camera body 11 in a normal posture, they can be actuated by his or her thumb or forefinger without having to shift the camera body 11.

A slidable exposure correction/ISO lever 27 and a slidable exposure mode/drive lever 29, both being slidable in opposite directions from a neutral position are located on the top surface of the camera body 11 to the left of a pentagonal prism (not numbered). A main switch 31 is located on the top surface of the camera body 11 to the right of the pentagonal prism and can be moved to three different positions in a slidable manner.

DX pins DX1~DX6 are provided in a patrone receiving chamber 33 of the camera body 11 and come into contact with DX codes, which are printed on the surface of a film patrone, to thereby read the data. In particular, the DX pins DX1~DX6 are brought into contact with the portion of the DX codes which represents an ISO sensitivity Sv, so as to read the data thereof.

A group of mount pins (CONT, RES/Fmin3, SI/Fmin2, Fmax1, A/M, Fmax2, and ¯SCK¯/Fmin1) are provided on a body mount 35 of the camera body 11 to effect, for example, data communication between the camera body 11 and a taking lens. When the body mount 35 is attached to a lens mount of the taking lens, the mount pins of the body mount 35 are electrically connected to the corresponding mount pins of the taking lens, so that the camera body 11 can read lens data, including a minimum F number Fmin (open F number) and a maximum F number, from the taking lens and perform data communication with a control means (ROM or CPU). The control means (ROM or CPU) is provided in the taking lens to read additional lens data, such as focal length data f, or data representing the kind of taking lens attached, etc. Note that a mark or a symbol, etc., with an affix "¯" and a suffix "¯" (e.g., ¯SCK¯, as mentioned above) represent an active low or an inverted value in this specification.

Figure 4:
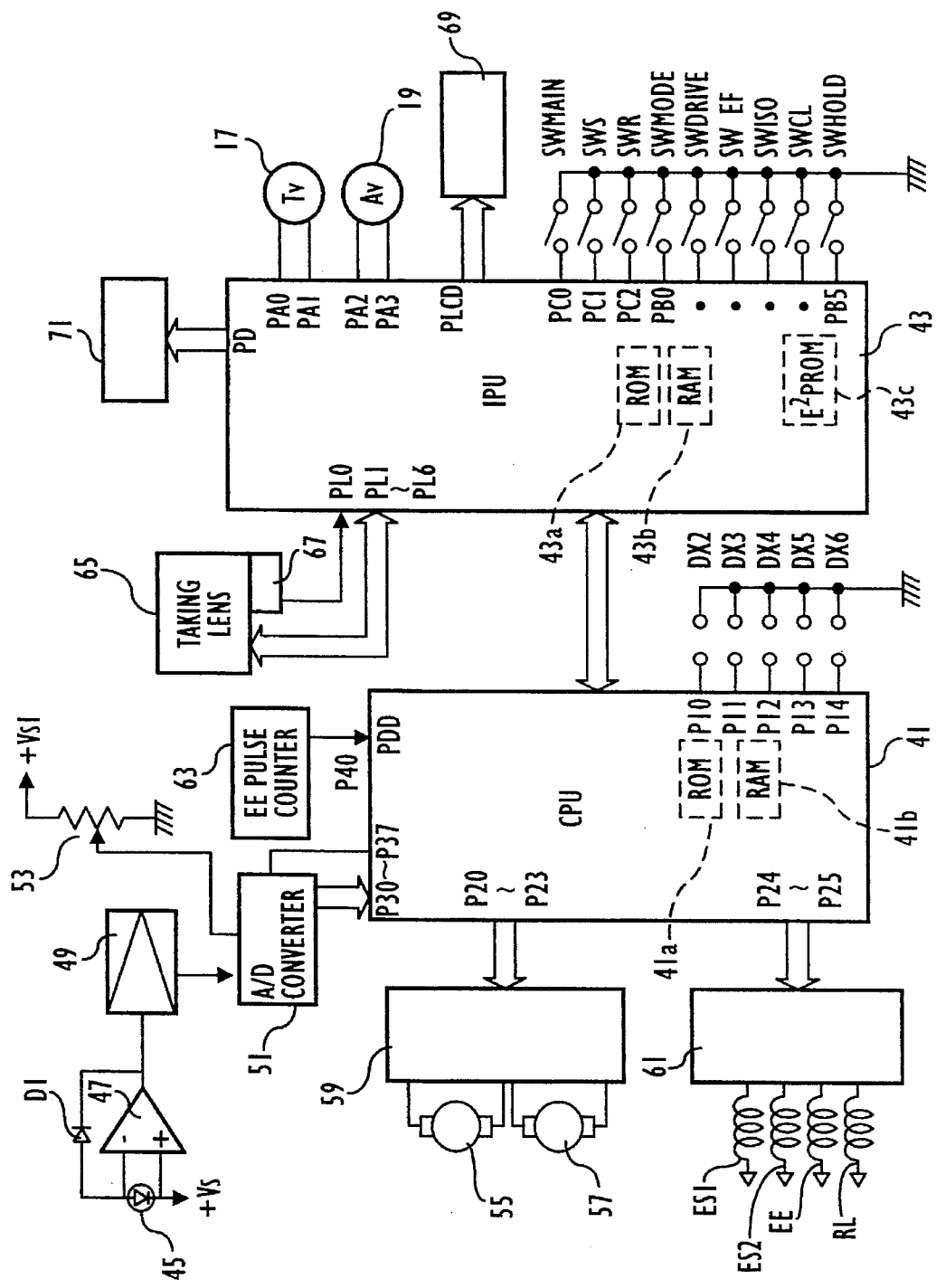
FIG. 4 is a block diagram of a circuit arrangement of a single lens reflex camera shown in FIG. 1.

FIG. 4 shows a circuit arrangement of a control unit of a camera system according to the present invention.

The camera body 11 has CPU 41 and IPU 43 as a control means. The CPU 41 performs the fundamental photographic calculations and control functions, such as the calculation and determination of the exposure factors (i.e., diaphragm value Av and shutter speed Tv), exposure control, calculation of data necessary for automatic focus control, etc. The CPU 41 also functions as a means for compulsively changing the mode, returning an exposure mode, changing a priority exposure factor, compulsively changing an exposure mode within a specific exposure mode, setting a limit value, holding an exposure value, manual shifting, and switching a set mode.

The IPU 43 functions as an input interface of the switches, such as the shutter button 15, the Tv electronic dial 17, the Av electronic dial 19, etc. The IPU 43 also functions as an exposure mode setting means, a means for controlling the indicators, a regulator for turning the power source of the CPU 41 ON and OFF (power holding), and memory means for storing the set data and shutter speed Tv, etc. The IPU 43 has a ROM 43a which stores programs for determining the input of the switch data, indication of the modes, communication with the CPU 41, communication with the taking lens, etc. The IPU 43 also has a RAM 43b which temporarily stores the set modes, the shutter speed Tv, and the diaphragm value, etc. The IPU 43 further has an E²PROM (EEPROM) 43c which holds the number of the film, the ISO sensitivity, etc., even after the camera power source is turned OFF.

The IPU 43 communicates with the taking lens 65 and receives lens data, such as a maximum F number Fmax, the minimum F number Fmin and the focal length f, etc. The IPU 43 communicates with the CPU 41 to transmit and receive the data therebetween to control the photographic operation and the indication of the data.

The output of a light receiving element 45 is logarithmically compressed by an operational amplifier 47 and a diode D1, amplified by an amplifier 49, converted to a digital value (Bv, BV) corresponding to an apex value by an A/D converter 51, and input to the CPU 41 through input ports P30~P37.

The A/D converter 51 operates at a predetermined time to input the level signals of the ports P30~P37 to the CPU 41 which reads object brightness signals and diaphragm value signals set by the taking lens 65 and converts the signals to corresponding apex values. Port P40 is an input switching control port which switches the logarithmically compressed voltages amplified by the amplifier 49 and the diaphragm voltages set by diaphragm volume 53. Diaphragm volume 53 generates a diaphragm voltage which corresponds to the value set by the photographer when rotating the diaphragm ring of a taking lens (not shown) in the manual mode.

Ports P10~P14 of the CPU 41 are connected to the DX pins DX2~DX6. The CPU 41 checks the levels of ports P10~P14 at a predetermined time to read the ISO sensitivity Sv. The CPU 41 then stores the input data including the diaphragm value Av, the object brightness Bv and the ISO sensitivity Sv, etc., in the RAM 41b at predetermined addresses.

A winding motor 55 winds and rewinds the film, and a mirror motor 57 moves a mirror up and down. The operations of the motors 55 and 57 are controlled by the CPU 41 through a motor drive circuit 59.

A release magnet RL releases the mechanical engagement of the shutter to begin the release operation. A shutter mechanism (shutter curtain) thus released from the mechanical engagement by the release magnet. RL is disengageably engaged by a leading curtain magnet ES1 and a trailing curtain magnet ES2, so that the movement of the shutter curtain is controlled thereby. A diaphragm magnet EE stops the stop-down operation of the the taking lens diaphragm. The operations of these magnets are controlled by the CPU 41 through a magnet drive circuit 61.

An EE pulse counter 63 generates EE pulses in association with the stop-down operation, which is in turn associated with the up-down movement of the mirror, subsequent to the shutter release and sends the outputs thereof to the port PDD of the CPU 41. The CPU 41 counts the level change of the port PDD and when the counted number reaches a value corresponding to the set diaphragm value Av, the diaphragm magnet EE is turned ON through the magnet drive circuit 61 to stop the stop-down operation thereby maintaining the diaphragm value Av.

Ports PL0–PL6 of the CPU 43 are connected to the mount pins (A/M, CONT, RES/Fmin3, SI/Fmin2, Fmax1, Fmax2, ⁻SCK⁻/Fmin1) thereby completing an electrical connection to the taking lens 65 (i.e., memory or control means thereof). The IPU 43 communicates with the taking lens 65 through the ports PL0–PL6 to read the lens data including the open F number Fmin, the maximum F number Fmax, the focal length f, etc.

Taking lens 65 has a lens auto/manual selection switch 67 which switches between a manual diaphragm mode (lens-manual mode) and an automatic diaphragm mode (lens-auto mode) in association with a diaphragm ring 12. The lens auto/manual selection switch 67 is connected to an input port PL0 of the IPU 43 through the mount pin A/M. The IPU 43 determines the existence of the manual diaphragm mode or the automatic diaphragm mode in accordance with the level of the port PL0. The "lens-auto mode" mentioned above is an automatic diaphragm mode in which the stop-down mechanism of the camera continues the stop-down operation until the diaphragm value becomes a predetermined value which has been set in the camera body. The "lens manual mode" mentioned above is a manual diaphragm mode in which the diaphragm value is manually set on the taking lens side. The lens-auto mode will also be referred to as a "body set" hereinafter.

Input ports PC0–PC2 and PB0–PB5 of the IPU 43 are connected to a main switch SWMAIN, a photometer switch SWS, a release switch SWR, an exposure mode switch SWMODE, a drive switch SWDRIVE, an exposure correcting switch SW±EF, an ISO sensitivity setting switch SWISO, a clear switch SWCL and a hold switch SWHOLD, respectively.

The main switch SWMAIN is associated with a main switch lever 31. The photometer switch SWS and the release switch SWR are associated with the shutter button 15. The switch SWS remains open until the shutter button 15 is depressed half-way, at which point it is turned ON. The switch SWR is fully turned ON when the shutter button 15 is depressed. The exposure mode switch SWMODE and the drive switch SWDRIVE are associated with the exposure mode/drive lever 29. The exposure correcting switch SW±EF and the ISO sensitivity setting switch SWISO are associated with the exposure/ISO lever 27. The clear switch SWCL and the hold switch SWHOLD remain open until their respective associated buttons, clear button 23 and hold button 25, are effected.

The IPU 43 detects the ON/OFF state of the switches mentioned above, in accordance with the input levels of the input ports PC and PB of the IPU 43 to perform the necessary operations.

A pair of input ports PA0 and PA1 and another pair of input ports PA2 and PA3 of the IPU 43 are connected to the TV electronic dial 17 and the Av electronic dial 19, respectively. The TV electronic dial 17 and the Av electronic dial 19 cash has a click-stop rotation mechanism, which is per se known. For example, a pair of input ports PA0 and PA1 are in a floating state at a click-stop position, when the electronic dials 17 and 19 are rotated in a clockwise or counterclockwise direction, the level of one of the input ports first drops to "L" and then the level of the other drops to level "L", in accordance with the direction of the rotation of the dials. Thereafter, the one input port, the level of which has dropped to level "L" prior to the other, is returned to the floating state prior to the other. Since the order of change in the level of the input ports PA0 and PA1 or PA2 and PA3 depends on the rotation of the dials, the IPU 43 can discriminate the direction of rotation based on the order of change.

A group of ports PLCD of the IPU 43 are connected to an LCD display panel 69 and an indicator 71. The indicator 71 is located in the finder. The LCD panel 69 is controlled by the IPU 43 to indicate various photographic information, such as the exposure mode, the shutter speed Tv, the diaphragm value Av, the number of remaining frames in a roll of film, the drive mode and other data (i.e., ISO sensitivity data, and exposure correcting data±EF, etc.). The indicator 71 (shown in FIG. 41A) within the finder has indicating elements 71a and 71b which indicate the shutter speed Tv, the diaphragm value Av, and an under-exposure, over-exposure or optimum exposure of the film. The indicator 71 also has an indicating element 71c which indicates whether or not the memory is locked.

The main circuit structure of the camera system according to the present invention, will not be discussed. Note that the values of the shutter speed Tv, the diaphragm value Av, and the object brightness Bv in the arithmetic operation discussed below are all those used in calculating the APEX values.

Main Operation of CPU

The main operation of the CPU 41 will be discussed below with reference to the flow chart shown in FIG. 5. The main operation is carried out in accordance with the program stored in the ROM 41a of the CPU 41.

Figure 5:
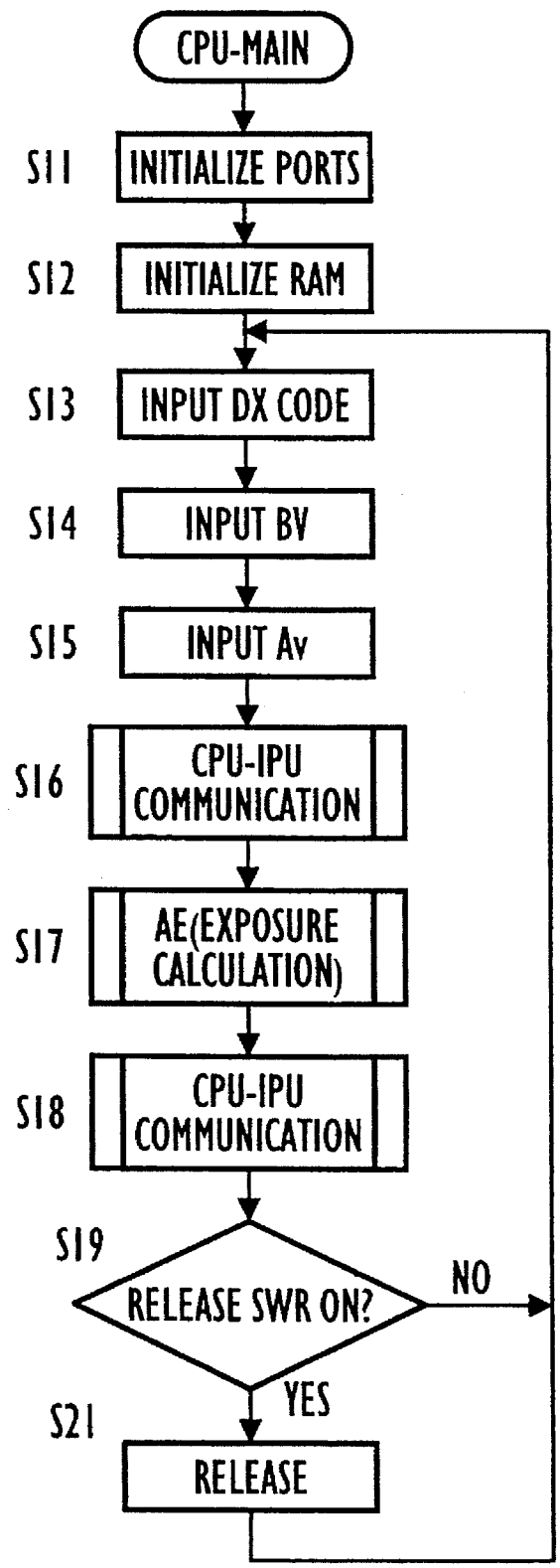
FIG. 5 is a flow chart of a main operation of a CPU, according to the present invention.

When the photometer switch SWS is turned ON after the main switch SWMAIN is turned ON, electrical power is supplied to the CPU 41 and the operation shown in the flow chart of FIG. 5 is performed.

The CPU 41 first initializes all the input ports P at step S11, and then initializes the RAM 41b at step S12. Thereafter, the DX code (ISO sensitivity SV), the object brightness Bv, and the diaphragm value Av set by the diaphragm volume 53 when in the LM mode, are inputted to the CPU (steps S13, S14 and S15).

Thereafter, the CPU 41 communicates with the IPU 43 to receive the necessary data, such as the set photographic exposure mode and the exposure factors, etc., from the IPU 43 (step S16).

Control proceeds to step S18 in which the exposure calculation is effected to obtain optimum exposure factors in accordance with the selected photographic exposure mode, the calculation being based on the ISO sensitivity Sv and the object brightness Bv, etc. Thereafter, the CPU 41 performs data communication with the IPU 43 to send the calculated exposure factors (i.e., shutter speed Tv and diaphragm value Av) to the IPU 43 (step S19).

After the exposure factors are determined, the control proceeds to step S20 where it is determined whether the release switch SWR is turned ON. If the release switch SWR is turned ON, the releasing operation is effected (step S21). If the release switch SWR is turned OFF, the control is returned to step S13. While the power is held (i.e., while the power continues to be supplied), the operations of step S13 to step S20 are repeated.

Data Communication with IPU

Figure 6:
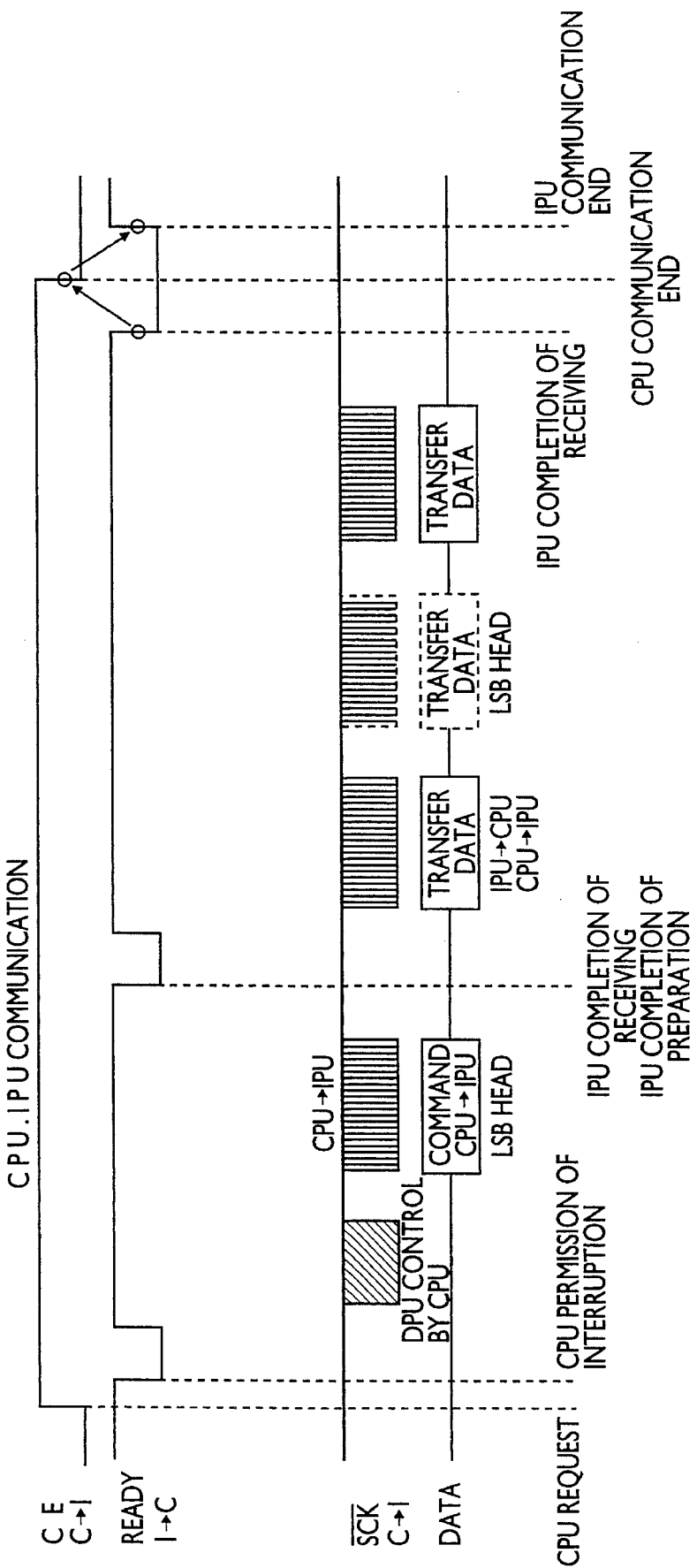
FIG. 6 is a timing chart of a communication operation between a CPU and an IPU, according to the present invention.

The CPU 41 performs data communication with the IPU 43. The data communication will be explained below with reference to FIG. 6 and Table 1 (attached after the last page of the specification). Each of the CPU 41 and IPU 43 has terminals corresponding to CE, READY, ⁻SCK⁻, and DATA, which are connected to each other.

The CPU 41 raises the level of the terminal CE (not shown), so that IPU 43 is ready for communication. When the IPU 43 monitors that the level of the terminal CE has changed from "L" to "H", the level of the terminal READY is dropped and then raised, so that an interruption by the CPU 41 is permitted.

When the CPU 41 monitors the permission to interrupt, a clock signal is outputted to terminal ¯SCK¯ (not shown), and a command is output to the terminal DATA. Upon completion of receipt of the command, the IPU 43 drops and then raises the level of the terminal READY, so that the CPU 41 detects the completion of the receipt. The IPU 43 outputs data corresponding to the received command in accordance with the clock signal sent from the terminal ¯SCK¯ of the CPU 41, or receives data from the CPU 41.

When the communication of the necessary data is completed, the IPU 43 drops the level of the terminal READY. Thereafter, the CPU 41 drops the level of the terminal CE, so that the IPU 43 detects that the data communication with the CPU is completed. When the IPU 43 monitors the level drop of the terminal CE, the IPU 43 raises the level of the terminal READY to finish the data communication.

AE Sub-routine

Figure 7:
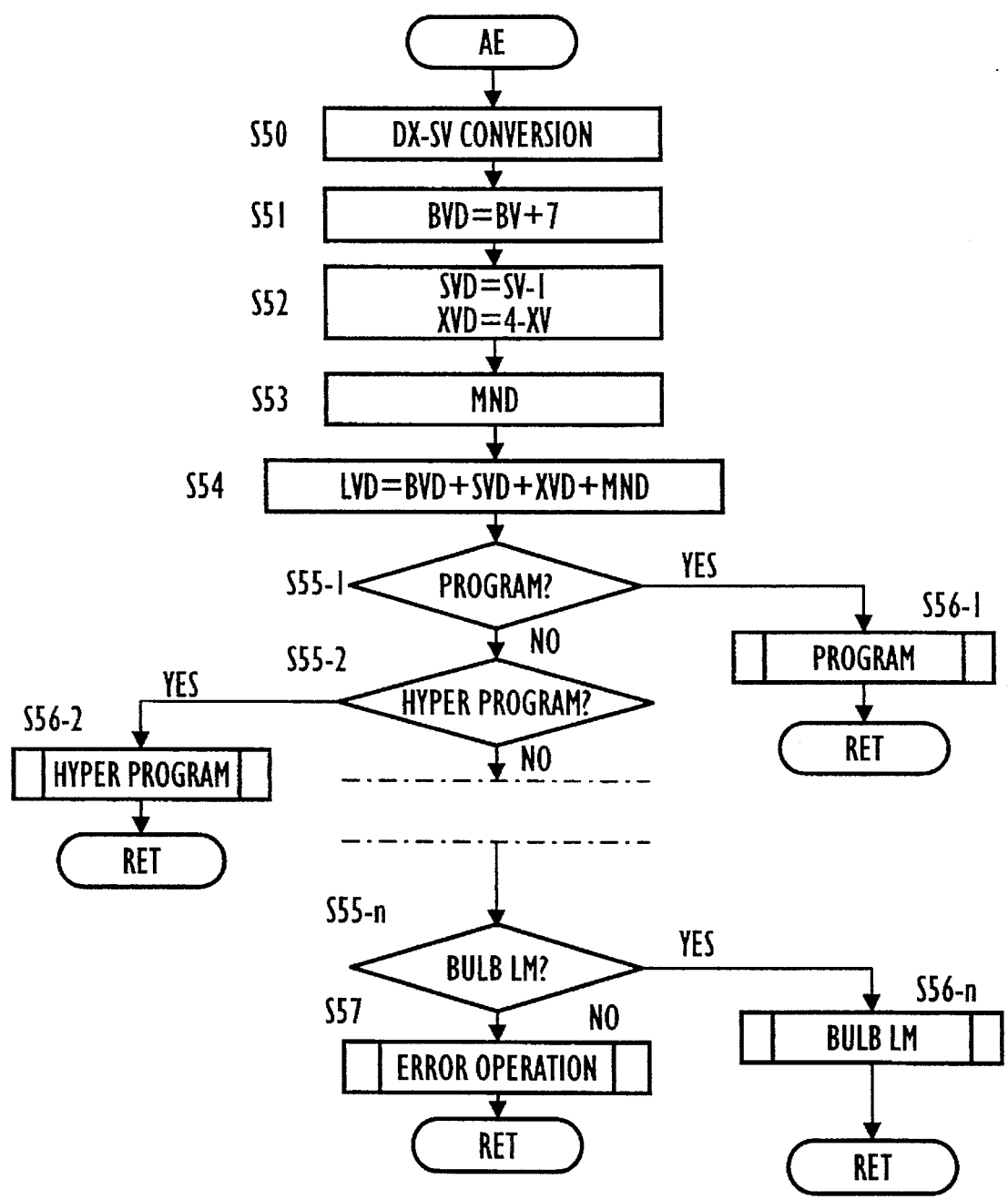
FIG. 7 is a flow chart of an automatic exposure mode operation, according to the present invention.

The sub-routine for calculating the exposure (automatic exposure mode) at step S18 will be discussed below with reference to the flow chart shown in FIG. 7.

In this AE process, the DX codes representing the ISO sensitivity are converted to APEX values (film sensitivity Sv) at step S50. The DX codes of the ISO sensitivity consist of 5 bit signals and are read by the five DX pins (5 bits) DX4, DX3, DX2, DX5 and DX6 which come into contact with the codes in the illustrated embodiment. The upper three bits (DX4, DX3 and DX2) constitute an integer and the lower two bits (DX5 and DX6) a decimal. For example, if the decimal is "01" or "11", the APEX value is 0/3, if the decimal is "10", the APEX value is 1/3, and if the decimal is "00", the APEX value is 2/3. The decimal thus converted to the APEX value is added to the integer. For example, the DX code of ISO 100 is represented by Sv=5, since the integer "101" is converted to an APEX value "5" and the decimal "01" is converted to an APEX value "0".

Thereafter, the object brightness Bv is converted to a calculating object brightness BVD suitable for calculation by using the following equation: BVD=Bv +7, (step S51). Thereafter, the film sensitivity Sv and the exposure correcting value Xv are converted to a calculating sensitivity SVD and a calculating exposure correcting value XVD suitable for calculation by using the following equations, respectively (step S52):

$$SVD=Sv-1; XVD=4-Xv$$

The above-mentioned operations are effected not only to prevent the values of the calculating exposure factors BVD, SVD, XVD from being negative, but also to unify the accuracy or precision of the exposure factors to be a 1/8 Ev step. Consequently, the APEX calculation (i.e., addition and subtraction) can be easily effected without considering the calculation accuracy. Note that since the precision of Sv and Xv is within 1/3 Ev, it is in theory impossible to convert them to values of a 1/8 Ev step. To this end, Sv and Xv are rounded to approximately 1/3 Ev and 2/3 Ev to 3/8 Ev and 5/8 Ev, respectively.

Thereafter, the brightness correction value MND, that depends on a change of the open F number, is calculated at step S53. The brightness correction value MND is adapted to correct the object brightness Bv so as to maintain the exposure on a film plane at a constant value, regardless of, for example, a change in the open F number (i.e., change in brightness of the lens) during zooming and is a value peculiar to the taking lens. The brightness correction value MND is inputted from the taking lens by communication of the IPU 43 with the taking lens (IPU-lens communication), which will be discussed hereinafter, and is transferred from the IPU 43 to the CPU 41 through the CPU-IPU communication at step S16.

Thereafter, the calculating exposure value LVD is calculated, based on the calculating object brightness BVD, the calculating sensitivity SVD, the calculating exposure correcting value XVD, and the brightness correcting value MND by using the following formula;

$$LVD=BVD+SVD+XVD+MND$$

The CPU 41 detects the selected exposure mode and calls the exposure factor calculating sub-routine corresponding to the selected exposure mode (steps S55-1~S55-n, S56-1~S56-n). The diaphragm value Av and the shutter speed Tv are then calculated in accordance with the algorithm of the selected exposure mode. Thereafter, the control is returned. If an incorrect exposure mode is set, an error operation as described below is carried out (step S57).

Error Operation

Figure 8:
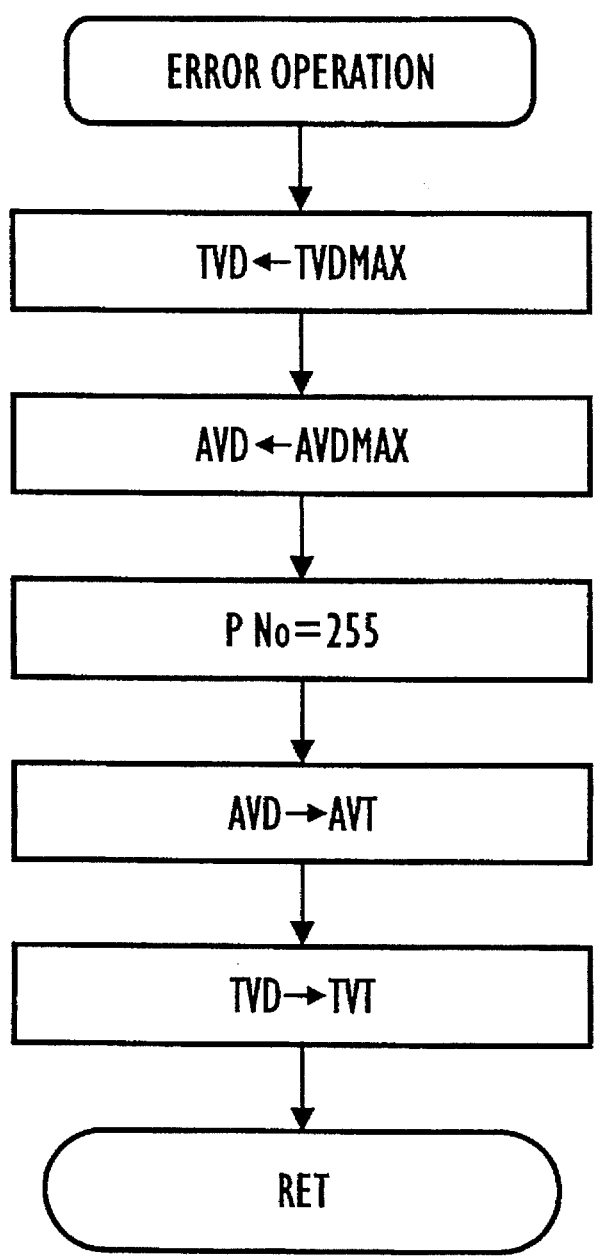
FIG. 8 is a flow chart of an error correcting operation, according to the present invention.

In the error operation at step S57, the calculating shutter speed TVD and the calculating diaphragm value AVD are replaced with a calculating maximum shutter speed TVDMAX and a calculating maximum diaphragm value AVDMAX, respectively, and the number PN (or Pno) of EE pulses is set at the maximum value, i.e., 225. Thereafter, the calculating shutter speed TVD (the calculating maximum shutter speed TVDMAX ) and the calculating diaphragm value AVD (i.e., the calculating maximum diaphragm value AVDMAX) are converted to values suitable for transmission to the IPU a processes labeled TVDT (TVD→TVT) and AVDT (AVD→AVT), as explained in detail hereinafter (see FIG. 8). Thereafter, the control is returned.

It is possible to replace one or both of the calculating shutter speed TVD and the calculating diaphragm value AVD with a calculating minimum shutter speed TVDMIN and a calculating minimum diaphragm value AVDMIN, in place of the calculating maximum shutter speed TVDMAX and the calculating maximum diaphragm value AVDMAX, respectively.

Exposure Calculating Sub-routine

In the illustrated embodiment, the exposure modes include a program automatic exposure mode in which the shutter speed and the diaphragm value are automatically set in accordance with the object brightness, a shutter speed priority (EE LA) automatic exposure mode (lens-auto mode) in which the diaphragm value is automatically set in accordance with the manually set shutter speed and object brightness, a diaphragm priority (ES LA) automatic exposure mode in which the shutter speed is automatically set in accordance with the manually set diaphragm value and object brightness, a manual exposure (Manual LA) and bulb exposure (Bulb LA) modes, and a diaphragm priority (ES LA) automatic exposure mode (lens-manual mode).

Furthermore, in the illustrated embodiment, there is a limited program (Program LIMT) automatic exposure mode, a hyper-program (Hyper Program) automatic exposure mode used as a specific program exposure mode, a hyper shutter priority (Hyper EE) automatic exposure mode ( lens-auto mode), and a hyper diaphragm priority (Hyper ES) automatic exposure mode.

The following discussion will be directed to an exposure factor calculation process in the above-mentioned exposure modes with reference to FIGS. 9 through 23.

Hyper Program

The hyper program exposure mode referred to herein is a mode in which the program mode, the EE automatic exposure mode and the ES automatic exposure mode are changed by optionally selecting the hyper program exposure mode, the hyper EE automatic exposure mode, or the hyper ES automatic exposure mode. The operations of the Hyper-program modes are identical to those of the ordinary program mode, except that the exposure mode can be varied between the above three modes by actuating the electronic dials 17, 19 or the clear button 23.

Figure 9:
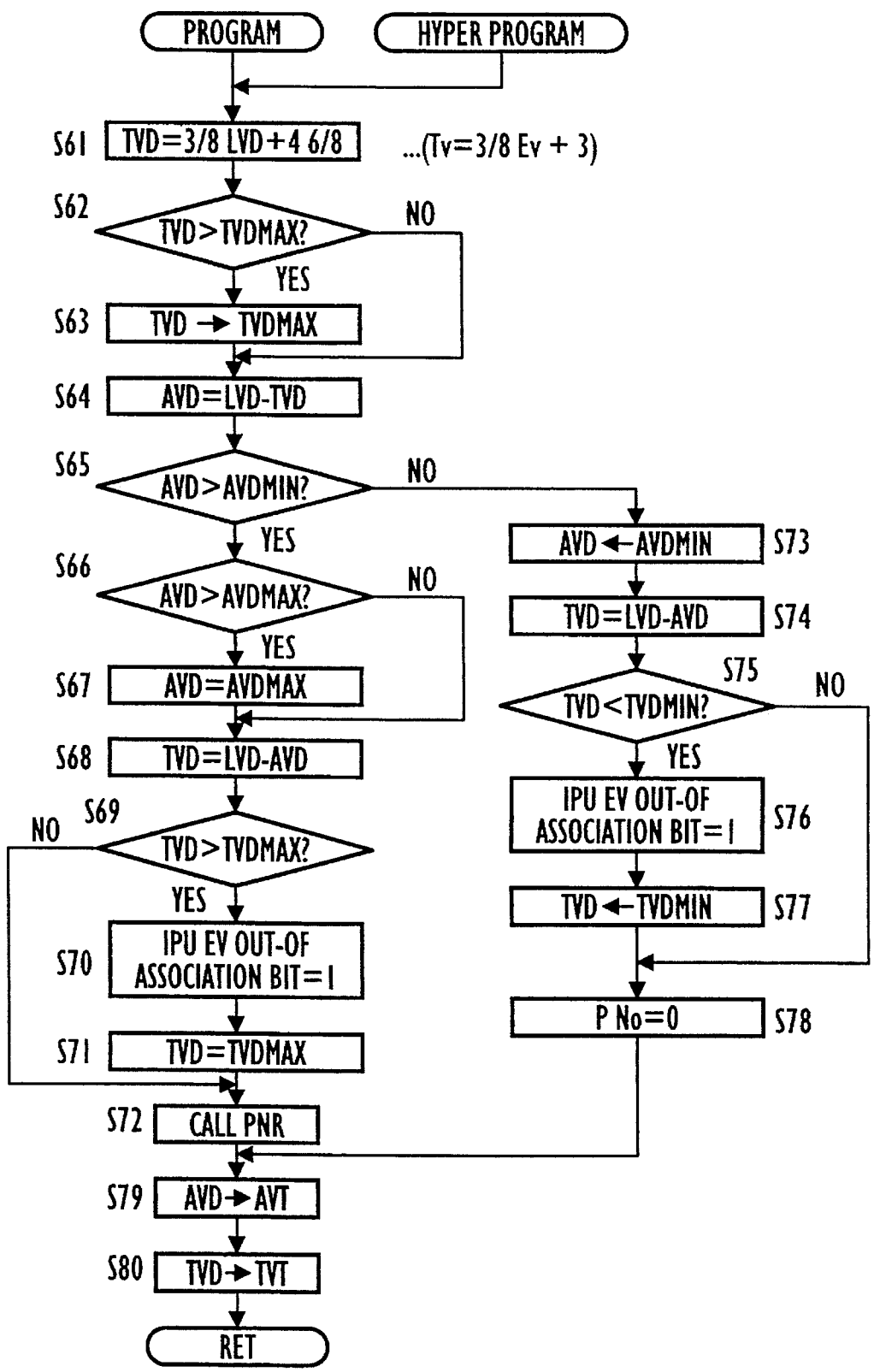
FIG. 9 is a flow chart of a hyper-program exposure mode operation according to the present invention.
Figure 10:
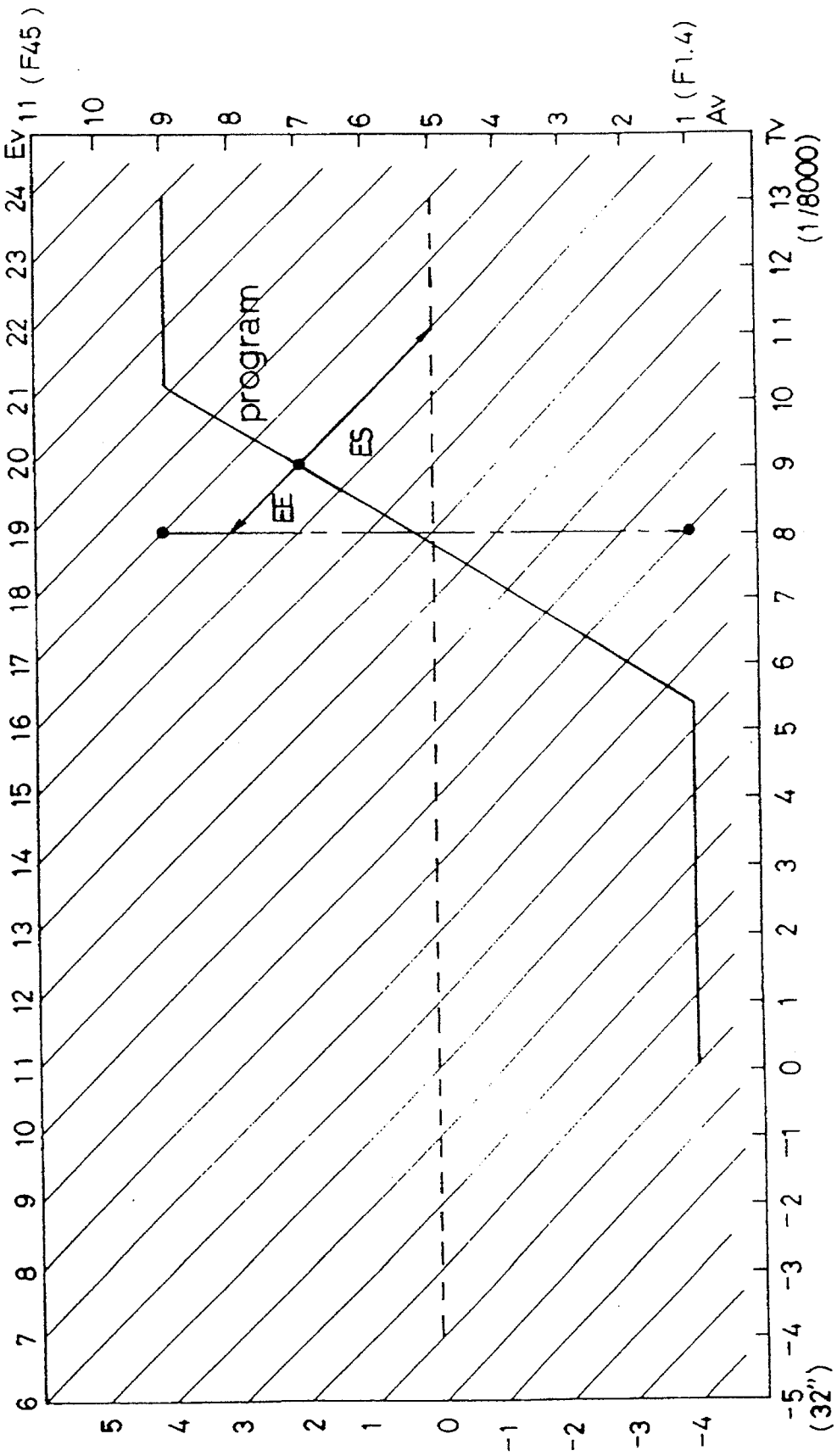
FIG. 10 is a diagram of a hyper-program exposure mode shown in FIG. 9.

FIG. 9 shows a flow chart involving the hyper program exposure mode and the ordinary program exposure mode and FIG. 10 shows a program diagram thereof.

First, the relationship between the calculating TVD corresponding to the Tv value and the calculating AVD corresponding to the Av value is obtained by the following formula, in accordance with the formula at step S54:

$$\begin{aligned}
LVD &= BVD + SVD + XVD + MND \\
&= (Bv+7) + (Sv-1) + (4-Xv) + MND \\
&= (Bv + Sv - Xv + MND) + 10 \\
&= Ev + 10 \\
&= Tv + Av + 10 \\
&= (Tv + 5\ 4/8) + (Av + 4\ 4/8) \\
&= TVD + AVD
\end{aligned}$$

Here, $$Ev = Bv + Sv - Xv + MND$$

$$TVD = Tv + 5\tfrac{4}{8} \ldots \quad (1)$$

$$AVD = Av + 4\tfrac{4}{8} \ldots \quad (2)$$

From the equations (1) and (2), the relationships between Tv and TVD and between Av and AVD are obtained. The respective constants added to Tv and Av in equations (1) and (2) are not limited to 5 4/8 and 4 4/8 and can be any two values whose sum is 10. The values of 5 4/8 and 4 4/8 are selected to be approximate to each other in the embodiment. Correspondences between Tv and TVD and between Av and AVD thus obtained are shown in Table 2 and Table 3 (attached after the last page of the specification), by way of example.

In the program exposure mode, the optimum calculating shutter speed TVD is obtained by the following equation:

$$TVD = \tfrac{3}{8} LVD + 4\tfrac{6}{8}$$

The calculating exposure value LVD is obtained at step S54. Consequently, the optimum calculating diaphragm value AVD is obtained from the result of this calculation (steps S61~S78).

The equation mentioned above is obtained from the basic formula of the program line (Tv=⅗ Ev+3), in which TVD= Tv+5 4/8 and AVD=Av+4 4/8. When the optimum calculating shutter speed TVD and the optimum calculating diaphragm value are within the shutter capability range of the camera body 11 (range between the calculating maximum shutter speed TVDMAX and the calculating minimum shutter speed TVDMIN), and the diaphragm capability range of the taking lens (range between the calculating maximum diaphragm value AVDMAX and the calculating minimum diaphragm value AVDMIN), the optimum calculating shutter speed and the optimum calculating diaphragm value are maintained, and the EE pulse number PN, used to maintain the diaphragm value Av of the diaphragm of the taking lens during the releasing operation, is calculated (steps S62, S64~S66, S68, S69, S72). The maximum shutter speed TVDMAX and the minimum diaphragm value AVDMIN referred to are the maximum shutter speed and the open F number, respectively.

The maximum and minimum shutter speeds TVDMAX and TVDMIN are peculiar to the camera body 11 and are TVDMAX=13 (⅛₀₀₀ sec.) and TVDMIN=−5 (30 sec.) in the illustrated embodiment, respectively. Consequently, as TVD=TV+5 4/8, the calculating maximum and minimum shutter speed TVDMAX and TVDMIN are represented respectively by;

$$TVDMAX = TVMAX + 5\tfrac{4}{8} = 18\tfrac{4}{8}$$

$$TVDMIN = TVMIN + 5\tfrac{4}{8} = 0\tfrac{4}{8}$$

The calculating maximum and minimum shutter speed TVDMAX and TVDMIN are stored in advance in the internal ROM 41a of the CPU 41 and are memorized at predetermined addresses of the RAM 41b during the operations.

Using the inherent maximum and minimum diaphragm values AVMAX and AVMIN and the formula (AVD=AV+4 4/8), the calculating maximum and minimum diaphragm values AVDMAX and AVDMIN are represented respectively by;

$$AVDMAX = AVMAX + 4\tfrac{4}{8}$$

$$AVDMIN = AVMIN + 4\tfrac{4}{8}$$

The maximum and minimum diaphragm values AVMAX and AVMIN are inputted by the communication with the taking lens at step S35 and the calculating maximum and minimum diaphragm values AVDMAX and AVDMIN are stored in the internal RAM 41b of the CPU 41 at predetermined addresses thereof.

If the object is too bright or dark to calculate the optimum exposure factors using the above-mentioned program line, the following operations are carried out:

When the object is too bright:

If the calculating shutter speed TVD is larger than the calculating maximum shutter speed TVDMAX, the optimum calculating diaphragm value AVD is calculated after the calculating shutter speed TVD is replaced with the calculating maximum shutter speed TVDMAX (steps S62~S64).

If the optimum calculating diaphragm value AVD thus obtained is within the diaphragm capability range, the EE pulse number PN is obtained in accordance therewith (steps S65, S66, S68 and S72).

If the optimum calculating diaphragm value AVD is larger than the calculating maximum diaphragm value AVDMAX, the optimum calculating shutter speed TVD is recalculated after the optimum calculating diaphragm value AVD is replaced with the calculating maximum diaphragm value AVDMAX (steps S65~S68). If the recalculated calculating shutter speed TVD is larger than the calculating maximum shutter speed TVDMAX, it is out of the range in which optimum exposure can be obtained by any combination of the calculating shutter speed TVD and the calculating diaphragm value AVD. Consequently, an Ev out-of association bit is set at "1" to indicate that the calculating shutter speed is out of association (i.e., the allowable range), and the calculating shutter speed TVD is then replaced with the calculating maximum shutter speed TVDMAX to calculate the EE pulse number PN (steps S69~S72). If the recalculated calculating shutter speed TVD is within the shutter capability range, since optimum exposure can be effected, the control skips steps S70 and S71 and performs the calculation of the EE pulse member PN in accordance with the optimum calculating diaphragm value AVD (steps S69 and 72).

When the EV out-of association bit is set at "1", the shutter speed (maximum shutter speed TVMAX) and the diaphragm (maximum diaphragm value AVMAX) is indicated in the LCD display panel 69 in a blinking manner.

When the object is too dark:

If the optimum calculating diaphragm value AVD is smaller than the calculating minimum diaphragm value AVDMIN, the optimum calculating shutter speed TVD is recalculated after the calculating diaphragm value AVD is replaced with the calculating minimum diaphragm value AVDMIN. If the recalculated calculating shutter speed TVD is within the shutter capability range, the value is held and the EE pulse number PN is set at 0, as the diaphragm is an open F number (steps S73~S75, S78).

If the optimum calculating shutter speed TVD is smaller than the calculating minimum shutter speed TVDMIN, under-exposure conditions exist. Accordingly, the Ev out-of association bit is set at "1" and the calculating shutter speed TVD is replaced with the calculating minimum shutter speed TVDMIN. Thereafter, the EE pulse number is set at 0 (steps S75~S78). TVD and AVD are stored at predetermined addresses of the RAM 41$b$ and are utilized to control the shutter speed and diaphragm value when releasing.

When the above-mentioned operations are completed, the calculating diaphragm value AVD and the calculating shutter speed TVD are replaced with a transferring diaphragm value AVT and a transferring shutter speed TVT, respectively (steps S79 and S80). The relationships between the calculating diaphragm value AVD and the transferring diaphragm value AVT and between the calculating shutter speed TVD and the transferring shutter speed TVT are as follows;

$$TVT = TVD + 10\%$$

$$AVT = AVD$$

Although TVT and AVT are not rounded in the above equations, TVT and AVT are rounded in the actual operation.

The transferring shutter speed TVT and the transferring diaphragm value AVT are data of a ½ Ev step. Namely, when this data is transferred from the CPU 41 to IPU 43, the calculated values of a ⅛ Ev step are rounded to ½ Ev. This is because the data is used only to indicate the necessary information in the IPU 43, so that accuracy greater than a ½ Ev step is unnecessary. Tables 2 and 3 mentioned above show indicating sections corresponding to the values of TVD and AVD by way of example.

Thus, the operation of the program exposure mode is finished and the program line (diagram) shown as a solid line in FIG. 10 is obtained.

Limited Program Exposure Mode

Figure 11:
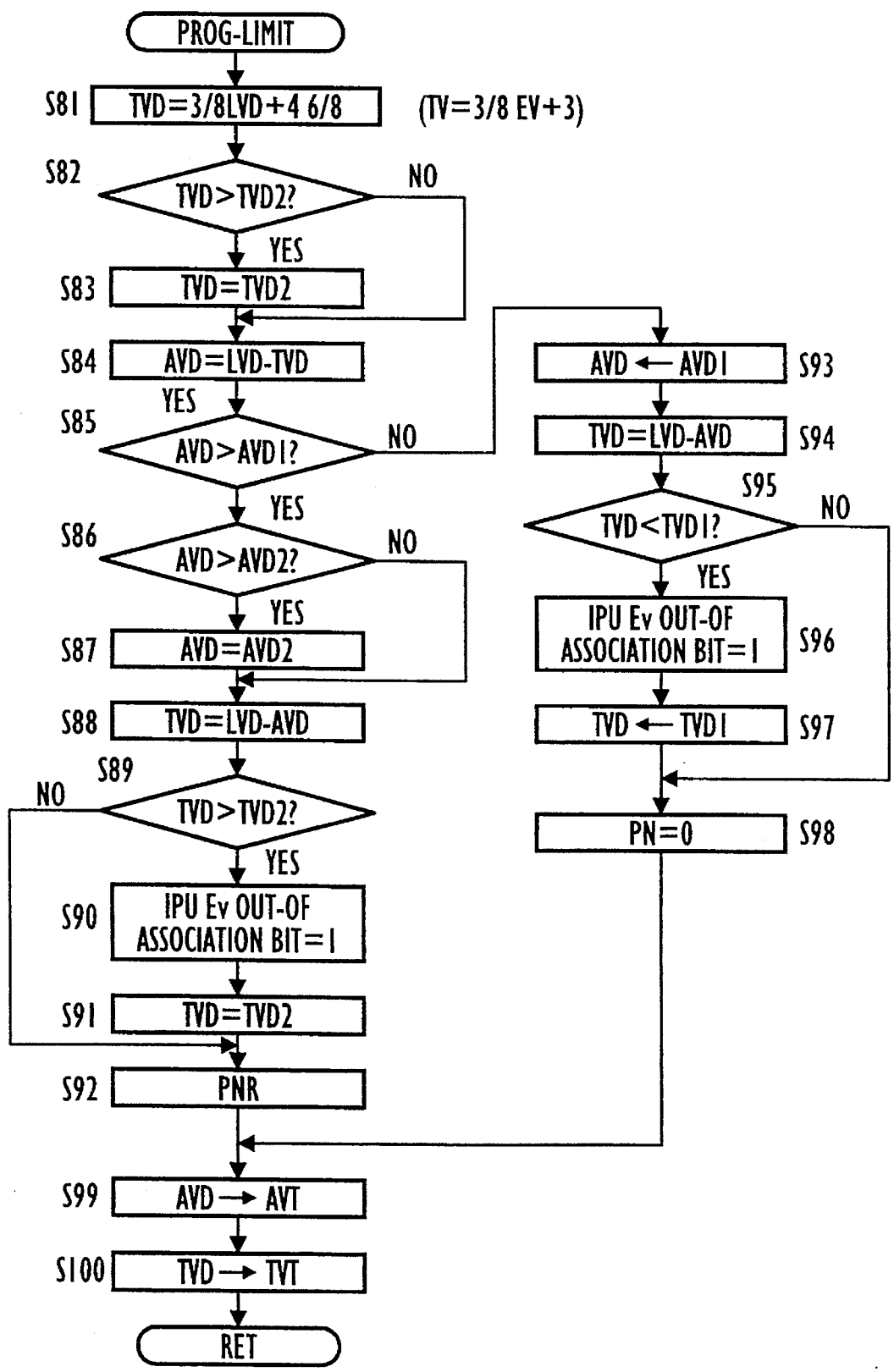
FIG. 11 is a flow chart of a limited program exposure mode operation, according to the present invention.
Figure 12:
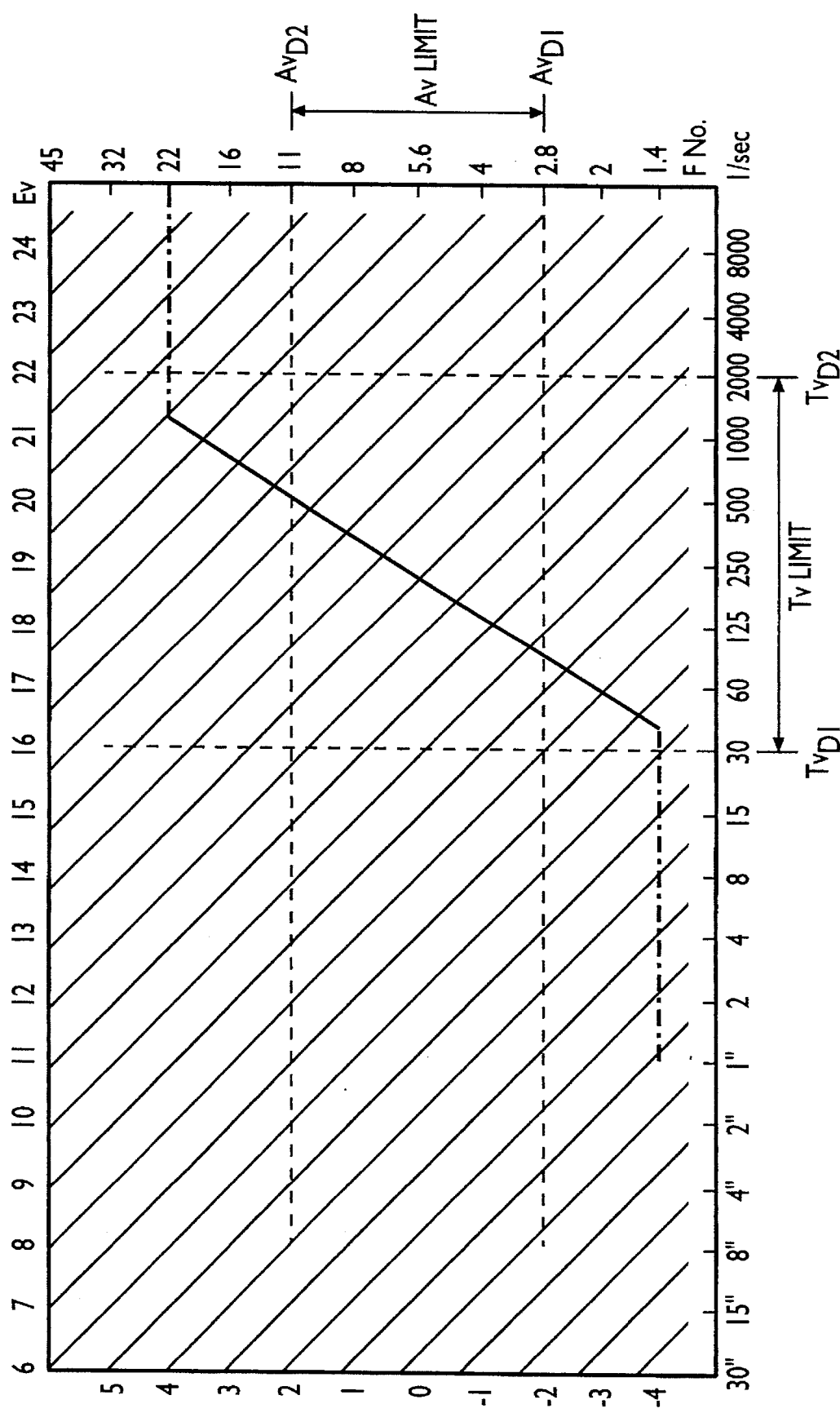
FIG. 12 is a diagram of a limited program exposure mode shown in FIG. 11.

FIG. 11 shows a sub-routine of the limited program exposure (automatic exposure) mode in which a photographer can set the calculating minimum and maximum shutter speeds TVD1 and TVD2 and the calculating minimum and maximum diaphragm values AVD1 and AVD2, respectively. The operational flow in this sub-routine is similar to that of the sub-routine of the program exposure mode except for the following points. Namely, in the sub-routine shown in FIG. 11, the calculating minimum and maximum diaphragm values AVDMIN and AVDMAX are replaced with the set minimum and maximum diaphragm values AVD1 and AVD2, respectively (steps S85, S93, S86, S87), and the calculating minimum and maximum shutter speeds TVDMIN and TVDMAX are replaced with the set minimum and maximum shutter speeds TVD1 and TVD2, respectively (steps S95, S97, S82, S83, S89, S91). The program diagram of the limited program exposure mode is shown in FIG. 12.

Figure 39A:
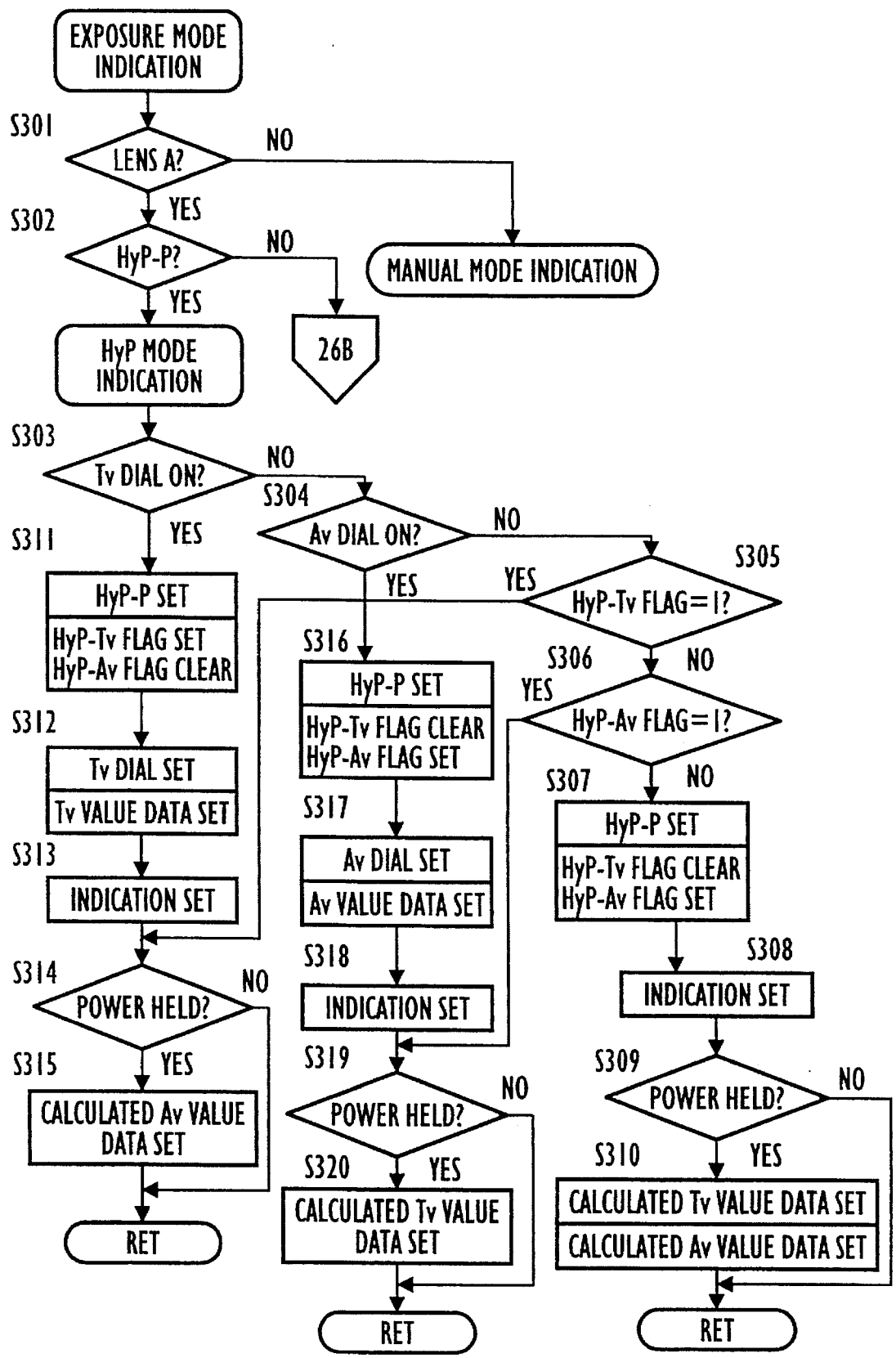
FIGS. 39A, 39B, 39C, 39D, 39E, 39F, 39G and 39H are flow charts of an indication operation, according to the present invention.
Figure 39B:
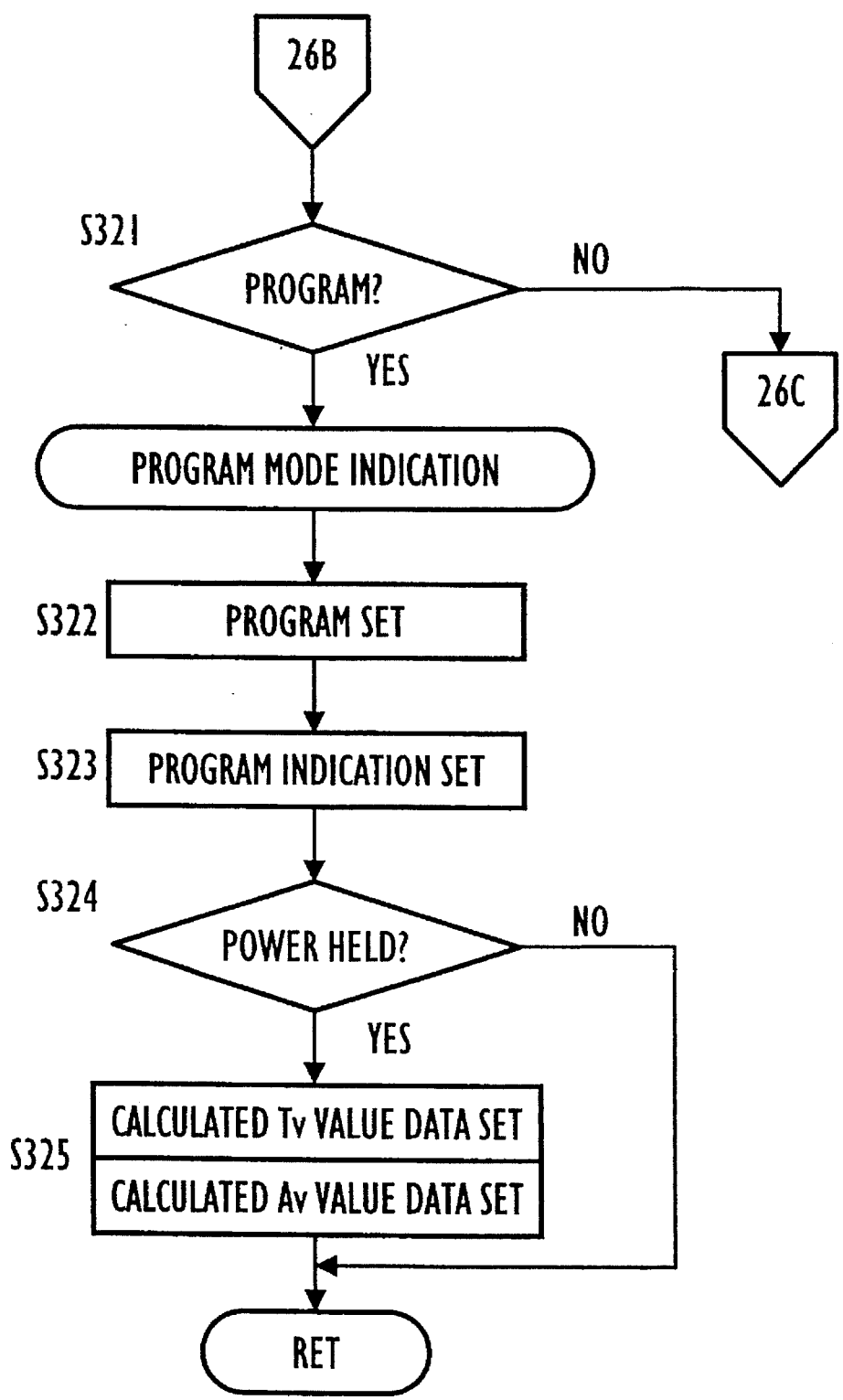
Figure 39C:
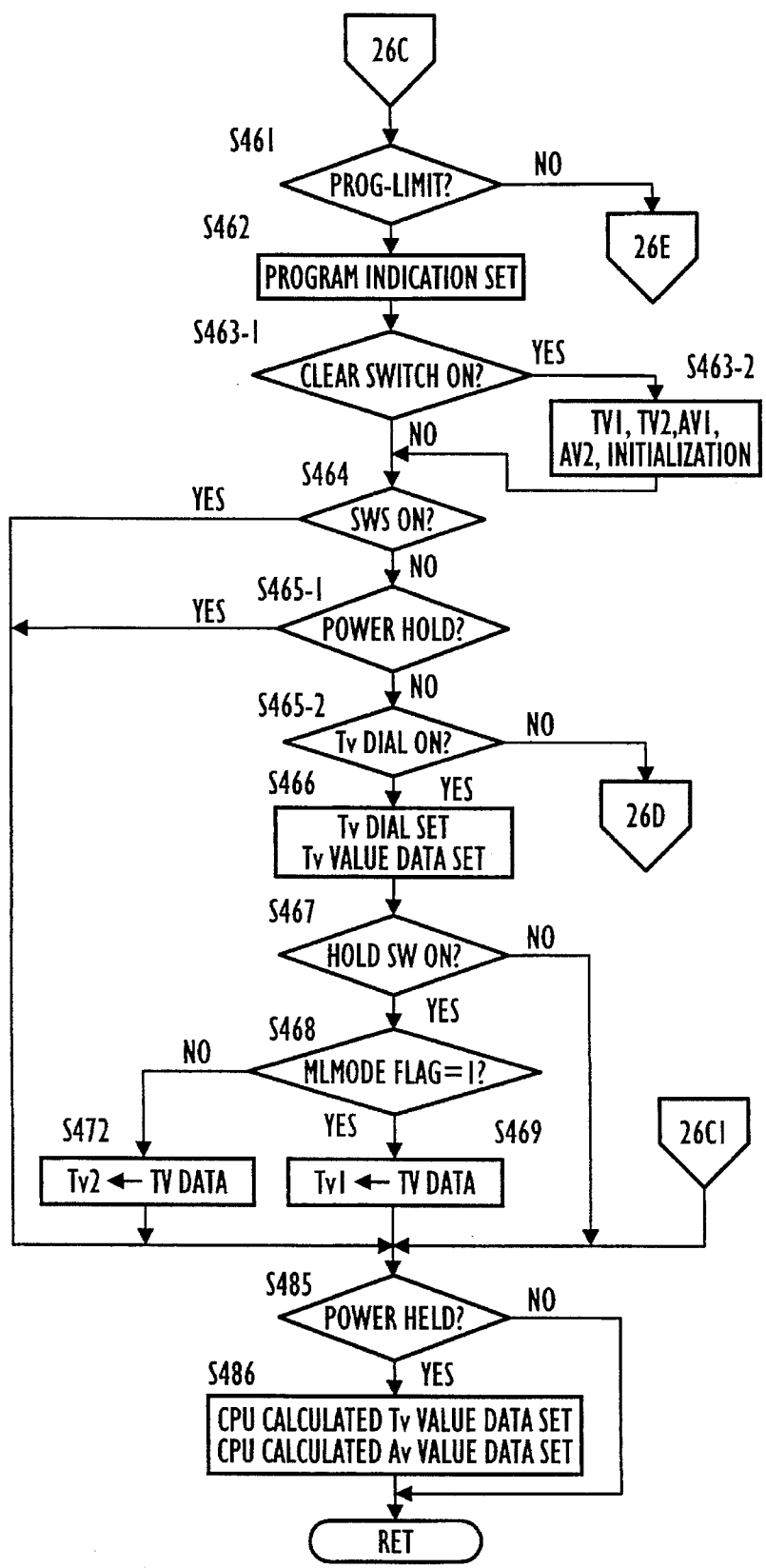
Figure 39D:
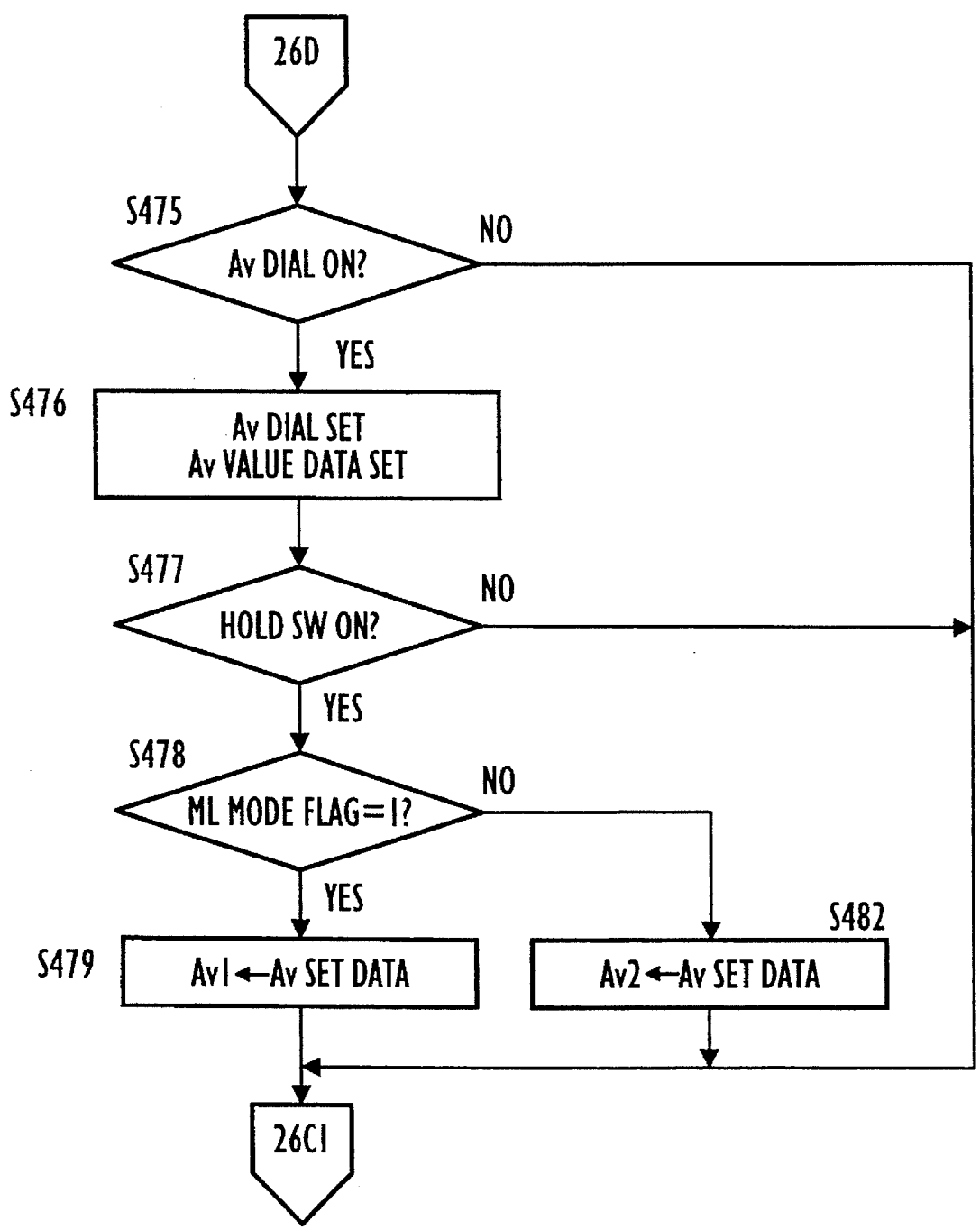
Figure 39E:
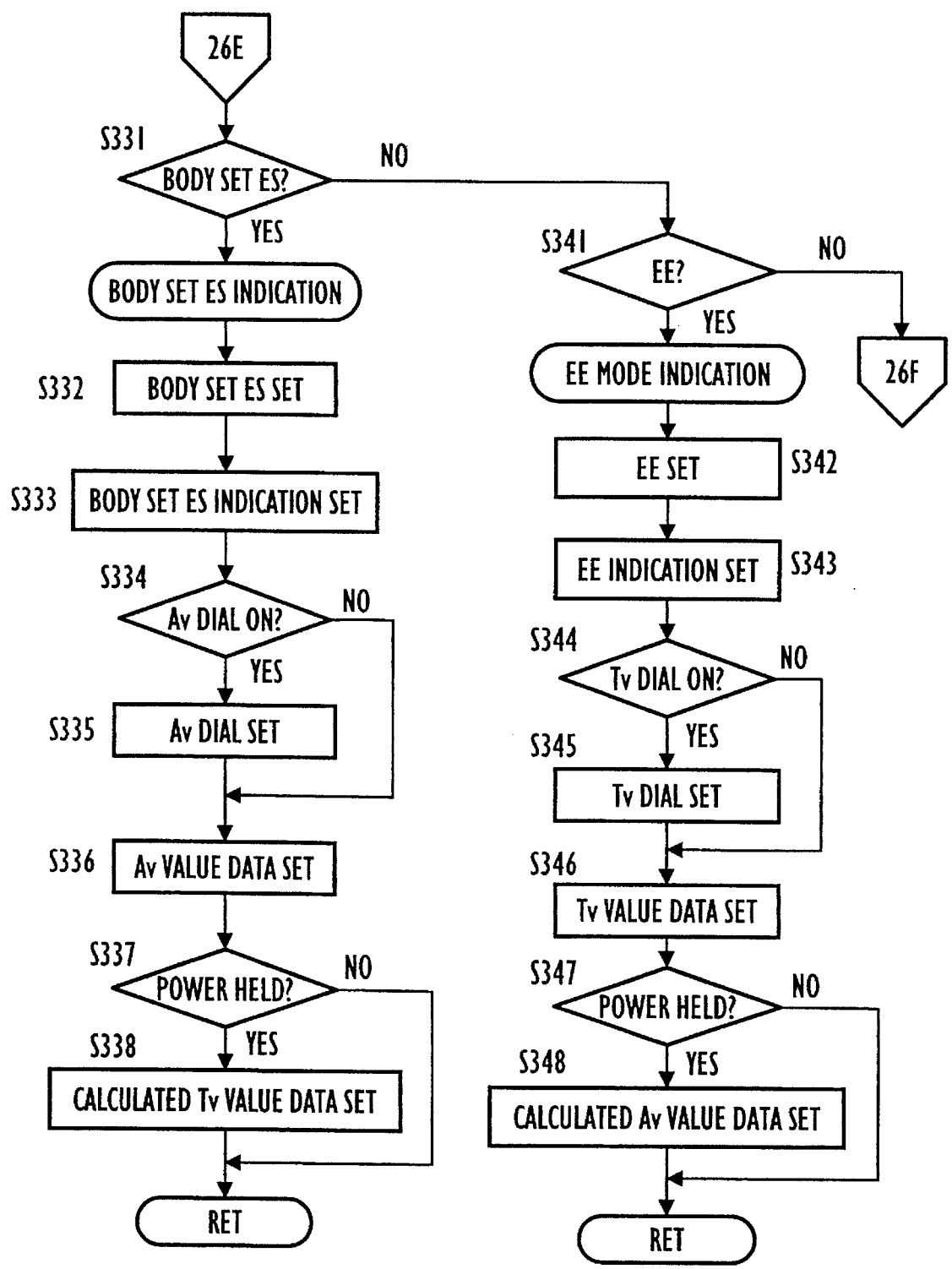
Figure 39F:
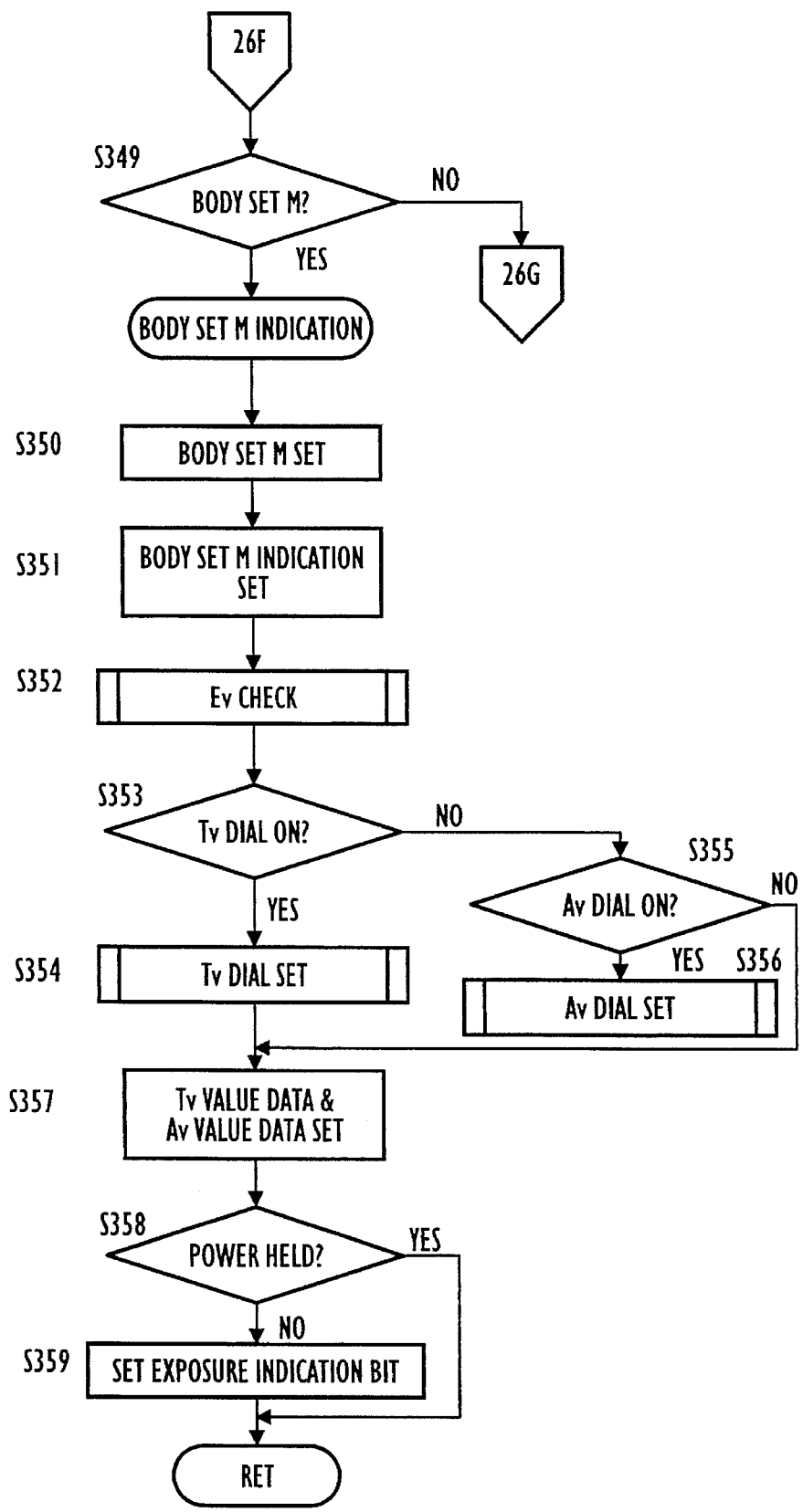
Figure 39G:
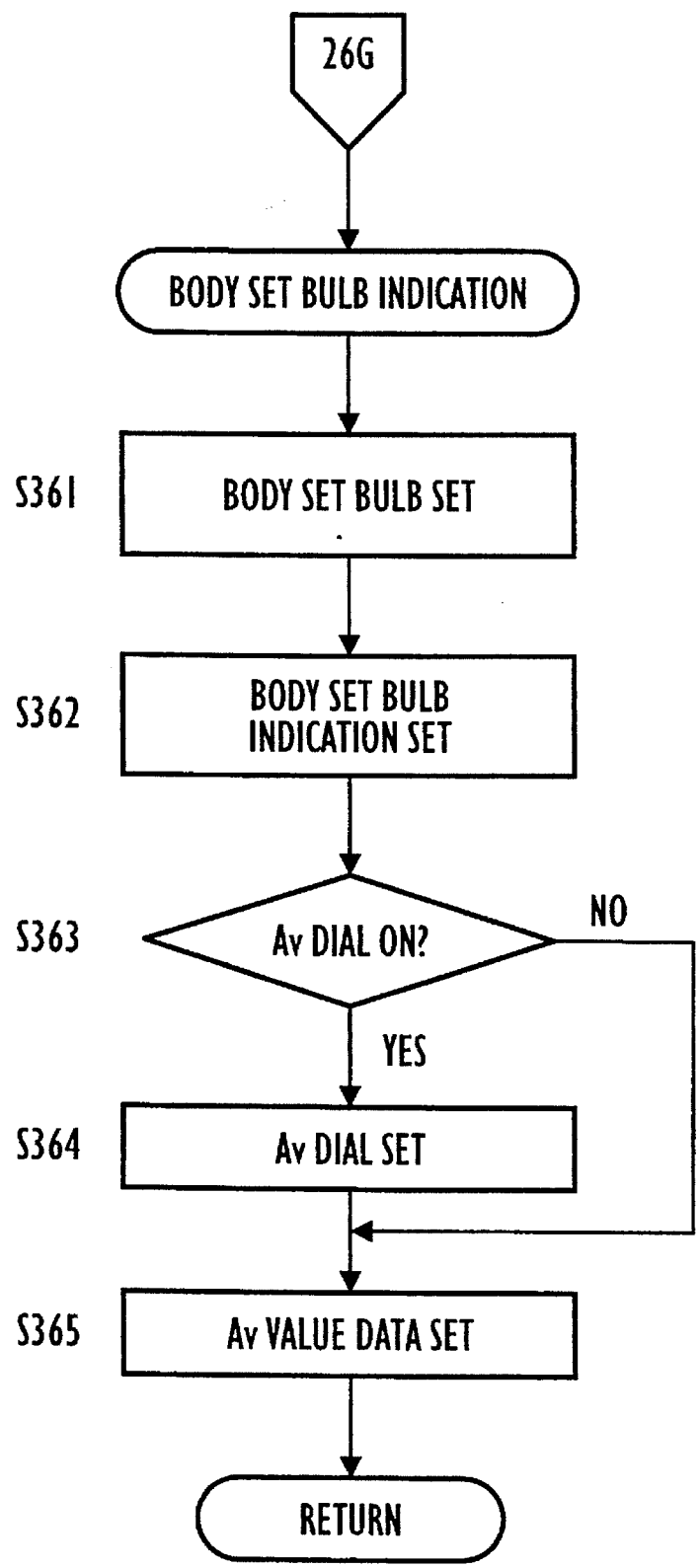
Figure 39H:
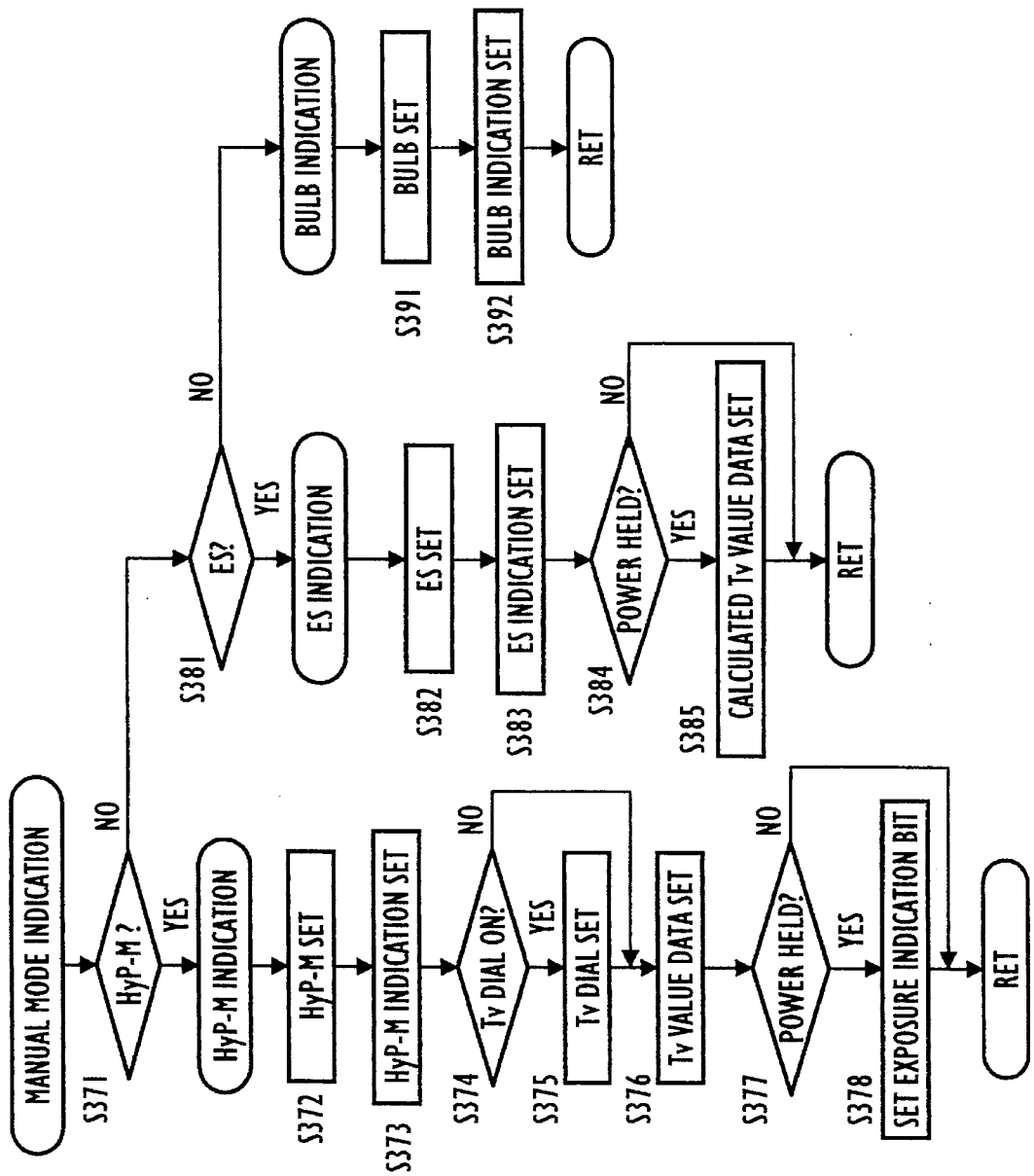

The calculating minimum and maximum diaphragm values AVDMIN and AVDMAX, and the calculating minimum and maximum shutter speeds TVDMIN and TVDMAX are set by actuating the hold button 25 and rotating the Tv electronic dial 17 and the Av electronic dial 19 when the limited program exposure mode has been selected. The setting operation shown in the flow chart of FIGS. 39C and 39D will be discussed in detail hereinafter.

Hyper-EE Automatic Exposure Mode

Figure 13:
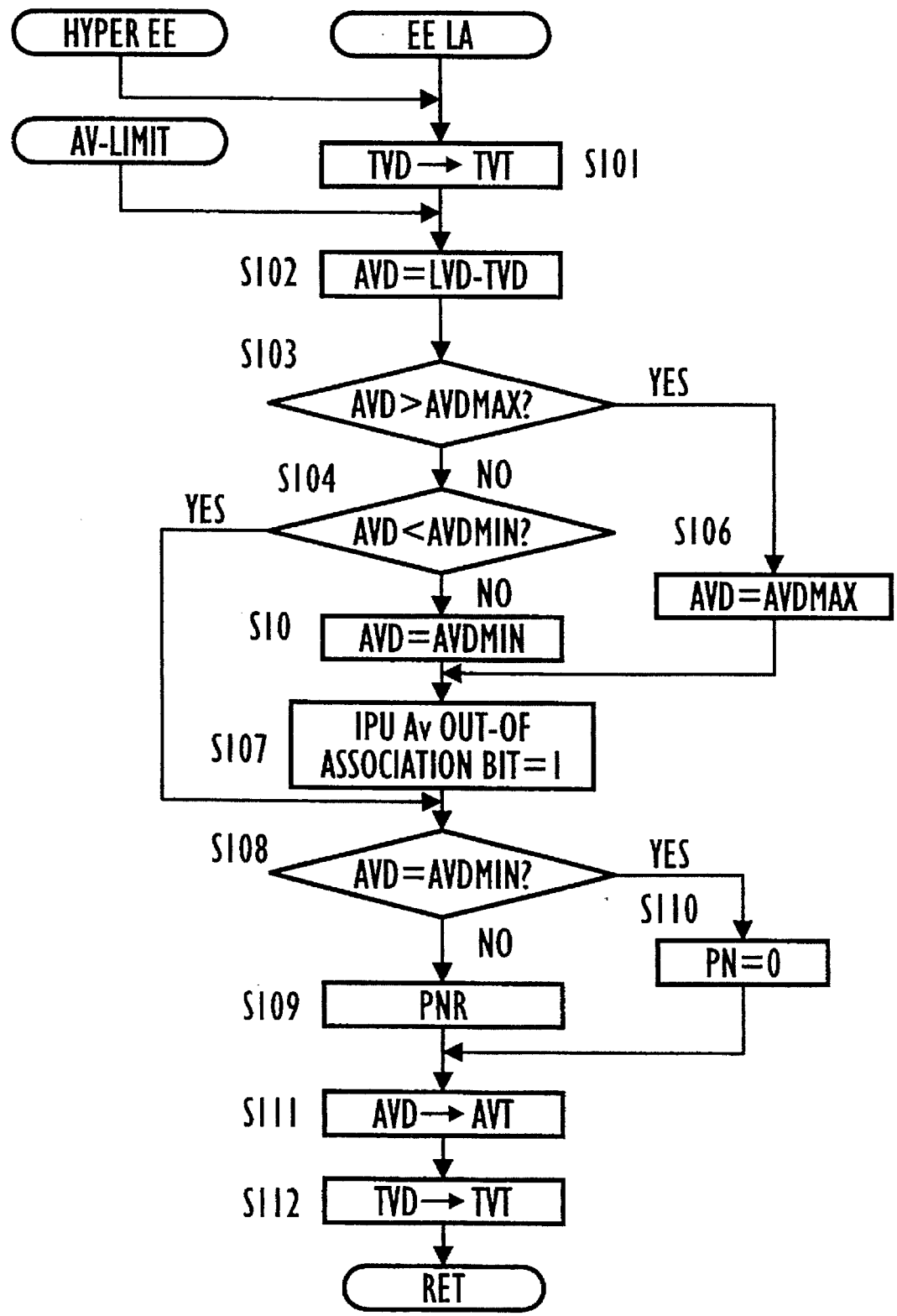
FIG. 13 is a flow chart of a hyper-shutter speed priority automatic exposure mode operation, according to the present invention.

FIG. 13 shows a flow chart of the hyper-shutter priority (Hyper-EE) automatic exposure mode. The program diagram thereof is shown as a dotted-dashed line in FIG. 10.

The operation for calculating the exposure factors at the hyper-shutter priority automatic exposure mode is basically the same as the operation of the ordinary shutter priority automatic exposure mode (lens-auto mode), except that the exposure mode can be changed by actuating the electronic dials 17, 19 or the clear button 23.

The hyper-EE automatic exposure mode is an EE automatic exposure mode which is compulsively selected when the hyper program exposure mode is selected and when the Tv electronic dial 17 has been actuated. Return from the hyper-EE automatic exposure mode to the hyper-program exposure mode is effected by the operation of the clear button 23 or the power switch, etc. The switch from the hyper-EE automatic exposure mode to the hyper-ES exposure mode is compulsively effected by the rotation of the Av electronic dial 19.

In the hyper-EE automatic exposure mode, the set shutter speed TVT transferred from the IPU 43 by the data communication is read and converted to the calculating shutter speed TVD (step S101). The relationship between the transferring shutter speed TVT and the calculating shutter speed TVD is as follows:

$$TVD = TVT - 10\%$$

The transferring shutter speed TVT, which is ½ Tv in step, is converted to the calculating shutter speed TVD, which is ⅛ Tv in step, by the above operation.

The transferring shutter speed TVT is represented by data of a ½ Ev step and is processed upon calculating, so that the decimal place thereof is identical to that of the calculating shutter speed TVD (i.e., data which is ⅛ Ev in step). Accordingly, the Tv value, which is set by the user (i.e., TVT) set as the calculating shutter speed TVD in predetermined addresses of RAM 41$b$.

Thereafter, the optimum calculating diaphragm value AVD is calculated using the calculating shutter speed TVD and the calculating exposure value LVD (step S102).

If the optimum calculating shutter speed AVD is within the diaphragm capability range, the values are held and the EE pulse number is calculated (steps S103, S104, S108~S110).

If the optimum calculating diaphragm value AVD is out of the diaphragm capability range, namely, if the object is too bright or dark, the following operations are performed.

When the object is too bright:

If the optimum calculating diaphragm value AVD is greater than the calculating maximum diaphragm value AVDMAX, the calculating diaphragm value AVD is replaced with the calculating maximum diaphragm value AVDMAX. This replacement causes an over-exposure condition. Accordingly, the EE pulse number PN is set after the Av out-of-association bit signal is set at "1" to indicate that the optimum calculating diaphragm value AVD is out of association (steps S103, S106–S110). When the Av out-of-association bit signal is set, the number "22", indicating the diaphragm value Av in the LCD display panel 69, blinks to indicate over-exposure.

When object is too dark:

If the optimum calculating diaphragm value AVD is smaller than the calculating minimum diaphragm value AVDMIN, the calculating diaphragm value AVD is replaced with the calculating minimum diaphragm value AVDMIN. This replacement causes an under-exposure condition. Accordingly, the EE pulse number PN is set at "0" after the Av out-of-association bit signal is set at "1" (steps S103–S105, S107, S108, and S110). Thus, the diagram as shown as a dotted and dashed line in FIG. 10 is obtained.

When the setting of the EE pulse number PN is finished, the calculating diaphragm value AVD and the calculating shutter speed TVD are converted to the transferring diaphragm value AVT and the transferring shutter speed TVT to complete the operation, respectively (steps S111 and S112).

Hyper-ES Automatic Exposure Mode

Figure 16:
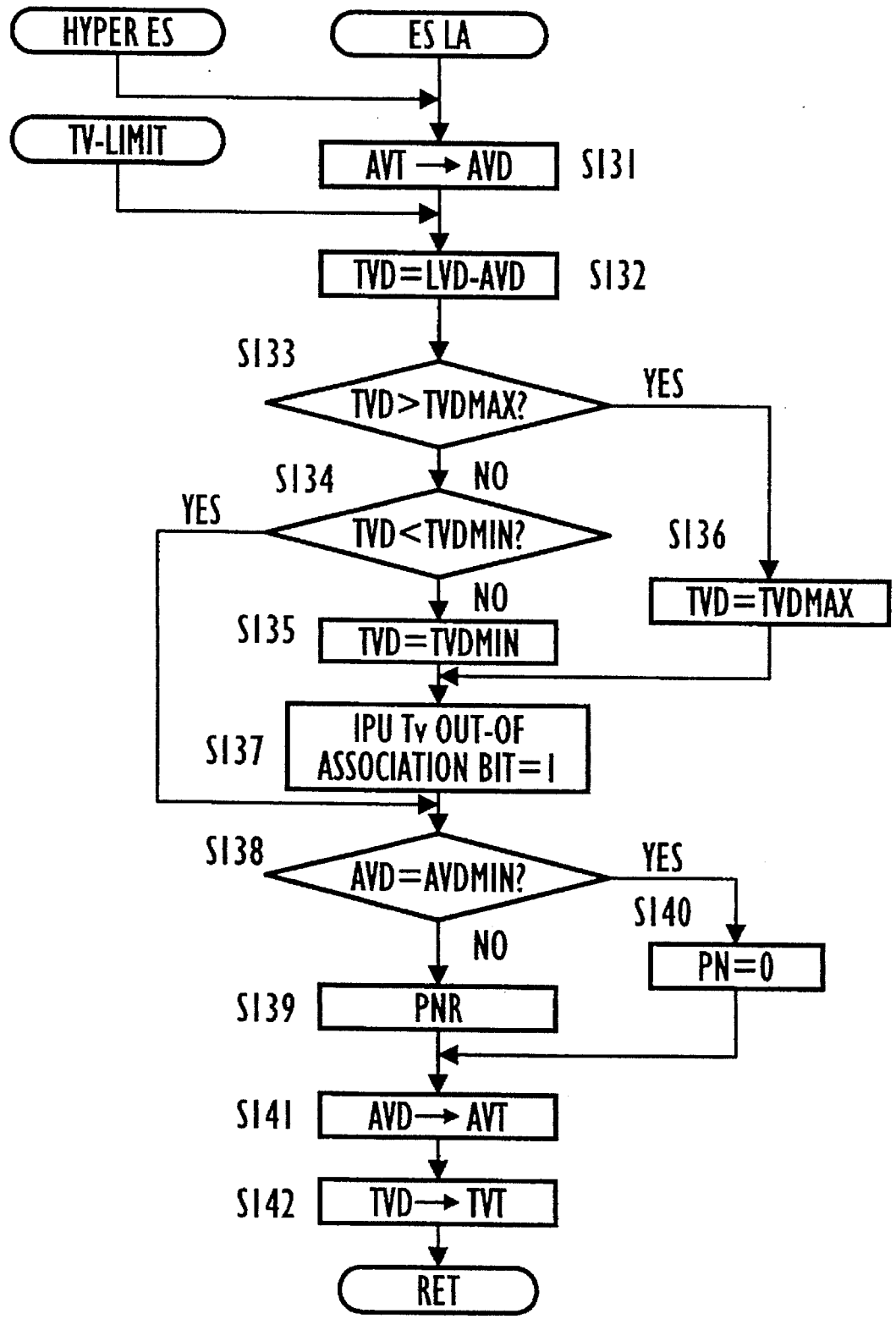
FIG. 16 is a flow chart of a hyper-diaphragm priority automatic exposure mode operation, according to the present invention.

An embodiment of the hyper diaphragm priority (ES) automatic exposure mode (lens-auto mode) will be explained below with reference to FIGS. 10 and 16.

The basic operations in the hyper-ES automatic exposure mode is basically the same as the operation of the conventional ES automatic exposure mode (lens-auto or body-set mode).

The hyper-ES automatic exposure mode is an ES automatic exposure mode which is compulsively selected when the hyper program exposure mode is selected and when the Av electronic dial 19 has been actuated. The return from the hyper-ES automatic exposure mode to the hyper-program exposure mode is effected by the operation of the clear button 23 or the power switch, etc. The switch from the hyper-ES automatic exposure mode to the hyper-EE exposure mode is compulsively effected by the rotation of the Tv electronic dial 19.

In the hyper-ES automatic exposure mode, the set diaphragm value AVT transferred from the IPU 43 by the data communication is read to convert the same to the calculating diaphragm value AVD (step S131). The transferring diaphragm value AVT is identical to the calculating diaphragm value AVD (i.e., AVD=AVT). Accordingly, the diaphragm value Av manually set by the user (i.e., AVT) is set as the calculating diaphragm value AVD at predetermined addresses of the RAM 41b.

The transferring diaphragm value AVT is represented by data which is ½ Ev in step, and it is processed upon calculating so that the place thereof is identical to that of the calculating diaphragm value AVD (i.e., data which is ⅛ Ev in step).

Thereafter, the optimum calculating shutter speed TVD is calculated using the calculating exposure value AVD and the calculating exposure value LVD (step S132).

If the optimum calculating shutter speed TVD is within the shutter capability range, the values are held and the EE pulse number is calculated in accordance with the calculating diaphragm value AVD (steps S133, S134, S138–S140).

If the optimum calculating shutter speed TVD is out of the shutter capability range, namely, if the object is too bright or dark, the following operations are performed:

When the object is too bright:

If the optimum calculating shutter speed TVD is greater than the calculating maximum shutter speed TVDMAX, the calculating shutter speed TVD is replaced with the calculating maximum shutter speed TVDMAX. This replacement causes an over-exposure condition. Accordingly, the EE pulse number PN is set after the Tv out-of-association bit signal is set at "1" to discriminate that the optimum calculating shutter speed TV is out of association (steps S133, S136–S140).

When the object is too dark:

If the optimum calculating shutter speed TVD is less than the calculating minimum shutter speed TVDMIN, the calculating shutter speed TVD is replaced with the calculating minimum shutter speed TVDMIN. This replacement causes an under-exposure condition. Accordingly, the EE pulse number PN is set at "0" after the Tv out-of-association bit signal is set at "1" (steps S133–S135, S137, S138–S140).

When the EE pulse number PN is set, the calculating diaphragm value AVD and the calculating shutter speed TVD are converted to the transferring diaphragm value AVT and the transferring shutter speed TVT to complete the calculation of the exposure factors (steps S141 and S142), respectively. Thus, the diagram as shown as a dotted line in FIG. 10 is obtained.

Second Hyper-EE or ES Automatic Exposure Mode

The second hyper-EE or ES automatic exposure mode is an automatic exposure mode in which the priority exposure factor is modified only when the non-priority exposure factor cannot be adjusted to avoid the occurrence of under-exposure or over-exposure. Namely, unlike the above mentioned hyper-EE or hyper-ES automatic exposure modes in which a change of the priority exposure factor (i.e., diaphragm value or shutter speed having a priority) does not take place even if the object is too bright or dark, the exposure factor having a priority is modified when the modification of the exposure factor having no priority cannot be adjusted to avoid over-exposure or under-exposure.

Figure 15:
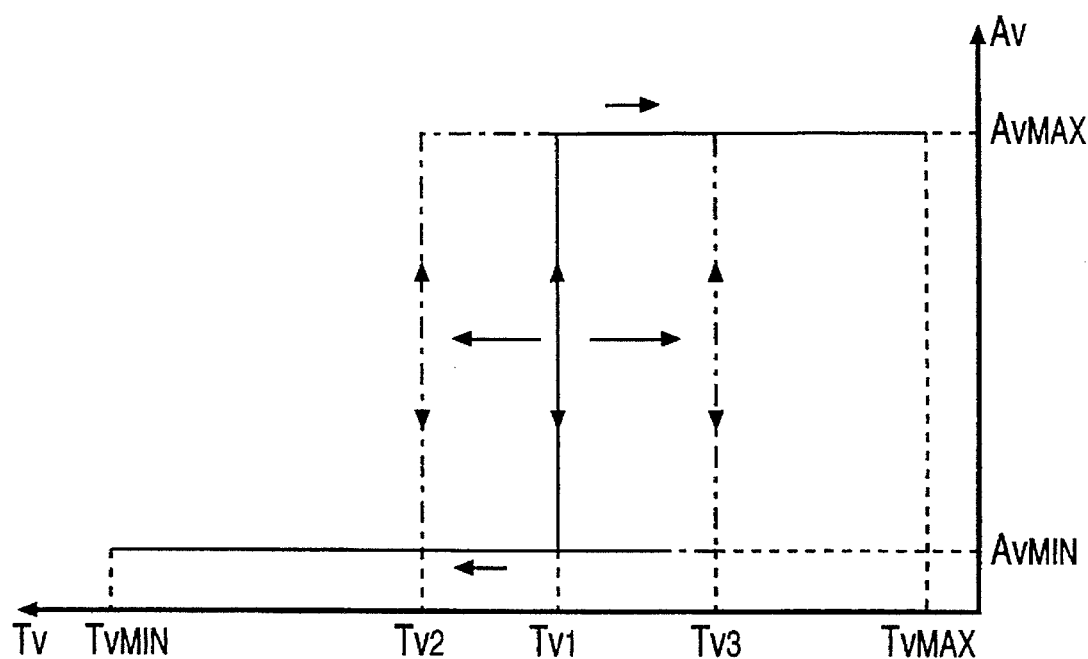
FIG. 15 is a diagram of a hyper-shutter speed priority automatic exposure mode shown in FIGS. 13 and 14.
Figure 18:
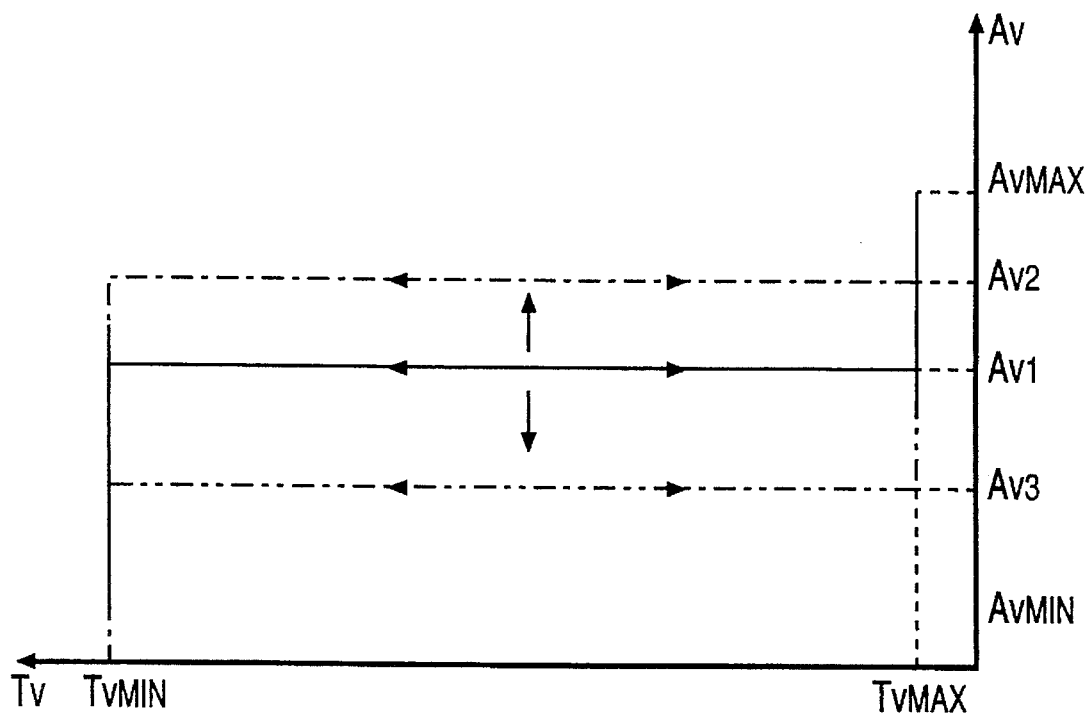
FIG. 18 is a diagram of a hyper-diaphragm priority automatic exposure mode shown in FIGS. 16 and 17.

In the second hyper-EE or ES automatic exposure mode, if the shutter speed or the diaphragm value having priority causes an under-exposure or an over-exposure, the shutter speed or the diaphragm value is modified to provide an optimum exposure (FIGS. 15 and 18).

Figure 14:
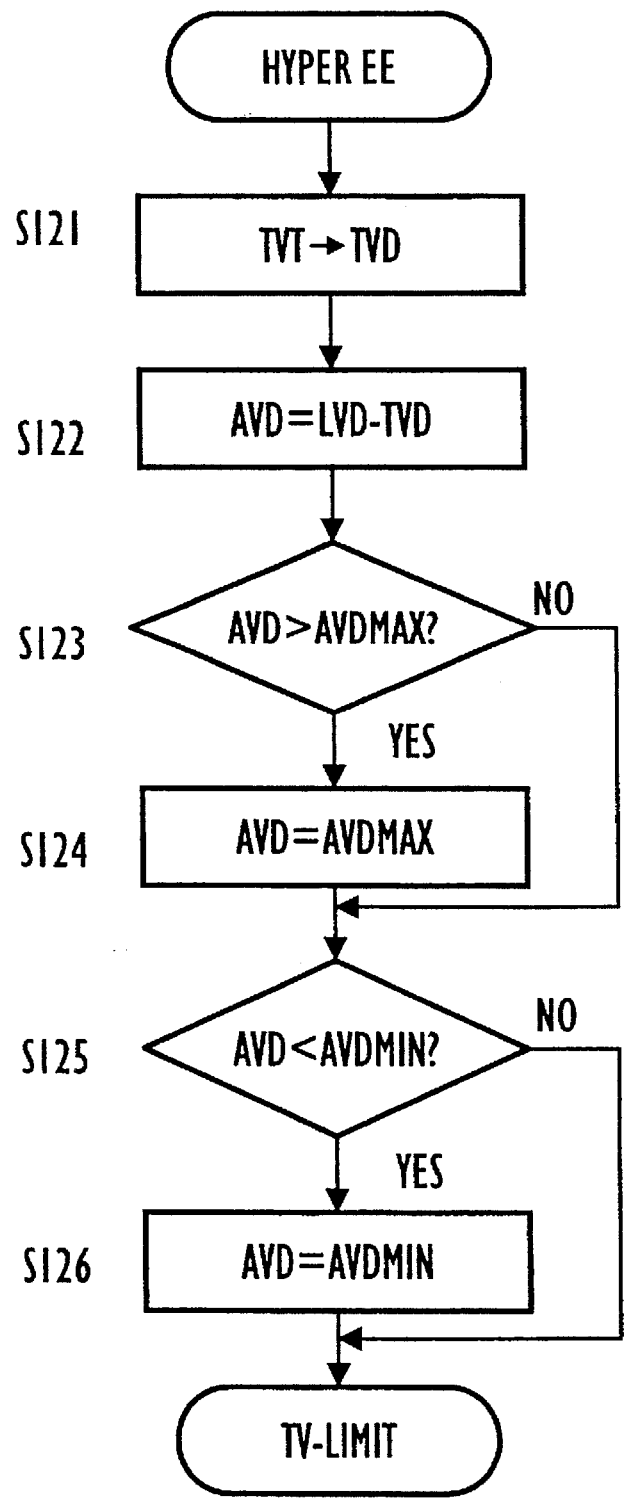
FIG. 14 is a flow chart of a hyper-shutter speed priority automatic exposure mode operation, according to another embodiment of the present invention.

The operations in the second hyper-EE automatic exposure mode and the second hyper-ES automatic exposure mode will be discussed below with reference to FIGS. 14 and 17, respectively.

In the second hyper-EE automatic exposure mode, the set shutter speed TVT stored in the IPU 43 is read by the operation of the Tv electronic dial 17 to convert the same to the calculating shutter speed TVD, so that the optimum calculating diaphragm value AVD is calculated in accordance with the calculating shutter speed TVD and the calculating exposure value LVD (steps S121 and S122). If the optimum calculating diaphragm value AVD is within the diaphragm capability range, the control enters step S132 of the hyper-ES automatic exposure mode as can be seen in FIG. 16 (steps S123, S125 and S127).

If the optimum calculating diaphragm value AVD is greater than the calculating maximum diaphragm value AVDMAX (i.e., if the object is too bright), the calculating diaphragm value AVD is replaced with the calculating maximum diaphragm value AVDMAX. Then, control enters step S132. Conversely, if the optimum calculating diaphragm value AVD is less than the calculating minimum diaphragm value AVDMIN (i.e., if the object is too dark), the control enters step S132 after the calculating diaphragm value AVD is replaced with the calculating minimum diaphragm value AVDMIN (steps S123, S125~S127).

In step S132 of the hyper-ES automatic exposure mode (diaphragm priority automatic exposure mode), the calculating shutter speed TVD is recalculated to modify the shutter speed.

Consequently, the diagrams as shown by a solid line, a dotted line and a two-dotted and dashed line in FIG. 15 are obtained. As can be seen in FIG. 15, the optimum exposure range is widened. This can be considered a kind of program automatic exposure mode in which the shutter priority automatic exposure mode functions in a certain exposure range.

In the second hyper-ES automatic exposure mode, the set diaphragm value AVT stored in the IPU 43 is read by the operation of the Av electronic dial 17 to convert the same to the calculating diaphragm value AVD, so that the optimum calculating shutter speed TVD is calculated in accordance with the calculating diaphragm value AVD and the calculating exposure value LVD (steps S151 and S152). If the optimum calculating shutter speed TVD is within the shutter capability range, the values are held and the control enters step S102 of the hyper-EE automatic exposure mode in FIG. 13 (steps S153, S155 and S157).

If the optimum calculating shutter speed TVD is greater than the calculating maximum shutter speed TVDMAX (i.e., if the object is too bright), the calculating shutter speed TVD is replaced with the calculating maximum shutter speed TVDMAX. Then, the control enters step S102 of the shutter priority automatic exposure mode.

Conversely, if the optimum calculating shutter speed TVD is less than the calculating minimum shutter speed TVDMIN (i.e., if the object is too dark), the control enters step S102 after the calculating shutter speed TVD is replaced with the calculating minimum shutter speed TVDMIN. In step S102, the calculating diaphragm value AVD is recalculated to modify the diaphragm value (steps S103~S112).

Consequently, the diagrams as shown by a solid line, a dotted line and a two-dotted and dashed line in FIG. 18 are obtained. As can be seen in FIG. 18, the optimum exposure range is extended. This can be considered a kind of program automatic exposure mode in which the diaphragm priority automatic exposure mode functions in a certain exposure range.

Although the first and second hyper EE automatic exposure modes and the first and second hyper ES automatic exposure modes are separately explained, the operations of these modes can be performed in the same camera. Namely, 2 bit signals of the exposure mode data of the E²PROM 43c included in the IPU 43 correspond to those of the above-mentioned first and second methods in the hyper-EE o and hyper-ES automatic exposure modes, respectively. The signal data is transferred to the CPU 41 by the CPU-IPU communication, so that the 2 bit signals can be determined, after the hyper-EE mode or the hyper-ES mode is detected, to switch the first or second hyper-EE and hyper-ES modes.

LA Hyper-Manual Exposure Mode

Figure 19:
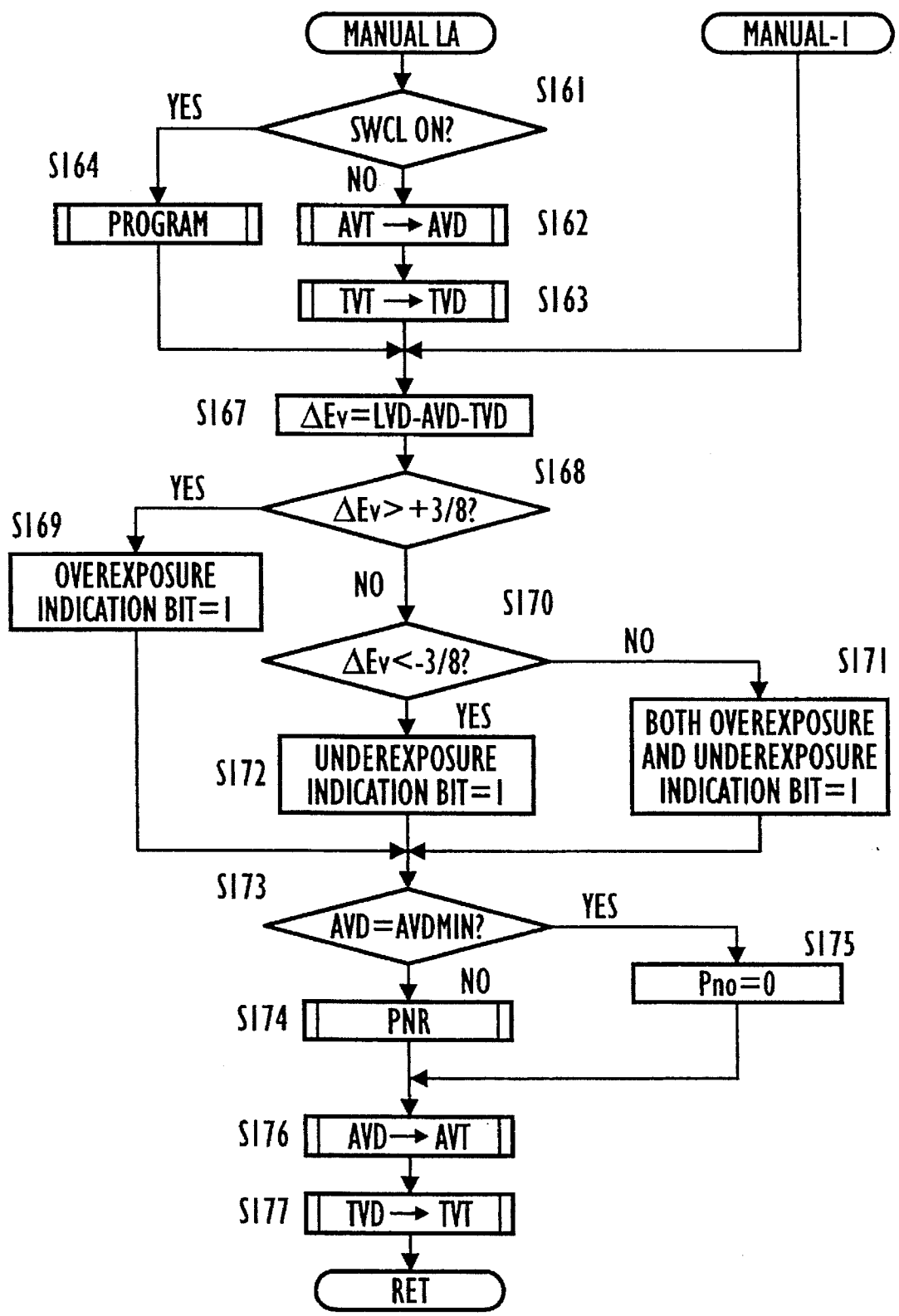
FIG. 19 is a flow chart of a LA manual exposure mode operation, according to still another embodiment of the present invention.
Figure 20:
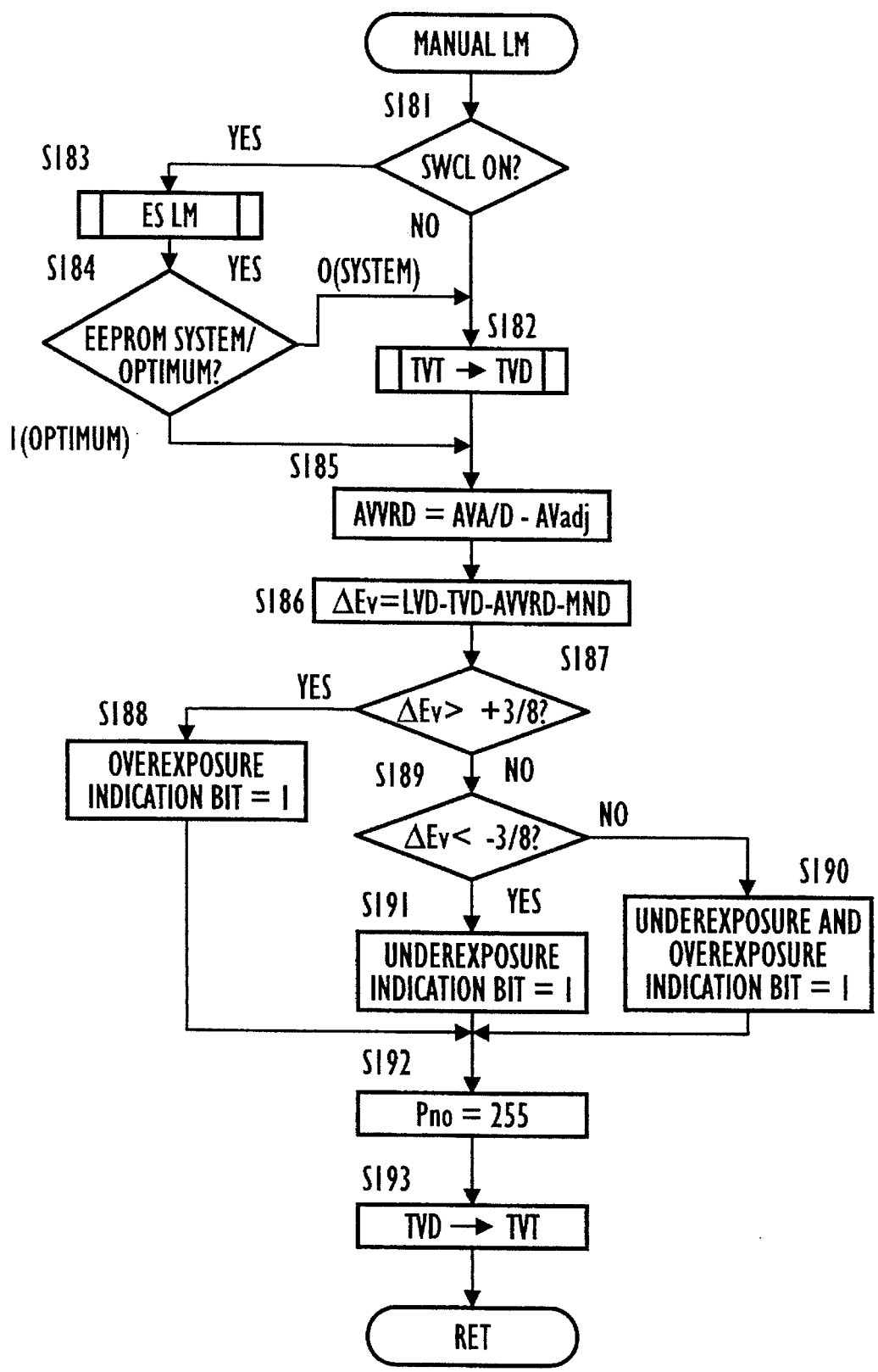
FIG. 20 is a flow chart of an LM manual exposure mode operation, according to the present invention.

The hyper-manual exposure mode (body set mode), in which both the shutter speed and the diaphragm value can be manually set by the operation from the camera body side, will be discussed below with reference to FIG. 19.

In the hyper-manual exposure mode (lens-auto or body set mode), a photographer can set the exposure factors by actuating the electronic dials 17 and 19. However, when the clear button 23 is turned ON, the optimum exposure factors are automatically calculated in accordance with the object brightness Bv, based on the algorithm identical to that of the program exposure mode. When the clear button 23 is turned OFF, the calculated exposure factors are replaced with those which are manually set.

In the LA hyper-manual exposure mode, both the shutter speed Tv and the diaphragm value Av can be set when the Tv and Av electronic dials 17 and 19 are actuated, respectively. Furthermore, when the clear button 23 is turned ON, the function equivalent to the program automatic exposure mode can be performed. The set shutter speed Tv and diaphragm value Av are stored in the RAM 43b of the IPU 43 at predetermined addresses thereof and are indicated in the LCD panel 69 and the indicator unit 71 within the finder.

While the clear button 23 is turned ON, the calculating shutter speed TVD and the calculating diaphragm value AVD are calculated in accordance with the program exposure mode and the control then proceeds to step S167 (step S164).

If the clear button 23 is not turned ON, the set diaphragm value AVT and the set shutter speed TVT, transferred from the IPU 43, are converted to the calculating diaphragm value AVD and the calculating shutter speed TVD, and the control then proceeds to step S167 (steps S161~S163).

At step S167, an exposure error A Ev is calculated by the following equation, which is based on the optimum calculating exposure value LVD, obtained from the result of the actual photometering, and the exposure value (AVD +TVD), which is obtained by the calculating diaphragm value AVD, identical to the set calculating diaphragm value, and the calculating shutter speed TVD, identical to the set calculating shutter speed:

$$\Delta Ev = LVD - (AVD + TVD)$$

If the exposure error ΔEv is within an allowable limit (−3/8<ΔEv<+3/8), overexposure and underexposure indication bits are set to illuminate a pair of LED exposure indicating elements 71a and 71b (FIG. 42E) in the indicator unit 71 within the finder (steps S168, S170, S171).

If the exposure error ΔEv is greater than the allowable upper limit, only the overexposure indication bit is set to illuminate the indicating element 71a, to thereby indicate an over-exposure (steps S168 and S169). Conversely, if the exposure error ΔEv is less than the allowable lower limit, only the underexposure indication bit is set to illuminate the indicating element 71b to thereby indicate an under-exposure (steps S168, S170 and S172). Although the allowable limit of exposure error ΔEv is ±3/8 Ev in the illustrated embodiment, another limit may be selected. Furthermore, the upper limit value and the lower limit value can be different from each other. It is also possible to read the latitude of the loaded film from the DX code, so that the allowable limit is determined to be identical to that of the film latitude.

Thereafter, the number PN of EE pulses is obtained from the calculating diaphragm value AVD (steps S173, S174 and S175), and the calculating diaphragm value AVD and the calculating shutter speed TVD are converted to the transferring diaphragm value AVT and the transferring shutter speed TVT, respectively.

When the clear button is turned OFF after being ON, the optimum exposure value in the program exposure mode is converted to the series value at steps S162 and S163, which will be discussed hereinafter, and is stored at predetermined addresses of the RAM 41b with the accuracy equivalent to that of the manual mode.

As can be understood from the foregoing, since, when the clear button 23 is turned ON in the hyper-manual exposure mode, both the shutter speed Tv and the diaphragm value Av are modified to optimum values depending on the photometering data (object brightness Bv) in accordance with the program exposure mode, the optimum exposure value can be manually and quickly set by a simple operation. Although the calculation of the optimum exposure factors continues while the clear button 23 is turned ON i n the above mentioned embodiment, it is possible to calculate the exposure factors and store the same in the RAM 41*b* only when the clear button 23 is switched from OFF to ON. In this alternative, at step S161, it is determined whether the clear button 23 is switched from OFF to ON is.

Second LA Hyper-manual Exposure Mode

In the above mentioned embodiment, the diaphragm value Av and the shutter speed Tv are modified to those detected by the photometering operation, in accordance with the program automatic exposure mode, when the clear button 23 is turned ON. It is possible to modify only one of the exposure factors Av and Tv to an optimum value. Furthermore, it is also possible to set the exposure factor or factors at the rounded or system Av and Tv values instead of the optimum exposure value Ev. The rounded (or system) values referred to herein mean values having steps (accuracies) which can be manually set and obtained by rounding calculated APEX values, taking into account the step of the APEX values calculated by the CPU 41 being smaller than that of the manually set APEX values.

Figure 25:
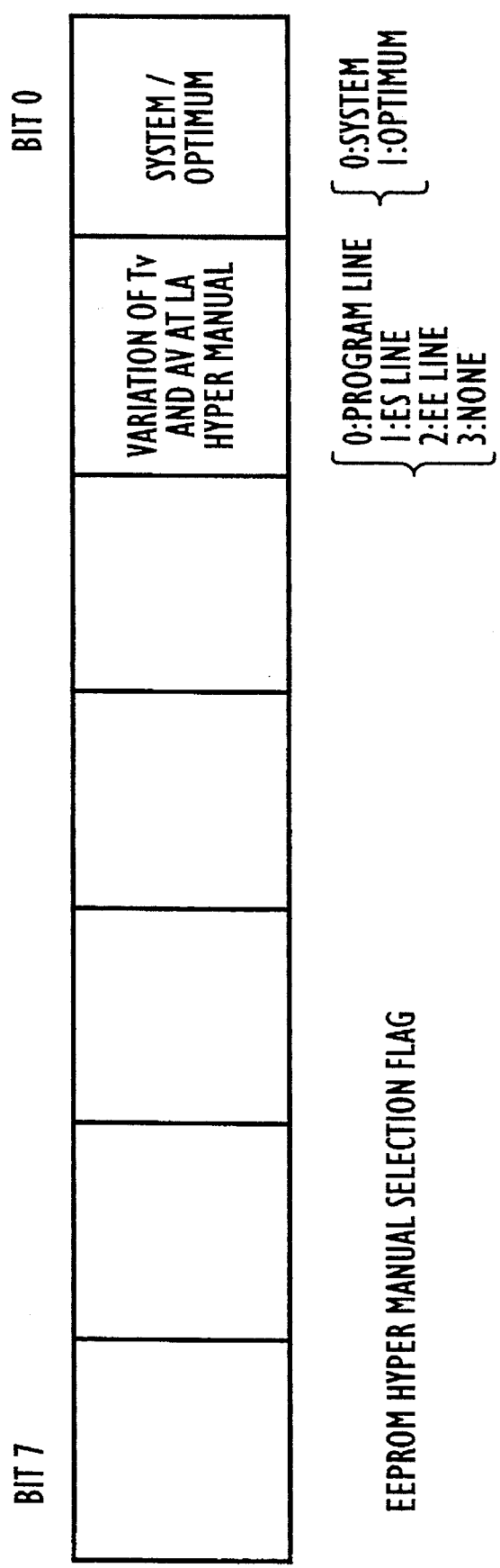
FIG. 25 is a view showing an example of a hyper-manual select flag.

Selection of the optimum value and the rounded value is determined in accordance with one bit of the hyper manual select flag of the E²PROM 43*c*. In the illustrated embodiment, as can be seen in FIG. 25, when the O-order bits are "0" and "1", the optimum value and the rounded value are selected, respectively. Furthermore, the kind of automatic exposure mode is determined in accordance with the first and second bits of the flag. The bit data can be preset when the camera is shipped or can optionally be set and modified by a photographer.

Figure 24:
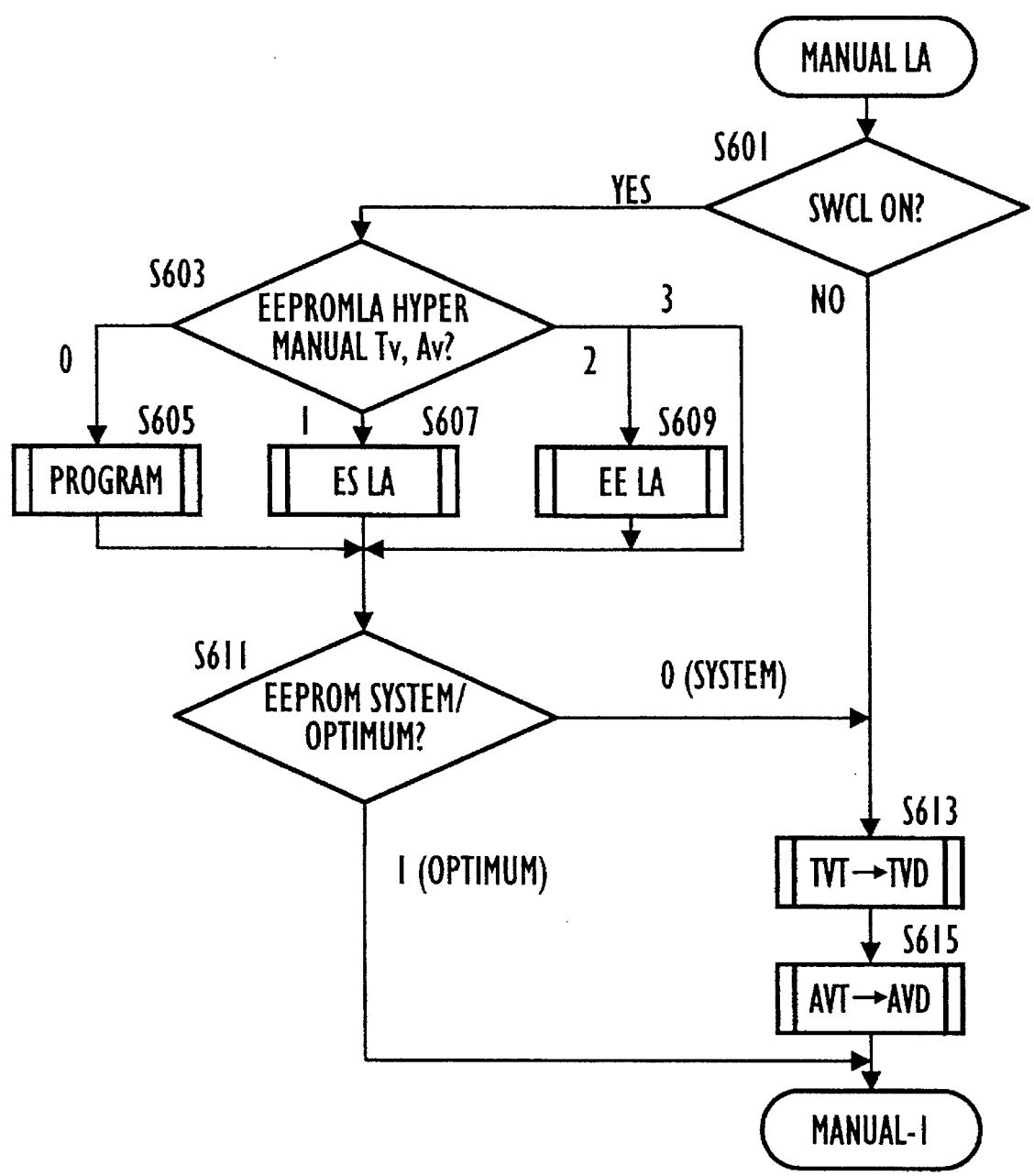
FIG. 24 is a flow chart of an LA hyper-manual exposure mode operation, according to the present invention.

FIG. 24 shows a flow chart of an example in which at least one of the exposure factors is modified to an optimum value and an example in which the optimum/system value selection is effected in combination, using the data of the hyper manual select flag of the E²PROM 43*c* within the IPU 43. The data of the E²PROM 43*c* is stored in the RAM 43*b* of the IPU 43 upon operation, and the same data is transferred to the CPU 41 also to be stored in the RAM 41*b* thereof by the CPU-CIP communication.

The state of the clear button 23 is checked at step S601. If the clear button 23 is turned ON, the control proceeds to step S603, at which point the modifying mode of Tv and Av in the LA hyper-manual mode, in accordance with the hyper-manual select flag data, is checked. In the illustrated embodiment, the first and second bits of the hyper-manual select flag data are used. If the valise represented by the 2 bits is "0", "1" and "2", the control proceeds to step S605 (program automatic exposure mode operation), step S607 (LA diaphragm priority automatic exposure mode operation), and step S609 (LA shutter priority automatic exposure mode operation), respectively. If the value represented by the 2 bits is "3", the control proceeds to step S611 without performing the exposure mode operation. Consequently, the calculating shutter speed TVD, the calculating diaphragm value AVD, the indicating shutter speed TVT, and the indicating diaphragm value AVT are memorized in the RAM 41*b* of the CPU 41.

Thereafter, the system/optimum bits of the select flag data are checked at step S611. If the value represented by the bits is "0", the control proceeds to step S163 (system value setting operation) and if the value is "1", the control proceeds directly to the sub-routine of the Manual-1 (optimum value setting operation).

The optimum value setting operation is the same as that of the first embodiment. The system value setting operation will be explained below. The calculation of AVTD and TVTD subsequent to the operations at steps S605, S607 and S609 means that the calculating shutter speed TVD (S613) and the calculating diaphragm value AVD (S615) are calculated again after the calculating optimum values AVD and TVD are obtained, based on the indicating optimum values TVT and AVT which are obtained in accordance with the obtained calculating optimum values AVD (=AVT) and TVD (TVT) (by the last calculation of AVDT and TVDT in the sub-routine of steps S605, S607 and S609). As a result, the calculating optimum diaphragm values AVD and the calculating optimum shutter speed TVD once obtained are replaced with the calculating system diaphragm value and the calculating system shutter speed, respectively. The operations subsequent to step 167 are identical to those in the first embodiment.

In the second embodiment mentioned above, six kinds of LA hyper-manual exposure modes (control modes) below can be selected:

① Exposure control by the optimum shutter speed Tv and the optimum diaphragm value Av which are obtained when the clear button 23 is actuated in the program automatic exposure mode (first embodiment);

② Exposure control by the system (rounded) shutter speed Tv and the system (rounded) diaphragm value Av which are obtained when the clear button 23 is actuated in the program automatic exposure mode;

③ Exposure control by the optimum diaphragm value Av which is obtained when the clear button 23 is actuated in the shutter speed priority automatic exposure mode;

④ Exposure control by the system (rounded) diaphragm value Av which is obtained when the clear button 23 is actuated in the shutter speed priority automatic exposure mode;

⑤ Exposure control by the optimum shutter speed Tv which is obtained when the clear button 23 is actuated in the diaphragm priority automatic exposure mode; and ⑥ Exposure control by the system (rounded) shutter speed Tv which is obtained when the clear button 23 is actuated in the diaphragm priority automatic exposure mode.

LM Hyper-Manual Exposure Mode

The following discussion will be directed to the hyper-manual exposure mode (lens-manual mode) in which the shutter speed is set on the camera body side and the diaphragm value is set by the taking lens 65, with reference to FIG. 17.

In the LM hyper-manual exposure mode, the shutter speed Tv is manually set by adjusting the Tv electronic dial 17. However, when the clear button 23 (clear switch SWCL) is turned ON, the shutter speed is automatically modified to an optimum value in accordance with the object brightness Bv.

If the clear button 23 is not turned ON, the transferring shutter speed TVT (value of ½ EV step) sent from the IPU 43 is directly converted to the calculating shutter speed TVT (steps S181 and S182). Thereafter, the control proceeds to step S185.

Conversely, if the clear button 23 is turned ON, the shutter speed Tv is calculated in accordance with the lens-manual diaphragm priority (ES) automatic exposure mode which will be discussed hereinafter, based on the diaphragm value which is set by the diaphragm ring of the taking lens 65 and which is inputted through the diaphragm volume 53 and the A/D converter 51 by step S15 in FIG. 5 (steps S181 and S183). Thereafter, the selection of the system/optimum values is effected similar to the LA hyper-manual exposure mode at step S184. If the system value is selected, the calculation of TVDT is effected for the same reason as that in the LA hyper-manual exposure mode.

At step S185, the calculating diaphragm value AVVRD is calculated, based on the diaphragm value Av converted to the digital value AvA/D and set by the diaphragm ring of the taking lens 65 and based on the adjusting value AVadj peculiar to the camera body 11. Consequently, the exposure error ΔEv is obtained by the following equation (step S186):

$$\Delta Ev = LVD - TVD - AVVRD - MND$$

If the exposure error ΔEv is within the allowable limit, the overexposure and underexposure indication bits are set. If the exposure error ΔEv is greater than the upper limit value, the overexposure indication bit data is set, and if the exposure error ΔEv is less than the lower limit value, the underexposure indication bit data is set (steps S187–S191). Thereafter, the EE pulse number PN is set to the greatest value (255 in the illustrated embodiment), and the calculating shutter speed TVD is converted to the transferring shutter speed TVT. This completes the exposure factor setting operation (steps S192 and S193). The reason that the EE pulse number PN is set to the greatest value is to ensure that the stop-down mechanism of the camera body 11 is driven to an extreme stop-down position corresponding to the diaphragm value set by the diaphragm ring of the taking lens 65.

As can be seen from the foregoing, according to the present invention, since the shutter speed Tv is set to the optimum value or the rounded system value obtained in the diaphragm priority automatic exposure mode when the clear button 23 is turned ON in the LM hyper-manual exposure mode, the optimum exposure value can be manually and quickly obtained by a simple operation.

LM Diaphragm Priority Automatic Exposure Mode

Figure 21:
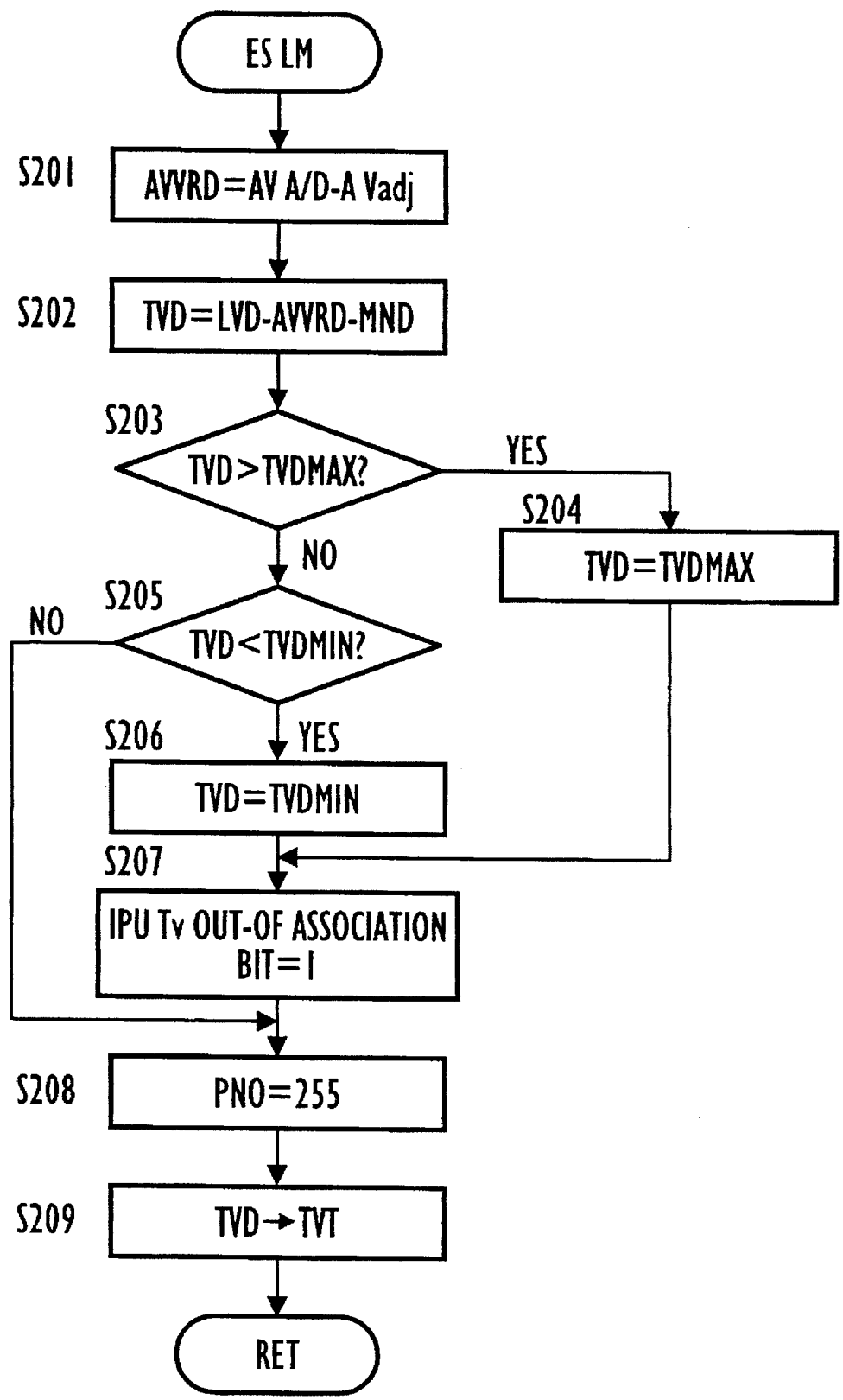
FIG. 21 is a flow chart of an LM aperture priority automatic exposure mode operation, according to the present invention.

The following discussion will be addressed to the lens-manual diaphragm priority (ES) exposure mode in which the diaphragm is set by the diaphragm ring of the taking lens 65, with reference to FIG. 21.

The calculating diaphragm value AVVRD is calculated in accordance with the converted diaphragm value AvA/D which is obtained by converting the diaphragm value Av set by the diaphragm ring of the taking lens 35, and the inherent adjusting value AVADJ of the camera body 11 (step S201). Based on the AVVRD value thus obtained, the calculating shutter speed TVD is calculated by the following equation (step S202):

$$TVD = LVD - AVVRD - MND$$

Thereafter, if the calculating shutter speed TVD is within the shutter capability range, the EE pulse number PN is set to be the largest value (steps S203, S205, S208). If the calculating shutter speed TVD is greater than the calculating maximum shutter speed TVMAX, or less than the calculating minimum shutter speed TVMIN, the calculating shutter speed TVD is replaced with the calculating maximum shutter speed TVMAX (steps S203 and S204), or with the calculating minimum shutter speed TVMIN (steps S203, S205 and S206). Thereafter, the EE pulse number PN is set at the largest value after the Ev out-of-association bit is set (steps S207, S208).

Finally, the calculating shutter speed TVD is converted to the transferring shutter speed to be transferred to the IPU 43 to thereby complete the operation (step S209).

LA, LM Bulb Exposure Mode

Figure 22:
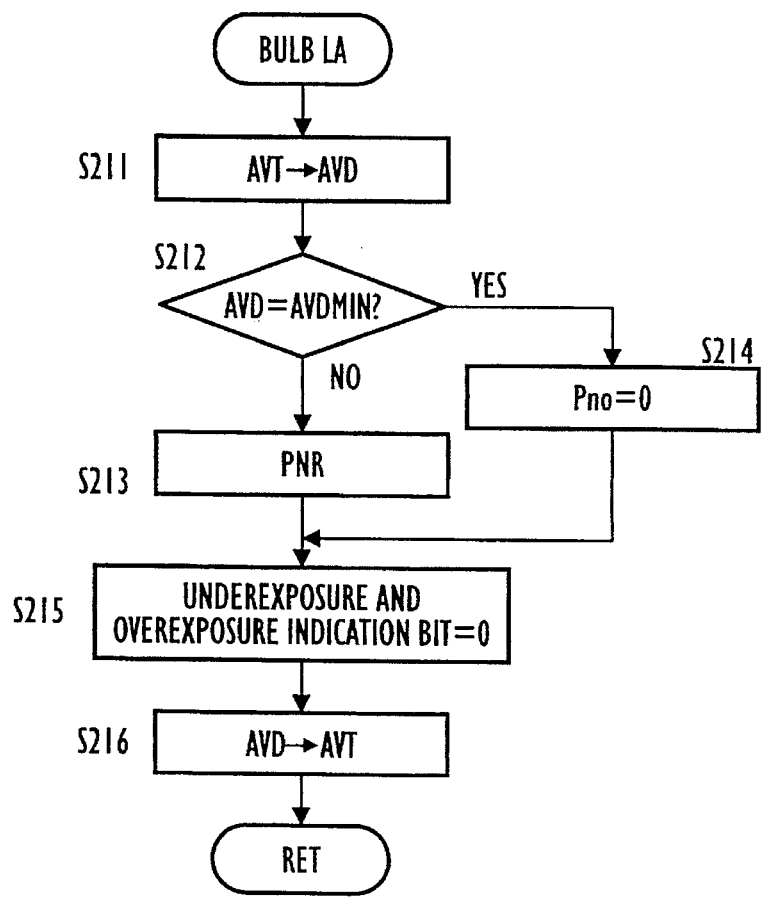
FIGS. 22 and 23 are flow charts of an LA bulb and LM bulb exposure mode operation, respectively, according to the present invention.
Figure 23:
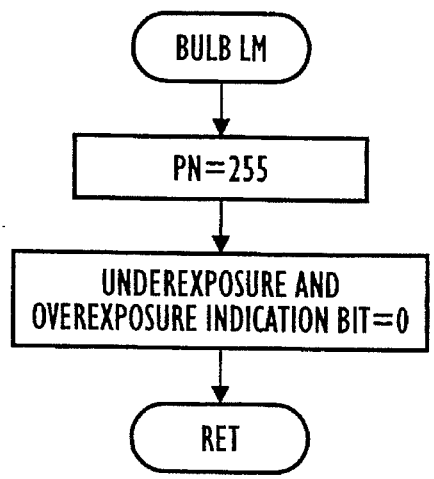

The bulb exposure mode will be discussed below with reference to FIGS. 22 and 23.

In the lens-auto bulb exposure mode, the transferring diaphragm value AVT set by the Av electronic dial 19 is read through the CPU-IPU communication and converted to the calculating diaphragm value AVD (step S211). Thereafter, the EE pulse number PN corresponding to the calculating diaphragm value AVD is calculated (steps S212 and S213), the underexposure and overexposure indication bits are reset. Then, the calculating diaphragm value AVD is again converted to the transferring diaphragm value AVT (steps S215 and S216). The operation is thus completed. If the calculating diaphragm value AVD is identical to the calculating minimum diaphragm value AVDMIN, the EE pulse number PN is set at "0" (steps S212, S214).

In the lens-manual bulb exposure mode, the EE pulse number PN is set at the greatest value, so that the stop-down mechanism can be driven to the diaphragm value set by the diaphragm ring of the taking lens. Thereafter, the underexposure and overexposure indication bits are reset to finish the operation.

IPU Main Routine

Figure 26:
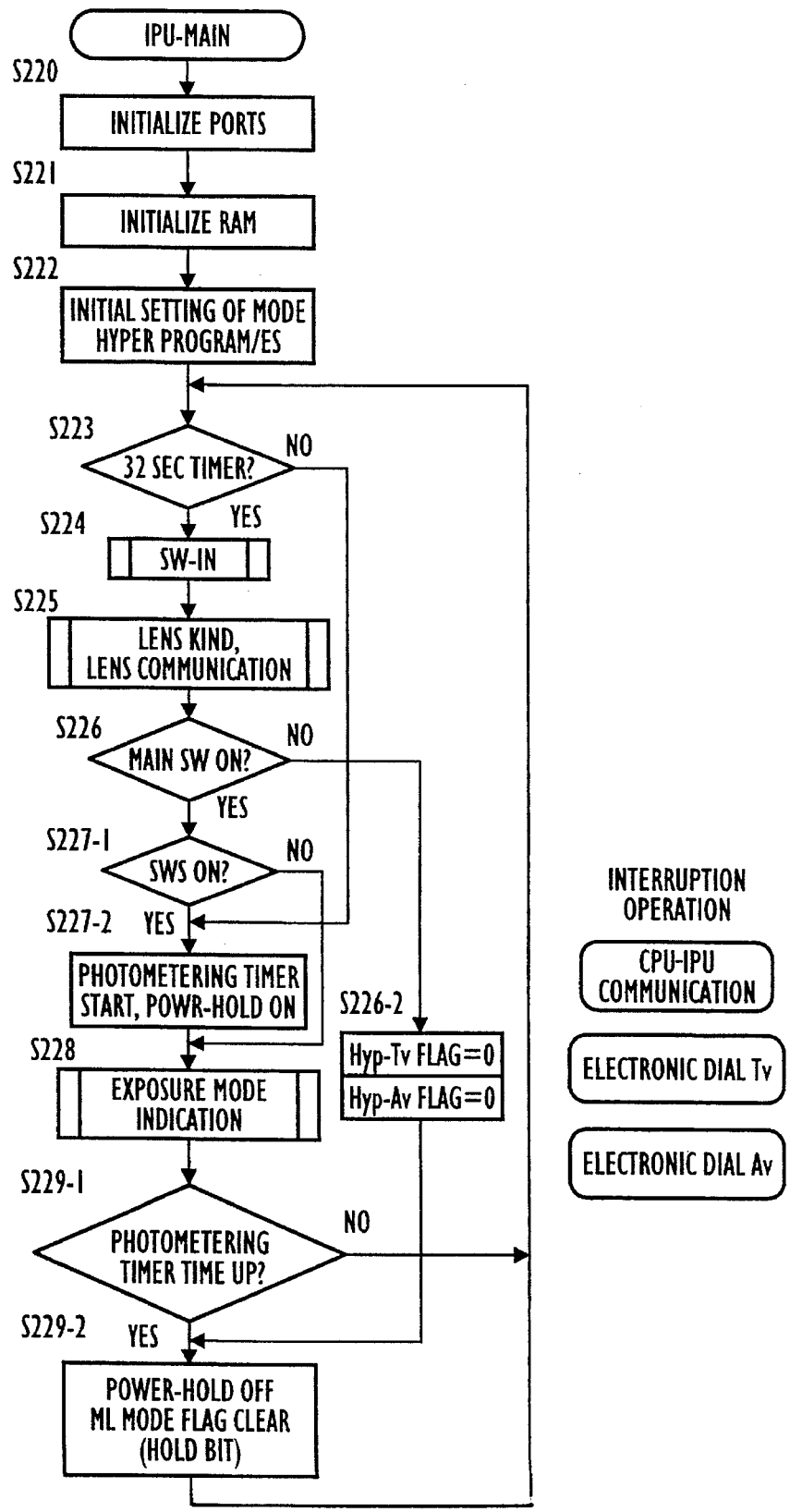
FIG. 26 is a flow chart of a main operation of an IPU, according to the present invention.

The above explanation has been directed to the operations of the CPU 41. The main routine of the IPU 43 will be explained below (FIG. 26). The photographic data, such as the manually set diaphragm value Av and shutter speed Tv, the indicating diaphragm value Av and shutter speed Tv, the selected exposure modes, the transferring diaphragm value AVT and shutter speed TVT transferred through the communication between the CPU 41 and the taking lens, the maximum F number FNo, and the minimum F number FNo are stored in the internal RAM 43b of the IPU 43 at different addresses thereof.

The IPU 43 always operates when the battery is in the camera performing IPU-MAIN shown in FIG. 26. The IPU 43 first initializes the ports thereof and initializes RAM 43b to carry out the initial setting of the modes (steps S220–S222). Thereafter, the exposure mode is set to its initial mode. The initial mode is determined in accordance with the state of the port PLO of the IPU 43 and is either the hyper program exposure mode or the diaphragm priority automatic exposure mode corresponding to the case of the lens-auto mode and the lens-manual mode, respectively.

Thereafter, intermittent operations are repeated by the 32 ms timer (steps S223–S229-2). The IPU 43 performs the following intermittent operations: When the set time of the 32 ms timer is up, the switch inputs, i.e., the levels of the switch input ports PC0–PB5 are successively inputted to IPU 43. If the level of the ports is "L" (ON), the input operation corresponding to the switches and the determination of the type of taking lens are performed, so that the data, such as the modes set by the switches or the lens type data, etc., is written into the RAM 43b, and the lens data is inputted to and IPU 43 through the communication with the lens (steps S223–S225). If the time of the 32 ms timer is not up, the control jumps to step S228 (steps S223 and S228).

Thereafter, whether the main switch SWMAIN is turned ON is checked. If the main switch is turned OFF, the Hyp-Tv flag and the Hyp-Av flag are reset to turn the power-hold OFF (i.e., turn the main power source of the CPU 41 OFF). Thereafter, the ML mode flag is reset (i.e., the hold bit is cleared), and the control is then returned to step S223 (steps S226, S226-2, S229-2). If the main switch SWMAIN is turned ON, it is checked whether the photometering switch SWS is turned ON. If the photometering switch SWS is turned ON, which usually means the picture taking operation has already begun, the photometering timer starts and the power-hold is activated to actuate the CPU 41 (steps S226, S227-1, S227-2 and S228). Thereafter, control proceeds to step S228. Conversely, if the photometering switch SWS is not turned ON, control skips the start of the photometering timer and the power-hold operation to step S228 (steps S226, S227-1 and S228).

In step S228, the diaphragm value (F) and the shutter speed (S-1) etc., used, in the photographing operation at the selected photographic mode are indicated in the LCD panel 69 and the indicator unit 71 within the finder. Thereafter, it is checked whether the set time of the photometering timer is up. If the set time is up, the power-hold is inactivated and the control is then returned to step S223. Conversely, if the time is not up, the control is directly returned to step S223 (steps S229-1, S229-2, S223).

If the intermittent operation by the timer is interrupted by the communication with the CPU41, the communication is performed. Similarly, if the electronic dials 17 and 19 are rotated, the electronic dial setting is carried out. Note that when the main switch SWMAIN is turned OFF, interruption does not occur.

Communication with Lens

Figure 27:
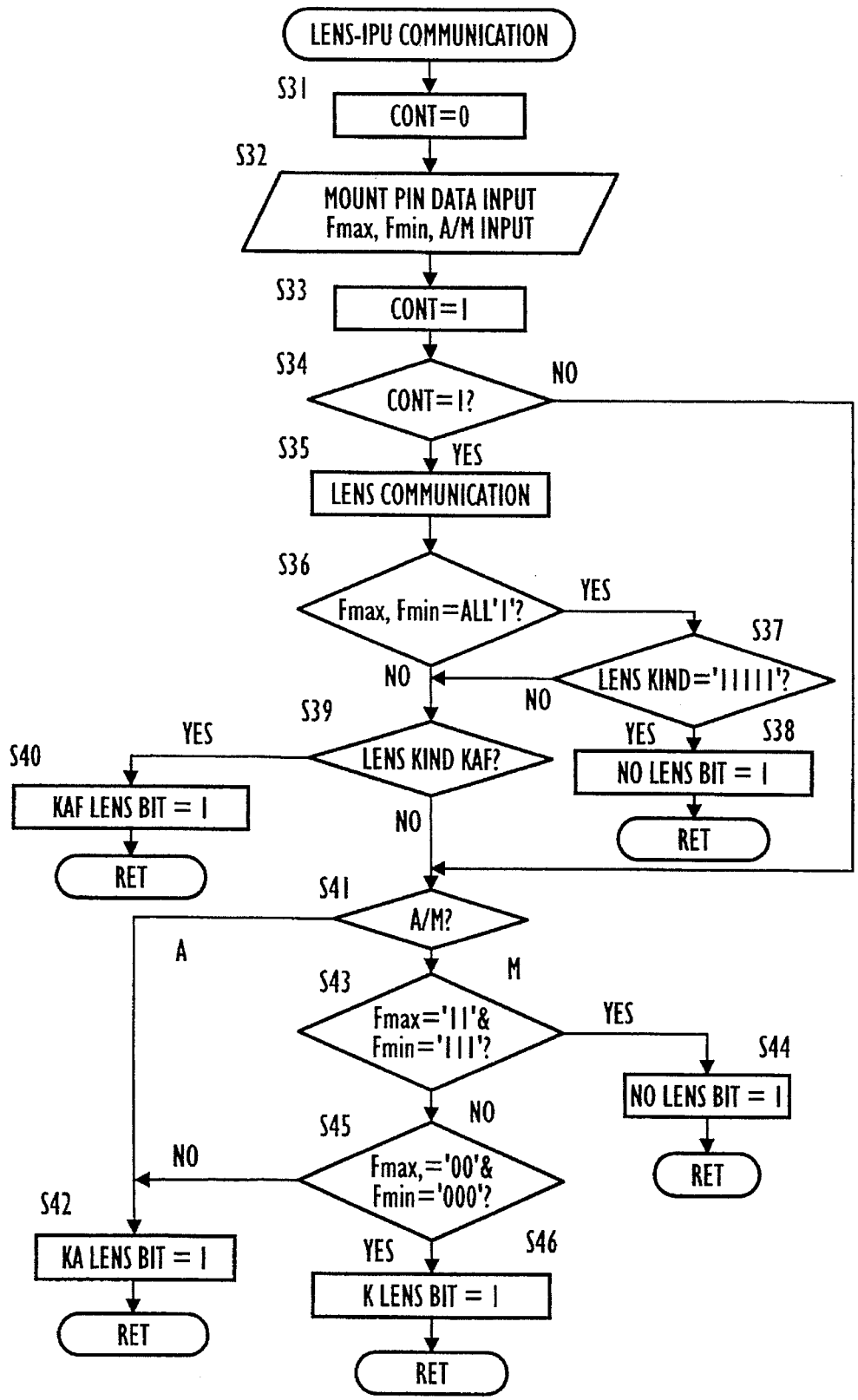
FIG. 27 is a flow chart of a communication operation between an IPU and a taking lens, according to the present invention.

The sub-routine of the communication with the lens CPU at step S225 will be described below with reference to FIG. 27. The CPU 43 drops the level of the pin CONT to "L" (Logic "0"), and receives the mount pin data (open F number Fmin, the maximum F number Fmax, and Auto/Manual (A/M) data input thereto (steps S31 and S32). As disclosed in Japanese Patent Kokai (Unexamined Publication) No. SHO 63-184719, filed in the name of the assignee of the present application, and corresponding to U.S. Pat. Nos. 4,841,322 and 4,945,376, the entire disclosures of which are expressly incorporated herein by reference, the pins of the taking lens coming into contact with the pins RES/Fmin3, SI/Fmin2, Fmax1, Fmax2 and ¯SCK¯/Fmin1 are connected to the transistors, so that the maximum F number Fmax of 2 bits and the open F number Fmin of 3 bits are constituted by the levels thereof in combination depending on the ON/OFF states of the transistors. Pin A/M is connected to the A/M selection switch SWA/M, so that the diaphragm Auto/Manual data of 2 bits is constituted by the ON/OFF states of the A/M selection switch.

The CPU 41 inverts the level of the pin CONT into logic "1" (i.e., level "H") to determine the presence of the automatic focusing (AF) lens KAF attached to the camera body and the kind of the attached lens (steps S33 and S34). The taking lens which can be discriminated in the present invention is a manual lens K having no mount pin, an auto lens KA having the mount pins but no lens ROM, or an auto AF lens KAF having the mount pins and the lens ROM.

If the level of the pin CONT is "1", the communication with the taking lens 65 is carried out and the lens data is input (steps S34 and S35). If the levels of the mount pins Fmax1, Fmax2, Fmin1, Fmin2 and Fmin3 are all "1", and if the 5 bits representing the kind of lens are "11111", it is determined that there is a problem with the lens. Accordingly, the no lens bit NoLens is set and the control is returned (steps S36, S37 and S38). If the level of at least one of the mount pins Fmax1~Fmax2, and Fmin1~Fmin3 is "0" and if the kind of lens discriminated is the AF lens KAF, the AF lens KAFLens bit is set to "1" control is returned (steps S36, S39 and S40).

Otherwise, it is determined whether or not the mode is the lens-auto or the lens-manual mode. If the mode is the lens-auto, the auto lens KALens bit is set to "1" and control is returned (steps S34~S36, S39, S41, S42).

If the mode is the lens-manual and if the levels of the pins Fmax1 and Fmax2 are "11" and the levels of the pins Fmin1~Fmin3 are "111", the no lens flag (NoLens bit) is set to "1" and control is returned, since the taking lens is not attached to the camera body (steps S43 and S44).

If the mode is the lens-manual mode and if the levels of the pins Fmax1 and Fmax2 are "00" and the levels of the pins Fmin1~Fmin3 are "000", the lens is the manual lens K. Accordingly the manual lens flag (KLens bit) is set to "1" and the control is returned (steps S45 and S46).

Unless the levels of the pins Fmax1 Fmax2, Fmin1~Fmin3 are all "1" or "0", the lens is the auto lens KALens in the lens-manual mode. Accordingly, the auto lens KAlens bit is set and the control is returned (steps S41, S43, S45 and S42).

Thus, the type of lens, the lens data, and the lens Auto/Manual data are set in the memory of the IPU 43 and are transferred to the CPU 41.

Figure 28:
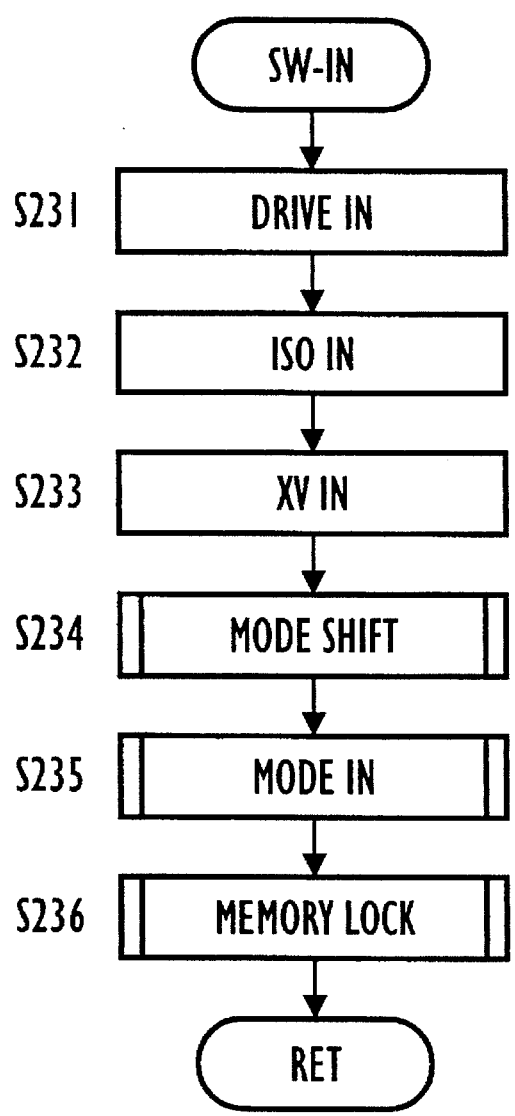
FIG. 28 is a flow chart of a switch input operation.

FIG. 28 shows a sub-routine of the switch input operation at step S224. If any one of the drive switch SWDRIVE, the ISO sensitivity setting switch SWISO, the exposure correcting switch SW±EF, and the exposure mode switch SEMODE is turned ON, the operation in the corresponding sub-routine (Note: only the mode shift and MODE IN sub-routines are shown in FIG. 28) is performed (steps S231~S233). Upon completion of the input operation, the mode shift operation, the MODE IN operation, and the memory lock operation are effected and the control is returned (steps S234~S236). The mode shift sub-routine, the MODE IN sub-routine and the memory lock sub-routine will be discussed hereinafter.

Operation of Electronic Dials

Figure 29:
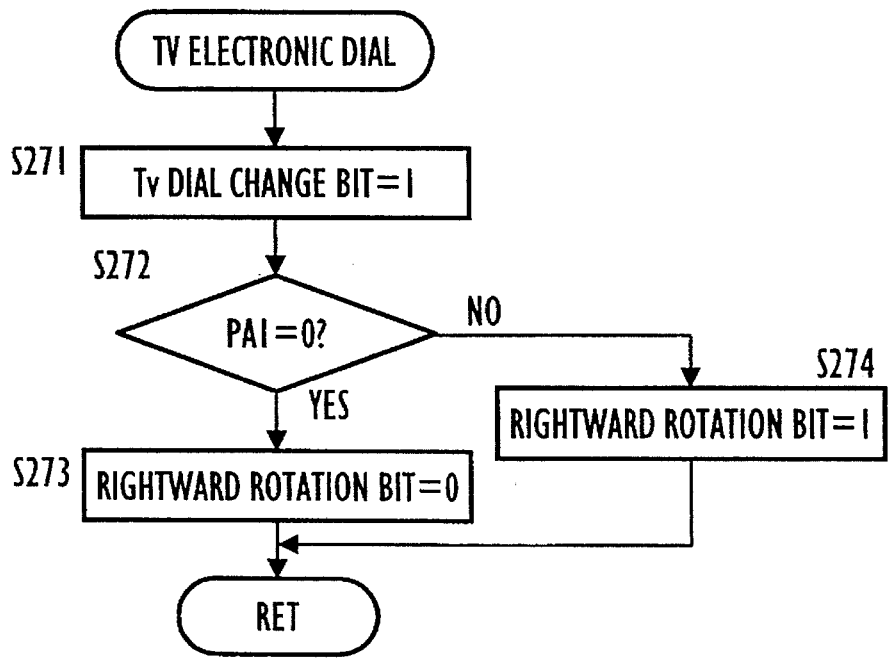
FIG. 29 is a flow chart of a Tv electronic dial operation.
Figure 30:
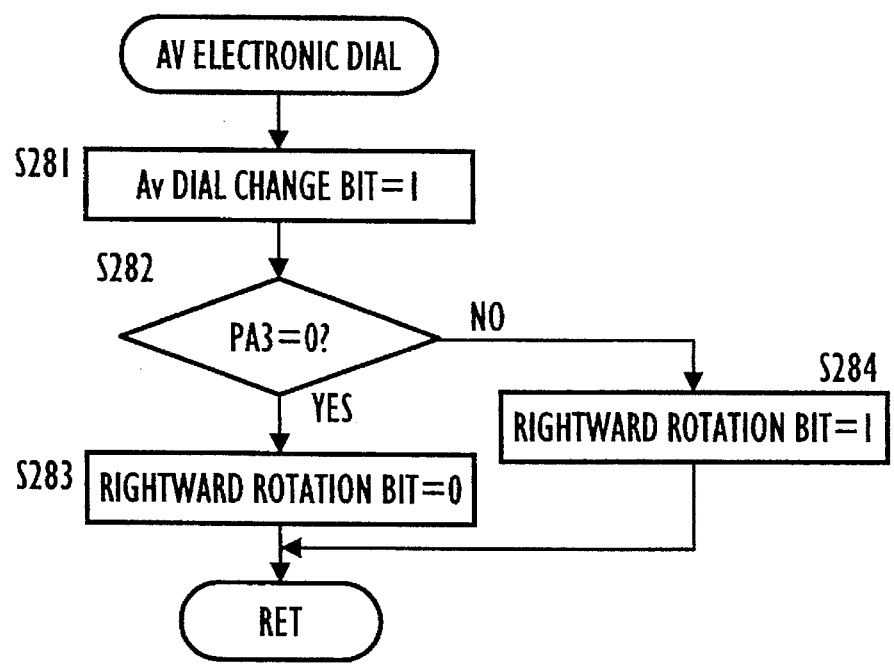
FIG. 30 is a flow chart of a diaphragm value AV changing operation as effected by an Av electronic dial.

FIGS. 29 and 30 show the sub-routines of the operations of the Tv and Av electronic dials 17 and 19. The main routine is interrupted by these sub-routines when the Tv or Av electronic dial 17 or 19 is rotated, so that any one of the ports PA0, PA1, PA2, PA3 is turned ON to set the associated Tv or Av dial change bit (steps S271, S281).

When the Tv electronic dial 17 is rotated, the direction of the rotation of the Tv electronic dial 17 is checked at step S272. If the Tv electronic dial 17 is rotated to the right (clockwise) direction, the port PA0 is set at "0" (the port PA1 remains at "1"), and the clockwise rotation bit is set. If the Tv electronic dial 17 is rotated to the left (counterclockwise) direction, the port PA1 is set at "0" (the port PA0 remains at "1"), and the right direction bit is reset. Then control is returned (steps S273 and S274).

Similarly, when the Av electronic dial 19 is rotated, the Av dial change bit is set, and the right direction bit is set or reset (steps S282~S284). The electronic dial change bits and the right direction bits are used in the setting operations of time Av and Tv electronic dials 17 and 19 and the exposure mode selecting operation, etc., which will be explained below.

Setting of Tv, Av Electronic Dials

Figure 31:
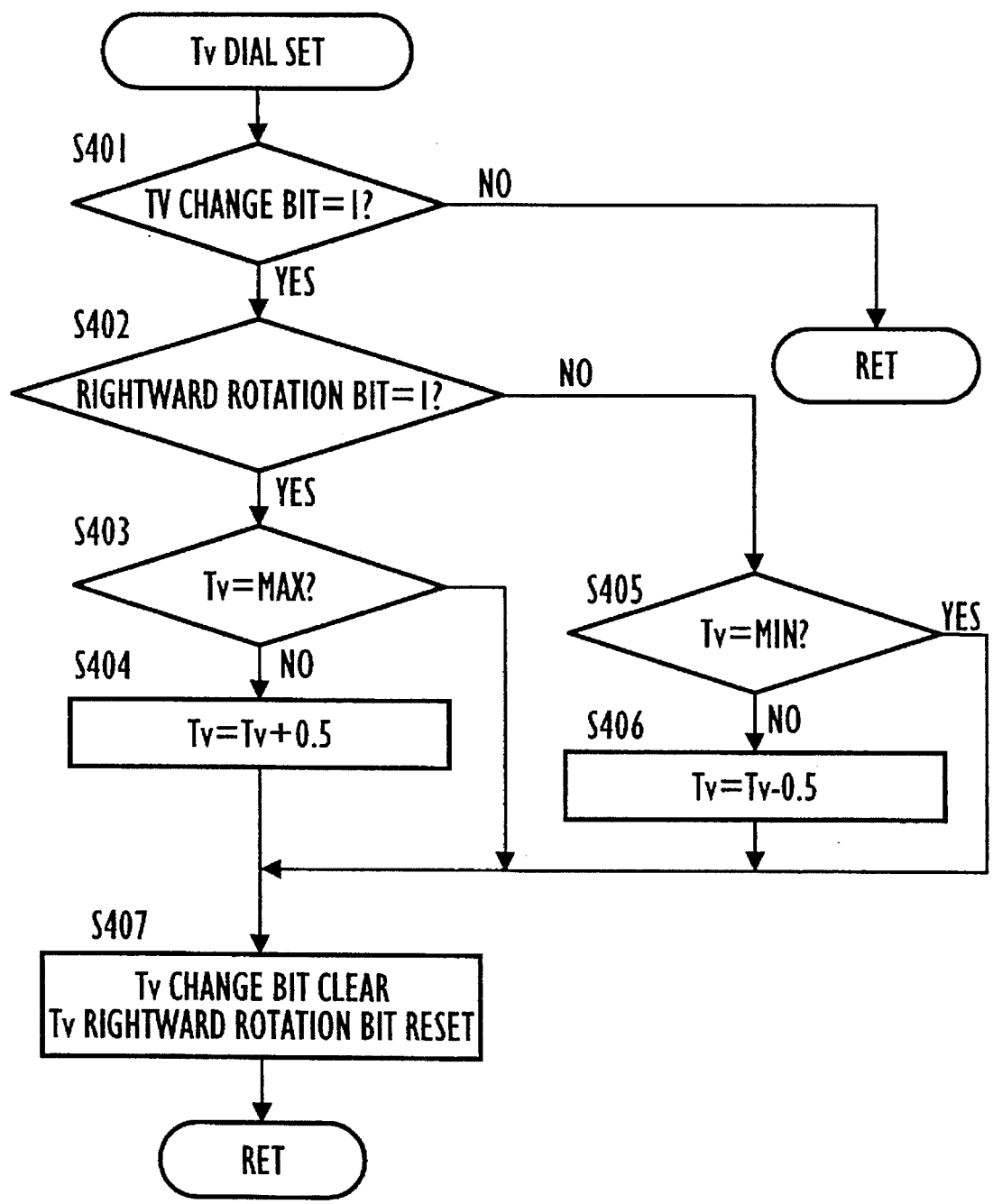
FIG. 31 is a flow chart of an Av electronic dial operation.
Figure 32:
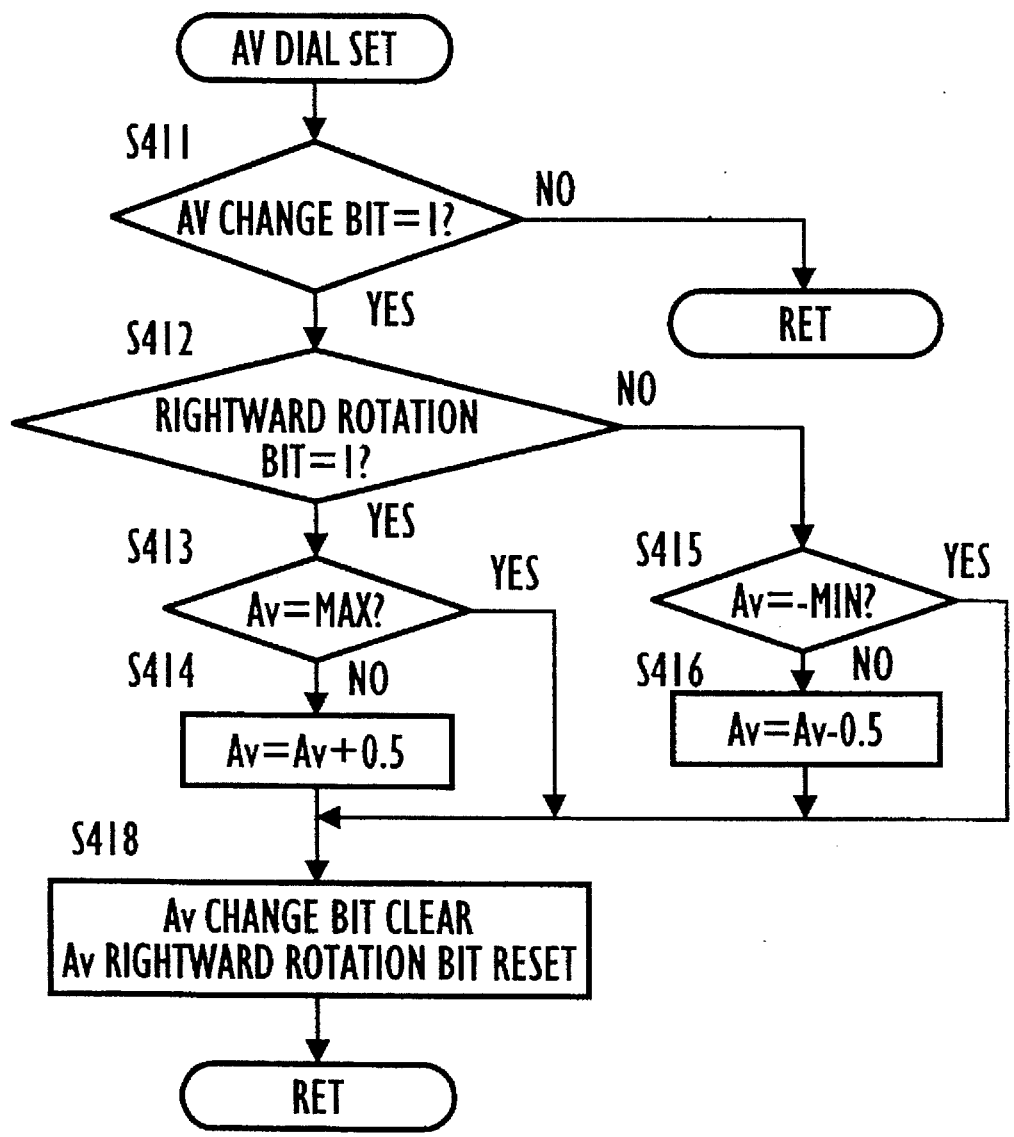
FIG. 32 is a flow chart of a shutter speed changing operation as effected by a Tv electronic dial.

The following discussion will be addressed to the operation of the IPU 43 in accordance with the sub-routine shown in FIGS. 31 and 32 when the electronic dial 17 or 19 is actuated in a specific exposure mode.

The specific exposure mode in the illustrated embodiment is either the program mode, the limited program mode, the hyper-program mode, the EE automatic mode, the lens-auto ES automatic mode, or the manual mode. Furthermore, in the illustrated embodiment, the shutter capacity of the camera is 30 sec.~1/8000 sec. (Tv=−5 Tv~+13 Tv) and the diaphragm capacity is the open F number Fmin (=Avmin)

read from the taking lens through the maximum F number Fmax (=Avmax). For clarification, it is assumed that Tv and Av are both ½ Ev.

Concerning the Tv dial check, the Tv dial change bit is first checked. If the bit is "0", the control is directly returned. If the bit is "1", it is checked whether the right direction rotation bit is set (steps S401, S402). If the right direction rotation bit is set (i.e., the Tv electronic dial 19 is rotated to the right direction), the shutter speed Tv is increased to the maximum shutter speed Tvmax ½ Tv by ½ Tv (steps S402, S403, S404). Conversely, if the right direction rotation bit is reset (i.e., the Tv electronic dial 19 is rotated to the left direction), the shutter speed Tv is decreased ½ Tv by ½ Tv until the minimum shutter speed Tvmin is reached (steps S402, S405, S406). Thereafter, the Tv dial change bit is cleared and the Tv right direction rotation bit is reset (step S407).

With respect to the Av dial check, if the Av electronic dial 17 is rotated to the right direction, the diaphragm value Av is increased ½ Av by ½ Av until the maximum diaphragm value Avmax is reached ( steps S411~S414). Thereafter, the Av dial change bit is cleared and the Av right direction rotation bit is reset (step S418). Conversely, if the Av electronic dial 17 is rotated to the left direction, the diaphragm value Av is decreased ½ Av by ½ Av until the minimum diaphragm value Avmin is reached (steps S411, S412, S415, S416). Thereafter, the Av dial change bit is cleared, the Av right direction rotation bit is reset (step S418), and the control is returned. The sub-routines of FIGS. 31 and 32 are called at the Tv dial set and the Av dial set, respectively, which will be discussed hereinafter.

Selection of Exposure Mode

Figure 33:
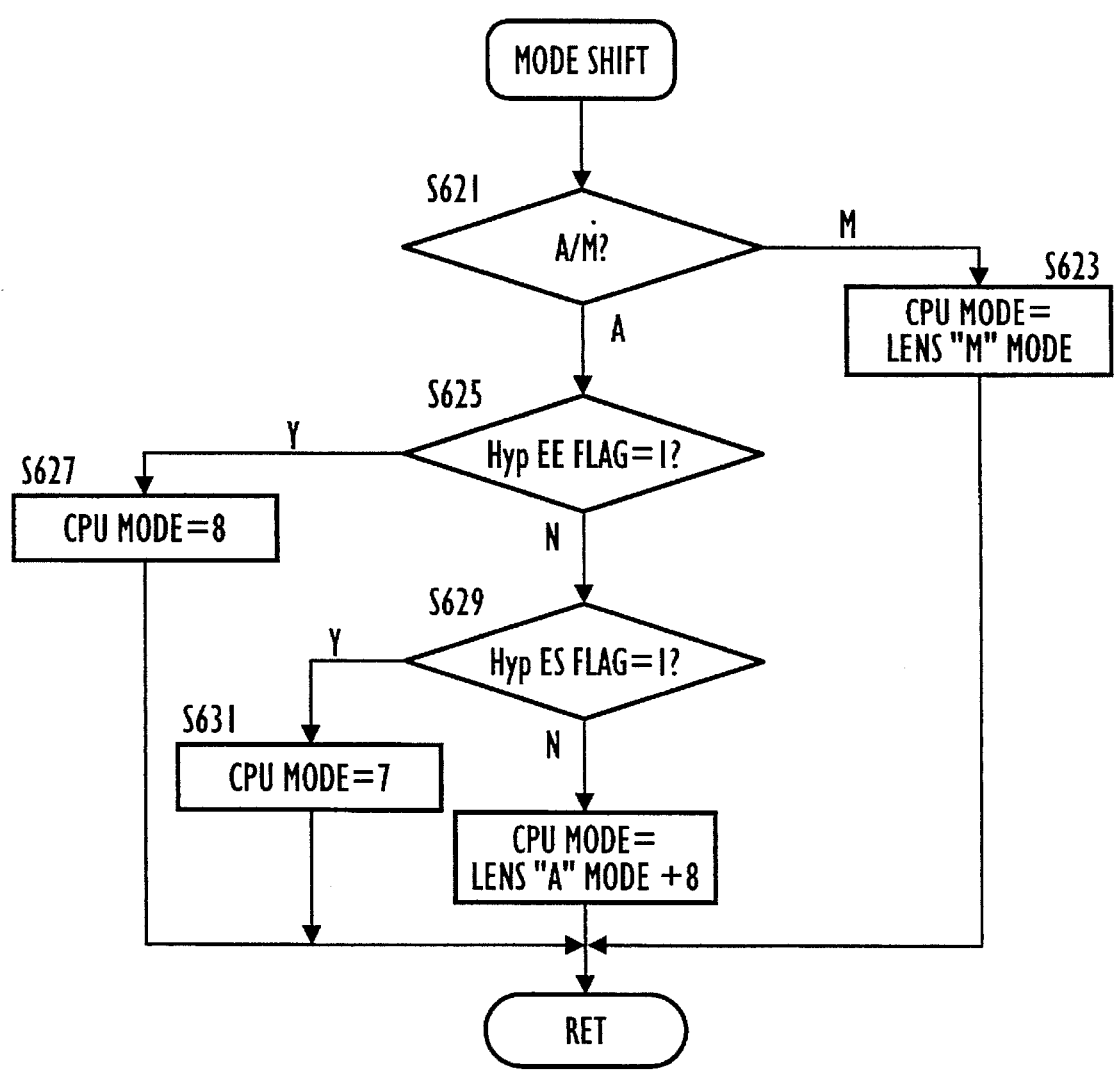
FIG. 33 is a flow chart of a mode shifting operation.
Figure 34B:
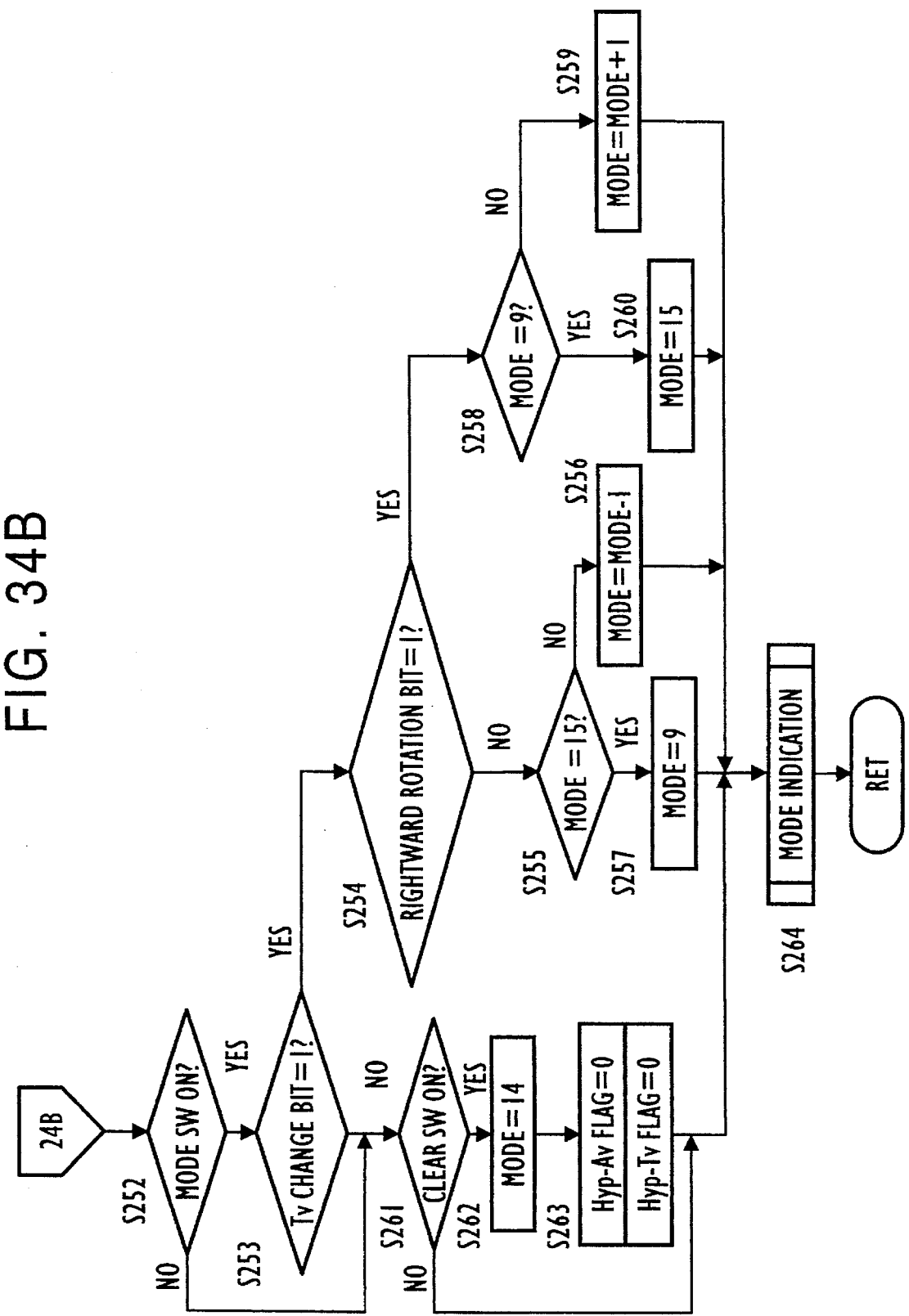
Figure 35:
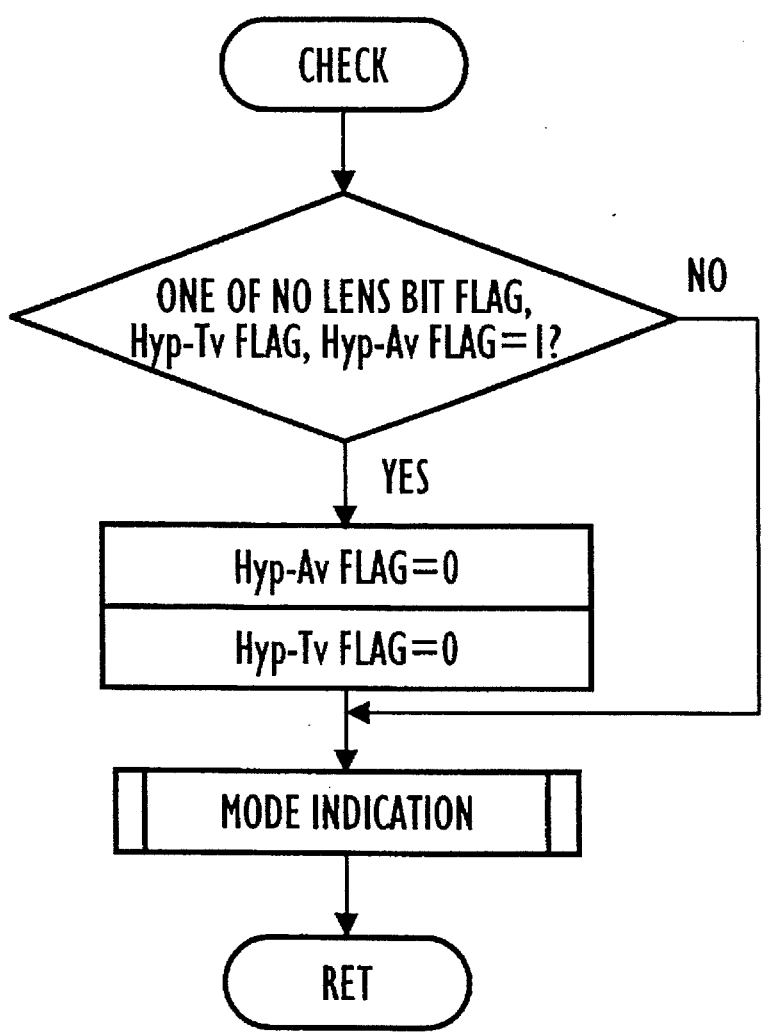
FIG. 35 is a flow chart of a checking operation.

FIGS. 33, 34A and 34B show sub-routines of the selection or modification operation of the exposure modes. The change of the exposure modes is effected by the IPU 43 in accordance with the program memorized in the internal ROH 43a of the IPU 43.

Mode Shift

The mode shift operation is effected to convert the IPU exposure mode to the CPU exposure mode. Namely, the IPU mode which is used in the IPU 43 is converted to the CPU mode which is used in the CPU 41. Table 4 (attached to the end of the specification) shows a relationship between the IPU mode NO. and the CPU mode No.

In the mode shift operation (FIG. 33), the IPU 43 checks the lens diaphragm mode. If the lens diaphragm mode is a manual mode, the CPU mode is set to be the lens-manual mode (i.e., one of IPU modes LB (0~2) is set as the CPU node) and the control is returned (steps S621 and S623). If the hyper-Tv flag and the hyper-Av flag are both cleared in the lens-auto mode, the CPU mode corresponds to the lens-auto mode plus 8, and the control is returned. If the hyper-Tv flag is set, the CPU mode is set at "8", and the control is returned (steps S621, S625, S629 and S631).

Mode-In

The mode-in operation (step S235) is performed as a sub-routine of the SW-IN operation (step S224) when the exposure mode/drive lever 29 is moved to the MODE side i.e., when the exposure mode switch SWMODE is turned ON, during the intermittent operation by the 32 ms timer. The variation of the exposure modes is effected by the Tv electronic dial 17 when the exposure mode/drive lever 29 is moved to the MODE side. The exposure modes corresponding to the exposure mode numbers are shown in Table 4 mentioned above.

The mode-in operation will be described below in more detail with reference to FIGS. 34A and 34B. The hyper-EE and hyper-ES modes have no independent mode No. and have an exposure mode No. (14) which is the same as that of the hyper program. The hyper-EE and hyper-ES modes can be discriminated by the Hyp-TV and Hyp-Av flags, respectively.

The taking lens in the illustrated embodiment has an auto/manual selection switch SWA/M which is actuated by the diaphragm ring thereof. When the auto/manual selection switch SWA/M is moved to the manual side, the diaphragm is set on the taking lens side. If the lens-manual mode is detected at step S241, the control proceeds to step S242 to select a desired exposure mode from among the LM diaphragm priority (ES) automatic exposure mode (exposure mode No. 2), the LM hyper-manual exposure mode (exposure mode No. 1) and the LM bulb exposure mode (exposure mode No. 0). The LM diaphragm priority automatic exposure mode (exposure mode No. 2) is the initial exposure mode.

At step S242, it is determined whether the mode switch SWMODE is turned ON. If the mode switch SWMODE is turned ON, it is checked whether the Tv electronic dial 17 is actuated (i.e., the Tv dial change bit is set). If there is no change, the Tv dial change bit is reset, and the control then proceeds to the checking sub-routine. If there is a dial change, the direction of rotation of the dial is checked (steps S243, S244 and S251).

When the Tv electronic dial 17 is rotated to the leftward direction (counterclockwise direction), i.e., if the right direction bit is "0", the exposure mode is switched from the LM diaphragm priority mode to the LM hyper-manual mode and the LM bulb mode in this order one by one. After the Tv dial change bit is reset, the control jumps to the check sub-routine (steps S241~S247 and S251).

When the Tv electronic dial 17 is rotated in the right direction (the right direction bit is "1"), the exposure mode is changed in the order opposite to the above-mentioned order. After the Tv dial change bit is reset, the control jumps to the check sub-routine (steps S244, S248~S251).

If the exposure mode switch SWMODE is turned OFF, or if the Tv electronic dial 17 is not actuated (the Tv dial change bit is "0"), the Tv dial change bit is reset without modifying the exposure mode, so that the control jumps to the check sub-routine (steps S242, S243 and S251).

Check Sub-routine

In the check sub-routine, if one of the NOLens bit flag, the hyper-Av flag, or the hyper-Tv flag is set, the mode indication operation is carried out after the hyper-Av flag and the hyper-Tv flag are reset. The hyper-Av flag and the hyper-Tv flag represent the AE mode. Namely, although the hyper-EE mode and the hyper-ES mode are not included in the types of AE modes, the hyper-EE mode and the hyper-ES mode can be discriminated by the hyper-Av flag and the hyper-Tv flag, respectively.

Consequently, the hyper program No. 14 and the hyper Tv flag are set in the hyper-EE mode, and the hyper program No. 14 and the hyper Av flag are set in the hyper-ES mode, respectively.

To return the mode from the hyper-EE mode or hyper-ES mode to the respective hyper program modes, the hyper-Av flag or the hyper Tv flag is reset. The hyper-Av flag and the hyper-Tv flag are always reset in the lens-manual mode by the check sub-routine. Accordingly, when the auto/manual selection switch SWA/M is switched from "MANUAL" to "AUTO", or when the taking lens is detached from, and again attached to the camera body, the exposure mode is initialized to be the hyper-program exposure mode.

If the taking lens is the auto-lens, and accordingly, the auto/manual selection switch SWA/M is switched to "AUTO", the exposure mode is switched mode by mode in the following order: program mode→ hyper-program mode→ limited program mode→ . . . → LA bulb mode→ program mode. The exposure mode is indicated (steps S241, S251–S257, S264), when the exposure mode switch SWMODE is turned ON and the Tv electronic dial 17 is rotated in the leftward direction. If the Tv electronic dial 17 is rotated to the right direction, the exposure mode is changed in the order opposite to the above-mentioned order and is then indicated (steps S258–S260 and S264).

If the taking lens is an auto-lens and if one of the exposure mode switch SWMODE or the Tv electronic dial 17 is turned OFF, exposure selection operation is not effected (steps S241, S251–S253, S261). If the clear button 23 is not turned ON (i.e., clear switch SWCL is not turned ON), the latest exposure mode is indicated (steps S261 and S264).

If the clear button 23 is turned ON, and if the exposure mode is the hyper-EE mode or the hyper ES mode, the exposure mode is initialized to be the hyper-program mode. If the exposure mode is neither the hyper-EE mode nor the hyper ES mode, the current exposure mode is maintained. Namely, since the hyper-Tv flag or the hyper-Av flag is set when the exposure mode is the hyper-EE mode or the hyper-ES mode, the flag is reset (steps S261 and S263). Consequently, when the photographer presses the clear button 23, the hyper-EE automatic exposure mode or the hyper-ES automatic exposure mode is returned to the hyper-program exposure mode.

In the exposure mode selection operation mentioned above, it is impossible to directly select the hyper-EE or hyper-ES automatic exposure mode. The selection of hyper-EE or hyper-ES automatic exposure mode is effected by the electronic dial 17 or 19 widen the hyper-program exposure mode is selected. Namely, when the electronic dial 17 or 19 is actuated at the hyper-program mode, the hyper-Tv flag or the hyper-Av flag is set, so that the mode can be compulsively changed to the hyper-EE or hyper-ES automatic exposure mode. Furthermore, when the electronic dial 17 or 19 is actuated at the hyper-EE or hyper-ES program mode, the mode can be compulsively changed to the hyper-ES or hyper-EE automatic exposure mode, respectively. If the clear button 23 is turned ON, the hyper-EE or hyper-ES automatic exposure mode can be compulsively changed to the respective hyper-program exposure modes. The indication of the compulsive change of the exposure mode is performed in the exposure mode indication operation which will be discussed hereinafter.

Figure 36:
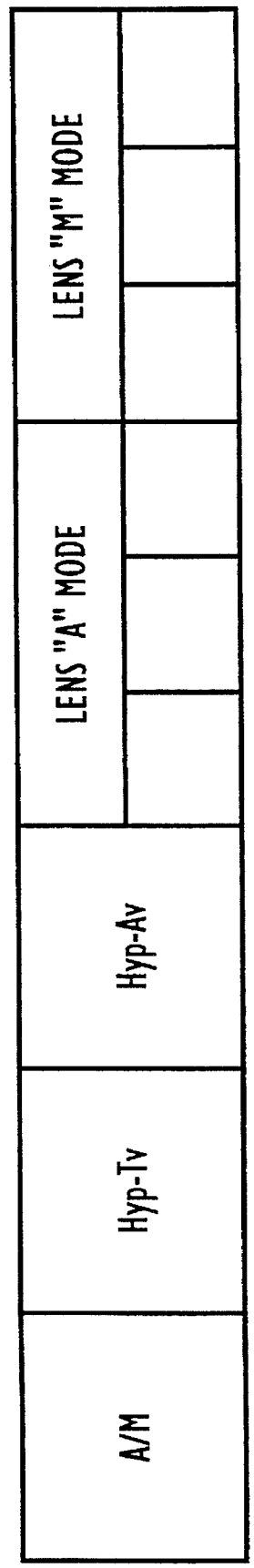
FIG. 36 is an example of data storage in a RAM of an IPU.

In the illustrated embodiment, the exposure modes in the lens-auto mode and the lens-manual mode are designated with serial numbers. However, in practice, the exposure modes in the lens-auto mode and the exposure modes in the lens-manual mode are stored in the memory of the IPU 43 as separate data. Furthermore, the lens-auto/lens-manual (A/M) data, the Hyp-Tv flag and the Hyp-Av flag are separately allocated in the memory of the IPU 43, as can be seen in FIG. 36.

The exposure mode is determined in accordance with the 3-bits for the lens-auto mode and the Hyp-Tv or Hyp-Av flag when the auto/manual data (A/M terminal), which is switched by the diaphragm ring of the talking lens, is "AUTO", i.e., "0". On the other hand, when the auto/manual data (A/M terminal ) is "MANUAL", i.e., "1", the exposure mode is determined in accordance with the 2-bits for the lens-manual mode.

The exposure mode data of 4-bits including both the auto exposure mode and the manual exposure mode is sent to the CPU 41. The correspondence in the exposure modes (IPU mode and CPU mode) between the IPU and CPU is shown in Table 4 listed above.

Memory Lock

Figure 38:
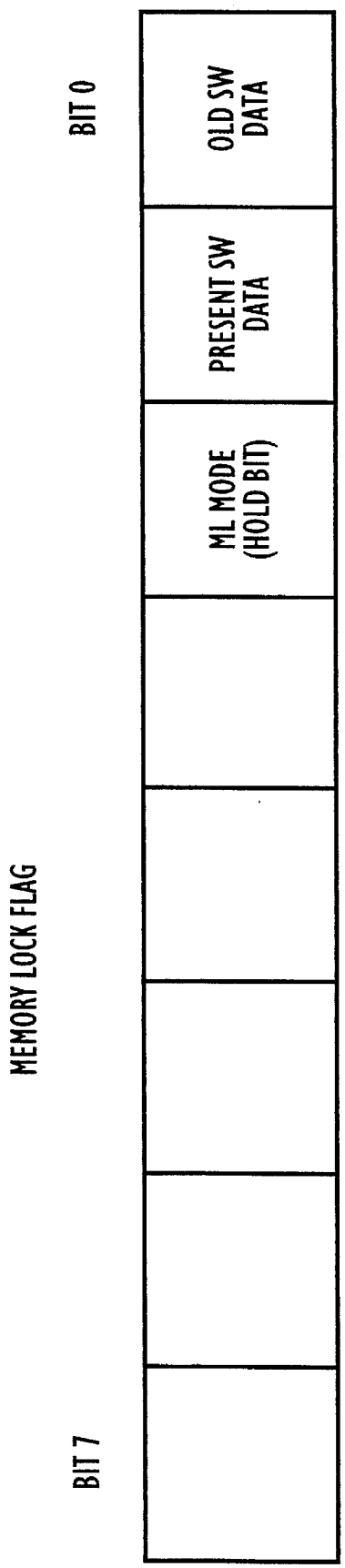
FIG. 38 is an example of a memory locking flag in a RAM of an IPU.

In the memory lock operation, the exposure value Ev is locked in the memory when the hold button 25 is pressed once and the lock is released when the hold button 25 is pressed twice. Namely, every time the hold button 25 is turned ON and OFF, the memory lock of the exposure value Ev and the release thereof are repeated. For example, 3 bits within the memory lock flag data in the RAM 43b are employed in the memory lock operation. As can be seen in FIG. 38, one bit is the ML mode flag (hold bit), another bit is the present hold switch data, and another bit is the old hold switch data. All of these data are cleared at the initial state.

Figure 37:
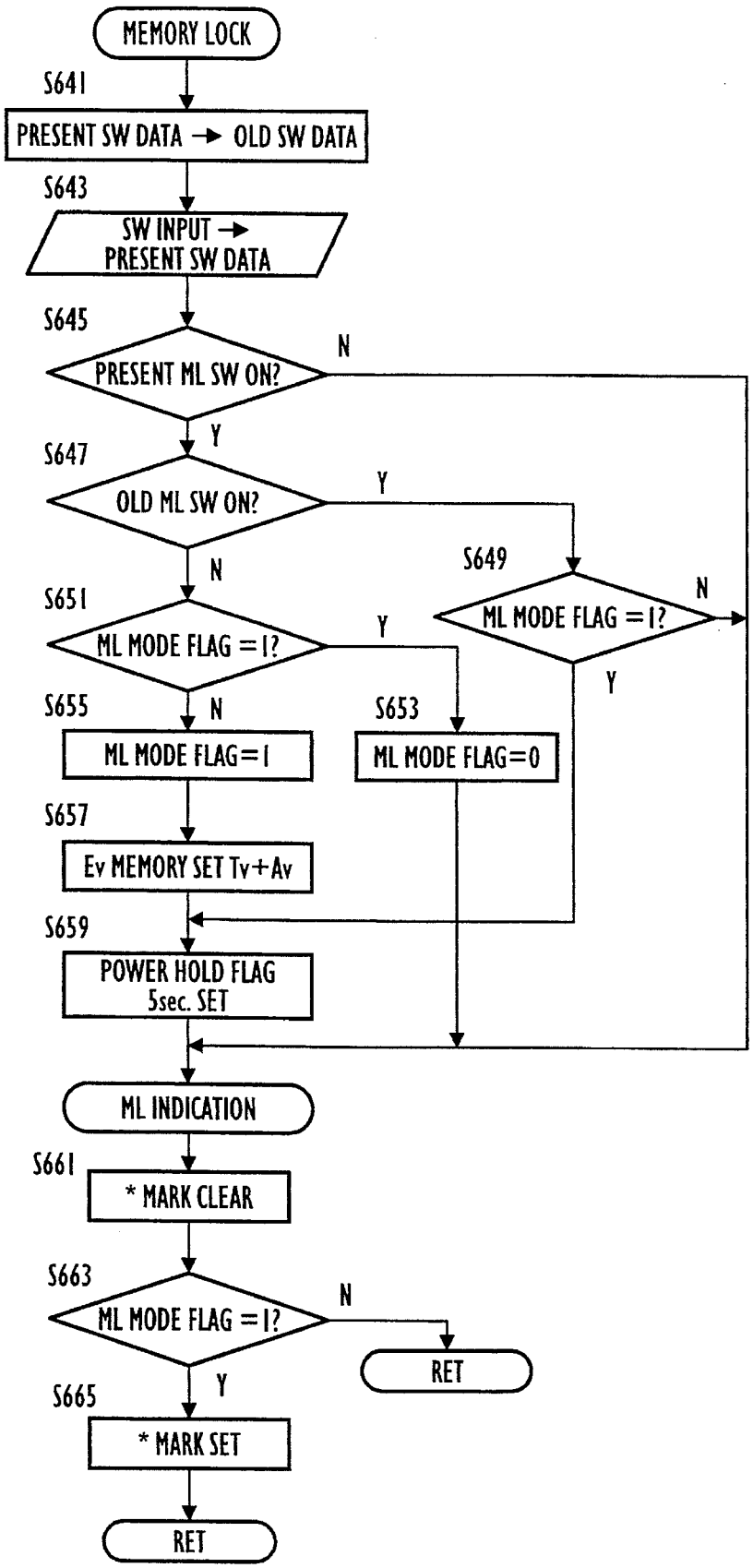
FIG. 37 is a flow chart of a memory locking operation.

The memory lock operation at step S236 is performed as follows (FIG. 37): In this operation, every time the hold switch 25 is ON and OFF, the ML mode flag is set and reset.

First, the present hold switch data is transferred to the old hold switch data, so that the ON/OFF state of the hold switch 25 is input to input to the present hold switch data (steps S641 and S643). Namely, when the hold switch is turned ON and OFF, the ML mode flag is set at "0" and reset is set at "1", respectively. The hold switch 25 is a normally open self-returning type. Generally speaking, since the processing time of the microcomputer is extremely short, the memory lock sub-routines are repeated several times while the photographer actuates the hold switch 25.

Thereafter, the state of the present hold switch data is checked (step S645). Since the ML mode flag is reset when the hold switch 25 Is turned OFF, the control proceeds to the memory lock indication operation. Since when the hold switch 25 Is turned ON, the ML mode flag is set, the control proceeds to step S647 to check the old hold switch data. Upon the first operation when the hold switch 25 is turned ON, or upon the second and subsequent operations when the hold switch 25 is turned OFF, the ML mode flag is reset. Accordingly, control proceeds to step S651. Upon the second and subsequent operations when the hold switch 25 is turned ON or upon the first operation when the hold switch 25 is turned OFF, the ML mode flag is set. Accordingly, the control proceeds to step S649.

Whether the ML mode flag is set is checked at step S651. If the ML mode flag is set, the flag is cleared. If the flag is cleared, the ML mode flag is set (steps S655 and S653). When the ML mode flag is set, the current exposure value Ev is stored (locked), and the power hold flag is set for 5 sec. Thereafter, the control proceeds to the ML indication operation (steps S655, S657 and S659). If the ML mode flag is cleared, the control directly proceeds to the ML indication operation (steps S651 and S653).

At step S649, it is determined whether the ML mode flag is set. When the hold switch 25 is turned ON, the ML mode flag is set. Accordingly, control proceeds to step S659. Conversely, when the hold switch 25 is turned OFF, the ML mode flag is cleared. Accordingly control directly proceeds to the ML indication operation.

In the ML indication operation, the asterisked mark indication flag is cleared. If the ML mode flag is reset, the control is returned. If the ML mode flag is set, the asterisked mark indication flag is set, and then the control is returned (steps S663 and S665). When the hold switch 25 is turned OFF, the present ML switch data, the old ML switch data and the ML mode flag are all cleared.

Exposure Mode Indication; Mode and Set Value Modification

Figure 41A:
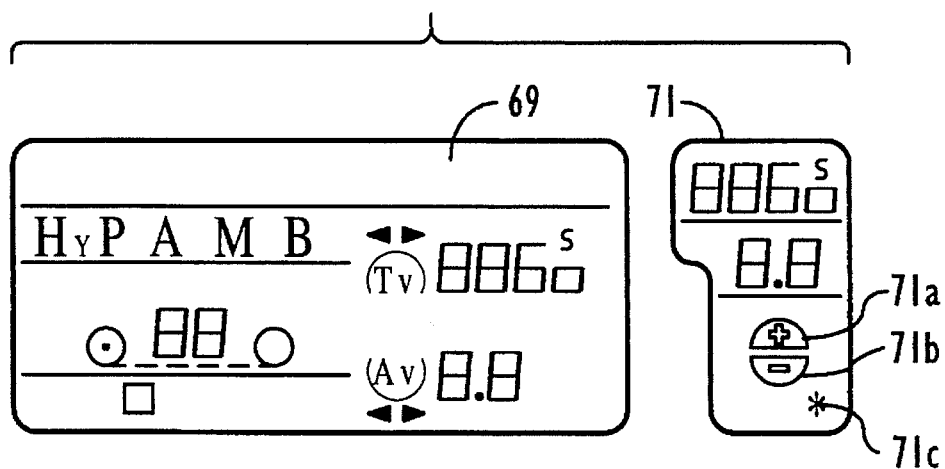
FIGS. 41A, 41B, 41C, 41D, 41E, and 41F show an indication of an LCD panel and an indication unit within a finder shown in various initial indication positions.
Figure 41B:
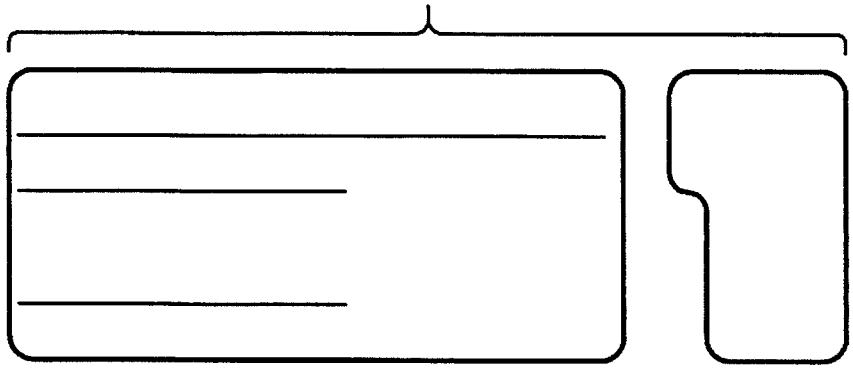

Examples of the indication of the LCD panel 69 and the indicator unit 71 within the finder are shown side by side to the left and right, respectively, in FIGS. 41A through 41F, FIGS. 42A through 42F, and FIGS. 43A through 43C. In FIG. 41A, all the indicating elements (liquid crystal segments) such as letters, harks, symbols and figures, etc., constituting the indication information are shown. FIG. 41B shows the indication (display) when the main switch SWMAIN is turned OFF. The other figures show various indication examples. The relationship between the exposure mode indication operation and the indication (display) will be described below with reference to FIGS. 39A through 39D. The exposure mode indication operation is carried out in the IPU 43 in accordance with the program stored in the ROM 43a of the IPU 43.

When the taking lens attached to the camera body is an auto-lens, the control proceeds to step S302 from step S301 to perform the following operations:

Hyper-Program Exposure Mode

Figure 42A:
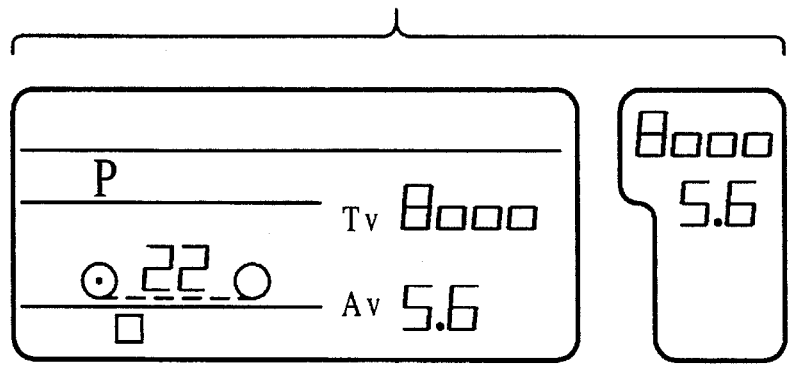
FIGS. 42A, 42B, 42C, 42D, 42E, 42F, 42G and 42H show various exposure modes indicated on an LCD panel and an indication unit within a finder.
Figure 42B:
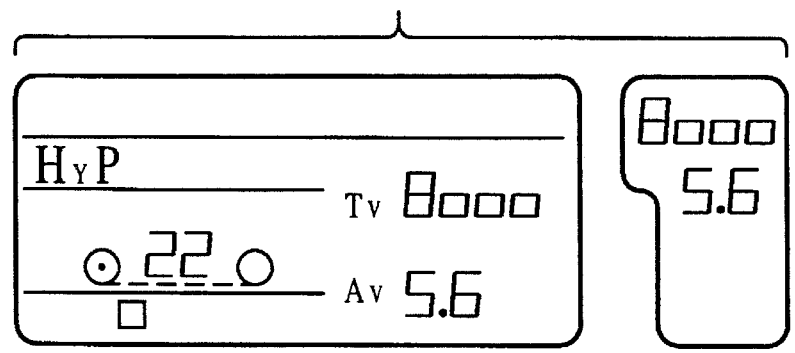

If the hyper-program exposure mode is set, but none of the electronic dials 17 and 19 are actuated, the hyper-program exposure mode is indicated as shown in FIG. 42B. Namely, "Hy P" representing the hyper-program exposure mode, "Tv 8000" representing the initial value (1/8000 sec.) of the shutter speed, "Av 5.6" (=F5.6) representing the initial value of the diaphragm value, "22" representing the number of the photographed frames of film all appear in the LCD panel 69, and the initial values of the the shutter speed Tv and the diaphragm value Av appear in the indicator unit 71 within the finder (steps S302 through S308).

The IPU 43 reads the optimum shutter speed Tv (transferring shutter speed TVT) and the optimum diaphragm value Av (transferring diaphragm value AVT), calculated in the hyper-program exposure sub-routine by the CPU 41, provided that the power to CPU 41 is held (remains ON) and stores the data in the RAM 43b at predetermined addresses thereof (steps S309 and S310). The transferring shutter speed TVT and the transferring diaphragm value AVT, stored in the RAM 43b are indicated in the LCD panel 69 and the indicator unit 71 within the finder provided that the power to CPU 41 is held.

Figure 42C:
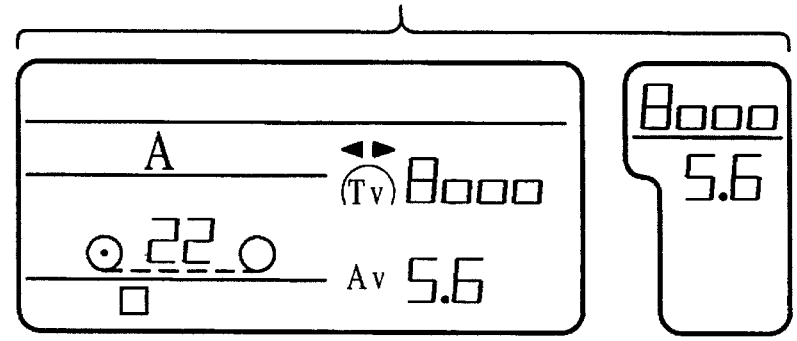

When the Tv electronic dial 17 is actuated (i.e., when the Tv dial change bit is set at "1"), the hyper-Tv flag is set and the hyper-Av flag is reset thereby actuating the hyper-EE automatic exposure mode (steps S303 and S311). Thereafter, the shutter speed Tv is modified in accordance with the operation of the Tv electronic dial 17, with the modified shutter speed being stored in the RAM 43b at a predetermined address thereof and the hyper-EE automatic exposure mode and the set shutter speed Tv, etc., being indicated in the LCD panel 69 and the finder indicator unit 71, as shown in FIG. 42G (steps S312 and S313).

The initial value of the set diaphragm value Av is a value calculated at the hyper-program exposure mode or the hyper-EE exposure mode. Note that in FIG. 42G, the three quarter circle which surrounds the symbol "Tv" and the two black arrows located above the symbol "Tv", in the LCD panel, and the line underlining the numeral "4000" in the finder indicator unit 71 represent the feasibility of the shutter speed Tv modification by rotation of the Tv electronic dial 17.

While the power to CPU 41 is held, the IPU 43 reads (or receives) data (AVT) corresponding to the optimum diaphragm value Av (AVD), calculated in the hyper-EE automatic exposure sub-routine, and stores the data in the RAM 43b while indicating the same in the LCD panel 69, etc. (steps S314 and S315).

When the Av electronic dial 19 is actuated (i.e., when the Av dial change bit is "1"), the hyper-Av flag is set and the hyper-Tv flag is reset thereby actuating the hyper-ES automatic exposure mode (steps S304 and S316). The diaphragm value Av is varied in accordance with the direction of rotation of the Av electronic dial 19, so that the modified diaphragm value Av is stored in the RAM 43b. The hyper-ES automatic exposure mode and the modified diaphragm value Av are indicated in the LCD panel 69 and the finder indicator unit 71, as shown in FIG. 42H (steps S317 and S318).

The initial value of the set diaphragm value Av is a value calculated in the hyper-program exposure mode or the hyper-EE exposure mode. Note that in FIG. 42H, the three quarter circle which surrounds the symbol "Av" and the two black arrows located below the symbol "Av", in the LCD panel, and the line underlining the numeral "8.0" in the finder indicator unit 71, represent the feasibility of the diaphragm value Av modification by rotation of the Av electronic dial 19.

The IPU 43 reads data (TVT) corresponding to the optimum shutter speed Tv (TVD) calculated in the hyper-ES automatic exposure sub-routine and stores the data in the RAM 43b, provided that power to the CPU 41 is held. The stored data is indicated in the LCD panel 69 and the finder indicator unit 71 (steps S319 and S320).

When the hyper-EE or ES automatic exposure mode is selected (i.e., when the hyper-Tv or hyper-Av flag has already been set), the IPU 43 stores the optimum transferring shutter speed TVT and the optimum transferring diaphragm value AVT, calculated in the hyper-ES or hyper-EE automatic exposure sub-routine by the CPU 41, into the RAM 43b and displays the same on the LCD panel 69, etc., even if neither of the electronic dials 17 or 19 are actuated. Nevertheless, the IPU 43 does not perform the modification of the diaphragm value Av or the shutter speed Tv (steps S303~S305, S313~S315 or S303~S306, S319~S320).

Thus, the photographer can rotate the Tv electronic dial 17 to switch the hyper-program exposure mode to the hyper-EE automatic exposure mode and select the shutter speed Tv. Similarly, it is possible for the photographer to switch the hyper-program exposure mode to the hyper-ES automatic exposure mode and select the diaphragm value Av by rotating the Av electronic dial 19. In the illustrated embodiment, upon switching exposure modes, the optimum shutter speed or the optimum diaphragm value, calculated in the previous exposure mode, become the initial value of the exposure factor (i.e., the shutter speed or the diaphragm value) which can be set at the newly selected exposure mode. The initial value of the exposure factor, set at the newly selected exposure mode, can again be varied by the subsequent operation of the electronic dial 17 or 19. Alternatively, it is possible to adopt a control system in which the exposure factors are modified at the time the exposure mode is changed.

As can be understood from the above discussion, the mode can be switched from the hyper-EE automatic exposure mode or the hyper-ES automatic exposure mode to the hyper program exposure mode when the clear button 23 is turned ON. The change from the hyper-EE automatic exposure mode to the hyper-ES automatic exposure mode and vice versa can be effected by the rotation of the Av electronic dial 19 and the Tv electronic dial 19, respectively. In the illustrated embodiment, widen the hyper-program exposure mode is selected, the diagrams shown as a solid line, a dotted line and a dotted and dashed line in FIG. 10 can be easily obtained by actuating the clear button 23 and the electronic dials 17 and 19, respectively.

As mentioned above with reference to FIGS. 33 and 34, the hyper Tv and Av flags are released widen either the clear button 23 is turned ON (steps S261~S263), the hyper-program exposure mode is selected, the main switch SWMAIN is turned OFF or the taking lens is detached from the camera body. When the main switch SWMAIN is turned ON or when the taking lens is attached, the mode is returned to the initial mode, i.e., the hyper-program automatic exposure mode.

Program Exposure Mode

When the ordinary program exposure mode is selected, "P", which represents the program exposure mode, is indicated in the LCD panel 69 (steps S301, S302, S321~S323). Furthermore, when the power hold of the CPU 41 is effected, the IPU 43 reads the communication TVT, AVT data corresponding to the the optimum shutter speed Tv and the optimum diaphragm value Av, calculated in the program exposure sub-routine, and stores the data in the RAM 43b. The data is indicated in the LCD panel 69, etc., as shown in FIG. 42A (steps S324 and S325).

Limited Program Exposure Mode

In the limited program exposure mode, the photographer can modify the upper and lower limits of the shutter speed and the diaphragm value, both varying along the program diagrams, by actuating the electronic dials 17 and 19 and the hold switch 25.

Figure 41C:
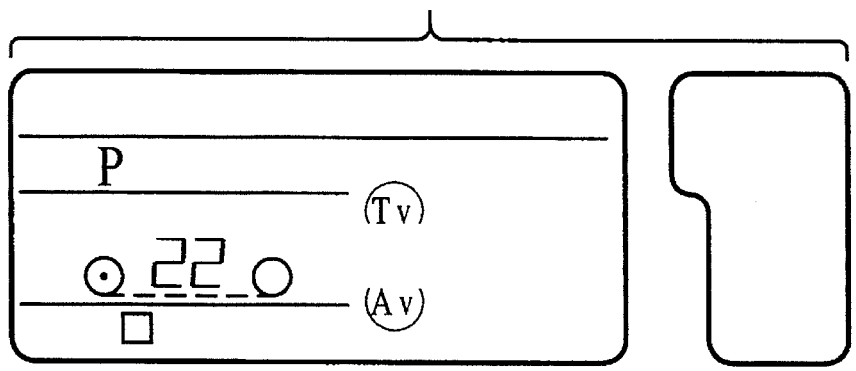
Figure 41E:
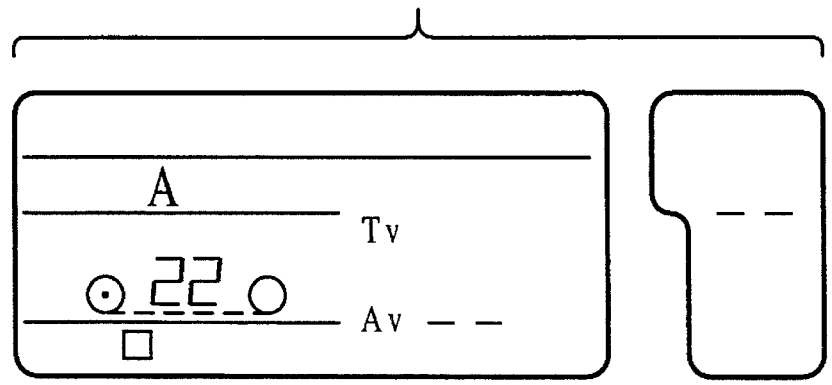
Figure 41D:
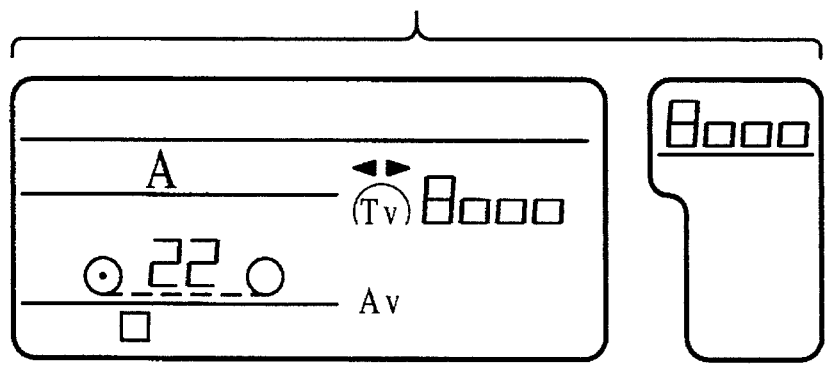
Figure 41F:
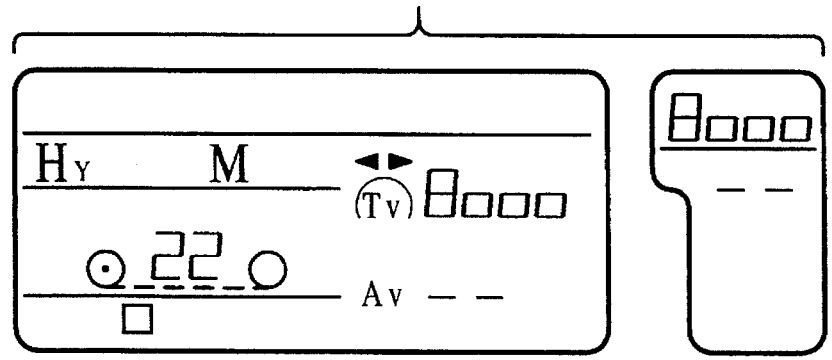

Selection of the limited program exposure mode is indicated by illuminating the three quarter circle surrounding the symbols "Av" and "Tv", as shown in FIG. 41C (steps S461 and S462).

When the clear switch SWCL is turned ON, the lower and upper limits TV1 and TV2 of the shutter speed and the lower and upper limits AV1 and AV2 of the diaphragm value are initialized (steps S463-1, S463-2). The initial values of the shutter speed limits and the diaphragm value limits at the limited program exposure mode in the illustrated embodiment are as follows: Namely, TV1=TVMIN=30 (sec.); TV2=TVMAX=⅛₀₀₀ (sec.), AV1=AVMIN; AV2=AVMAX. These initial values are set when the limited program exposure mode is selected for the first time after the battery is changed. If the clear switch SWCL is turned OFF, the control proceeds to step S464 to check the photometering switch SWS without initializing the shutter speed limits TV1 and TV2 and the diaphragm value limits AV1 and AV2. Namely, the limits set by the photographer in accordance with the following processes are initialized when the clear button 23 (clear switch SWCL) is turned ON.

When the photometering switch SWS is turned ON or when the power is held, even if the photometering switch SWS is turned OFF, the control proceeds to step S485 (steps S464, S465-1). When the photometering switch SWS is turned OFF and when power to the CPU 41 is held, the limit value is modified, and the control then proceeds to step S485 (steps S465-1, S465-2, S466~S486). At step S485, it is determined whether power to the CPU 41 is held. If the power is held, the CPU 41 reads the optimum diaphragm value Av and the optimum shutter speed Tv calculated at the limited program exposure mode and stores the data in the RAM 43b. The data is indicated in the LCD panel 69, etc. Thereafter, the control is returned. If the power is not held, the control is directly returned (step S486).

Change of the limit values is effected as follows (step S465-2 and steps subsequent thereto):

When the Tv electronic dial 17 is actuated, the limits of the shutter speed Tv are increased or decreased in accordance with the direction of the rotation of the Tv electronic dial 17. The limits are stored in the RAM 43b and indicated (steps S465-2, S466).

When the hold button 25 is turned ON, the upper and lower limits TV1 and TV2 of the shutter speed are set. Namely, when the hold button 25 is turned ON for the first time or an odd number of times, since the ML mode flag is set, the set Tv data is modified to the lower limit TV1 (steps S467~S470). When the hold button 25 is turned ON the second time or an even number of times, the set Tv data is modified to the upper limit TV2. Control then proceeds to step S485 (steps S467, S468, S469, S472). If the hold button 25 is not turned ON, a change of the shutter speed is not effected (steps S467, S485).

On the other hand, when the Av electronic dial 19 is turned ON, the limits of the diaphragm value are changed simultaneously with the limits of the shutter speed Tv. Namely, the diaphragm value is increased or decreased in accordance with the direction of rotation of the Av electronic dial 19. The diaphragm value is consequently stored in the RAM 43b and indicated in the LCD panel 69, etc., (steps S475, S476). If the hold button is turned ON for the first time or an odd number of times, since the ML mode flag is set at "1", the set Av data is modified to the lower limit AV1, and when the hold button 25 is turned ON the second time or an even number of times (M1 mode flag is "0"), the set Av data is modified to the upper limit AV2, and the control proceeds to step S485 (steps S478, S479, S482).

Upon completion of the modification of the limits TV1 and TV2 and AV1 and AV2 of the shutter speed and the diaphragm value, the CPU 41 reads the optimum shutter speed Tv and diaphragm value Av calculated in the limited program exposure mode and stores the data in the RAM 43b, provided that the power to CPU 41 is held (steps S485, S486). The stored data is indicated in the LCD panel 69 and the indicator unit within the finder.

As can be understood from the foregoing, in the limited program exposure mode, the shutter speed and the diaphragm value set by the photographer are changed to the upper or lower shutter speed limit and the upper or lower diaphragm limit when the hold switch 25 is turned ON. In an alternative, to change the shutter speed limits or the diaphragm limits every time the electronic dial 17 or 19 is actuated, it is possible to skip the operations at steps S467 and S477.

LA ES Automatic Exposure Mode

Figure 42D:
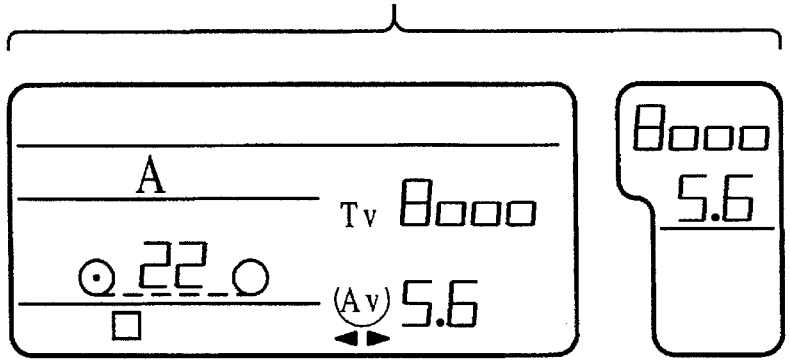

When the body-set diaphragm priority (ES) automatic exposure mode (lens-auto ES automatic exposure mode) is selected, the LCD panel 69 and the indicator unit 71 within the finder are displayed as shown in FIG. 42D (steps S301, S302, S321, S461, S331~S333). When the Av electronic dial 19 is rotated, the diaphragm value Av is increased or decreased in accordance with the direction of rotation thereof, stored as the set diaphragm value Av in the RAM 43b, and indicated in the LCD panel 69, etc. When the power to CPU 41 is held, the IPU 43 outputs the diaphragm value AVT, calculated in the diaphragm priority automatic exposure mode, to the CPU 41, which reads the optimum shutter speed Tv calculated in the LA diaphragm priority automatic exposure sub-routine, stores the data in the RAM 43b and indicates the same in the LCD panel 69, etc. (steps S334~S338).

LA EE Automatic Exposure Mode

When the shutter speed priority (EE) automatic exposure mode is selected, the display of the LCD panel 69 and the indicator unit 71 within the finder is as shown in FIG. 42C, in which the initial value (⅛₀₀₀ sec.) of the shutter speed Tv appears (steps S301, S302, S321, S331, S341~S343). When the Tv electronic dial 17 is rotated, the shutter speed Tv is increased or decreased in accordance with the direction of rotation thereof, stored as the set shutter speed Tv in the RAM 43b, and indicated in the LCD panel 69, etc. When the power to CPU 41 is held, the IPU 43 outputs the shutter speed TVT calculated in the shutter speed priority automatic exposure mode to the CPU 41 which reads the optimum transferring diaphragm value AVT calculated in the EE automatic exposure sub-routine, stores the data in the RAM 43b and indicates the same in the LCD panel 69, etc., respectively, as shown in FIG. 42C (steps S344~S348).

Hyper-Manual Exposure Mode

In the hyper-manual exposure mode in the illustrated embodiment, the function equivalent to the calculation of the shutter speed Tv and/or the diaphragm value Av in the program exposure mode, the EE automatic exposure mode or the ES automatic exposure mode is achieved by actuating the clear button 23.

Figure 42E:
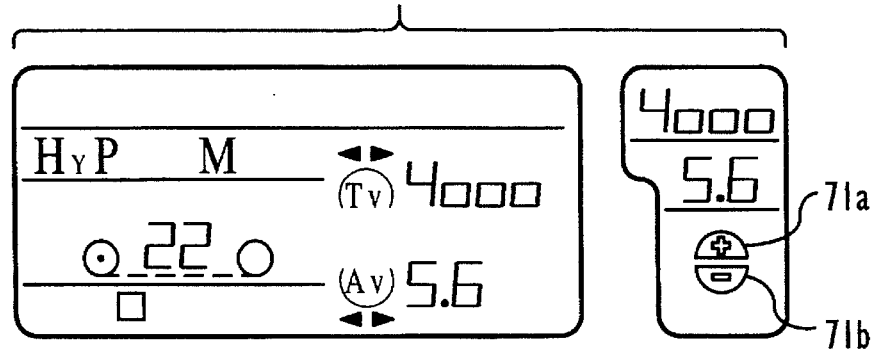

When the body-set hyper-manual exposure mode is selected, the display of the LCD panel 69, etc., is as shown in FIG. 42E (steps S301, S302, S321, S461, S331, S341, S379~S351). When the Ev check sub-routine is performed, the shutter speed Tv and the diaphragm value Av which are increased or decreased in accordance with the direction of rotation of the electronic dials 17 and 19 are set in the RAM 43b and indicated in the LCD panel 69, etc., respectively (step S352).

If the power to CPU 41 is held, the shutter speed TVT and the diaphragm value AVT selected in the manual exposure mode are outputted to CPU 41, which reads the specific point LED bit calculated in the body-set manual exposure sub-routine, stores the same in the RAM 43b, and controls the illumination of the exposure indicating elements 71a and 71b (steps S353~S360).

LA Bulb Exposure Mode

Figure 42F:
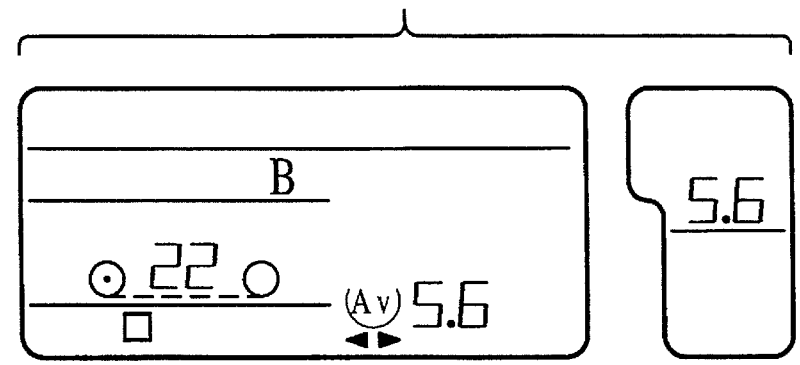
Figure 42G:
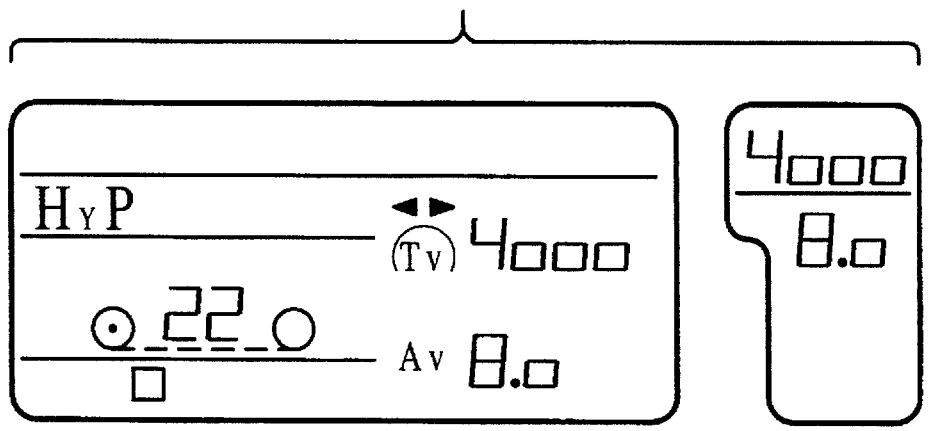
Figure 42H:
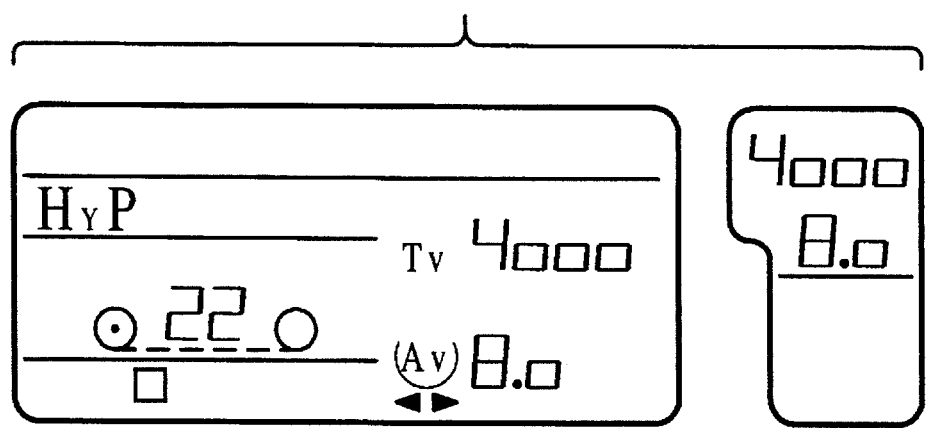

When the body-set bulb exposure mode is selected, the display of the LCD panel 69, etc., is as shown in FIG. 42F (steps S301, S302, S321, S461, S331, S341, S349, S361, S362).

When the Av electronic dial 19 is rotated, the diaphragm value Av is increased or decreased in accordance with the direction of rotation of the Av electronic dial 19, stored in the RAM 43b, and indicated in the LCD panel 69 and the indicator unit 71 (steps S363~S365).

In the body-set shutter priority exposure mode, diaphragm priority exposure mode, manual exposure mode and bulb exposure mode, as mentioned above, the photographer can set the shutter speed Tv and the diaphragm value Av by actuating the electronic dials 17 and 19. In this case, the three quarter circle, the arrows, and the letters "Tv" and "Av" appear in the LCD panel 69. Also, the shutter speed Tv or the diaphragm value Av is underlined, as mentioned above. Accordingly, the photographer is alerted that the shutter speed Tv and the diaphragm value Av can be manually set by actuating the electronic dials 17 and 19, respectively.

Furthermore, when the hold button 25 is turned ON, the asterisk mark of the indicating element 71c is illuminated in the indicator unit 71 within the finder. Accordingly, the photographer is alerted that the memory is locked.

Lens-Manual Mode

Indication of the exposure mode in the lens-manual mode, in which the diaphragm value is set on the taking lens side, is effected by the IPU 43 as follows:

LM hyper-Manual Exposure Mode

Figure 43A:
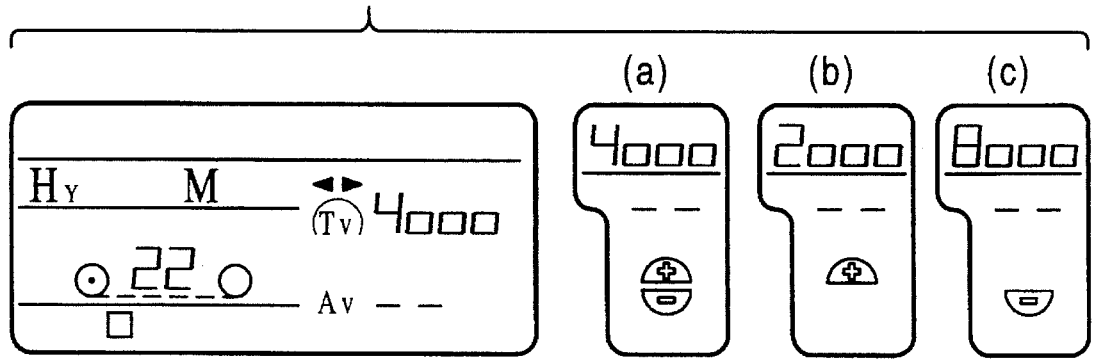
FIGS. 43A, 43B and 43C show various exposure modes in a lens manual mode, as indicated on an LCD panel and an indication unit within a finder.

Selection of the LM hyper-manual exposure mode is indicated in the LCD panel 69, etc., as shown in FIG. 43A (steps S301, S371~S373). When the Tv electronic dial 17 is rotated, the shutter speed Tv which is increased or decreased in accordance with the direction of rotation thereof is stored in the RAM 43b as the set shutter speed Tv and indicated in the LCD panel 69 and the indicator unit 71 within the finder (steps S374~S376).

Furthermore, when power of CPU 41 is held, the shutter speed TVT and the diaphragm value AVT selected in the manual exposure mode are outputted to CPU 41, which reads the exposure indication bit set in the LA manual exposure sub-routine, stores the read data in the RAM 43b, and controls the illumination of the indicating elements 71a and 71b (steps S377 and S378). FIGS. 43A, (a), (b) and (c) to designate an optimum exposure, over exposure, and under exposure, respectively.

LM Manual ES Automatic Exposure Mode

Figure 43B:
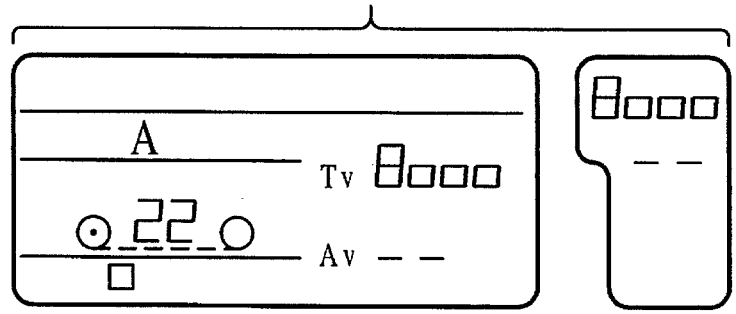

The lens-manual diaphragm priority (ES) automatic exposure mode is indicated in the LCD panel 69, as shown in FIG. 43B (steps S301, S381~S383). If power of CPU 41 is held, the CPU 41 reads the shutter speed TVT calculated in the lens-manual ES automatic exposure sub-routine and stores the data in the RAM 43b. The data is indicated in the LCD panel 69, etc., and the control is returned (steps S384, S385).

LM Bulb Exposure Mode

Figure 43C:
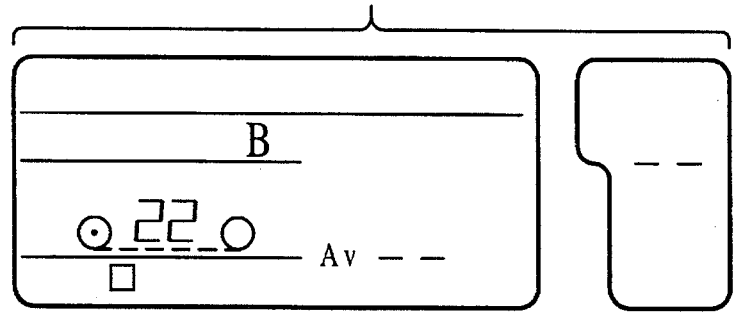
Figure 44A:
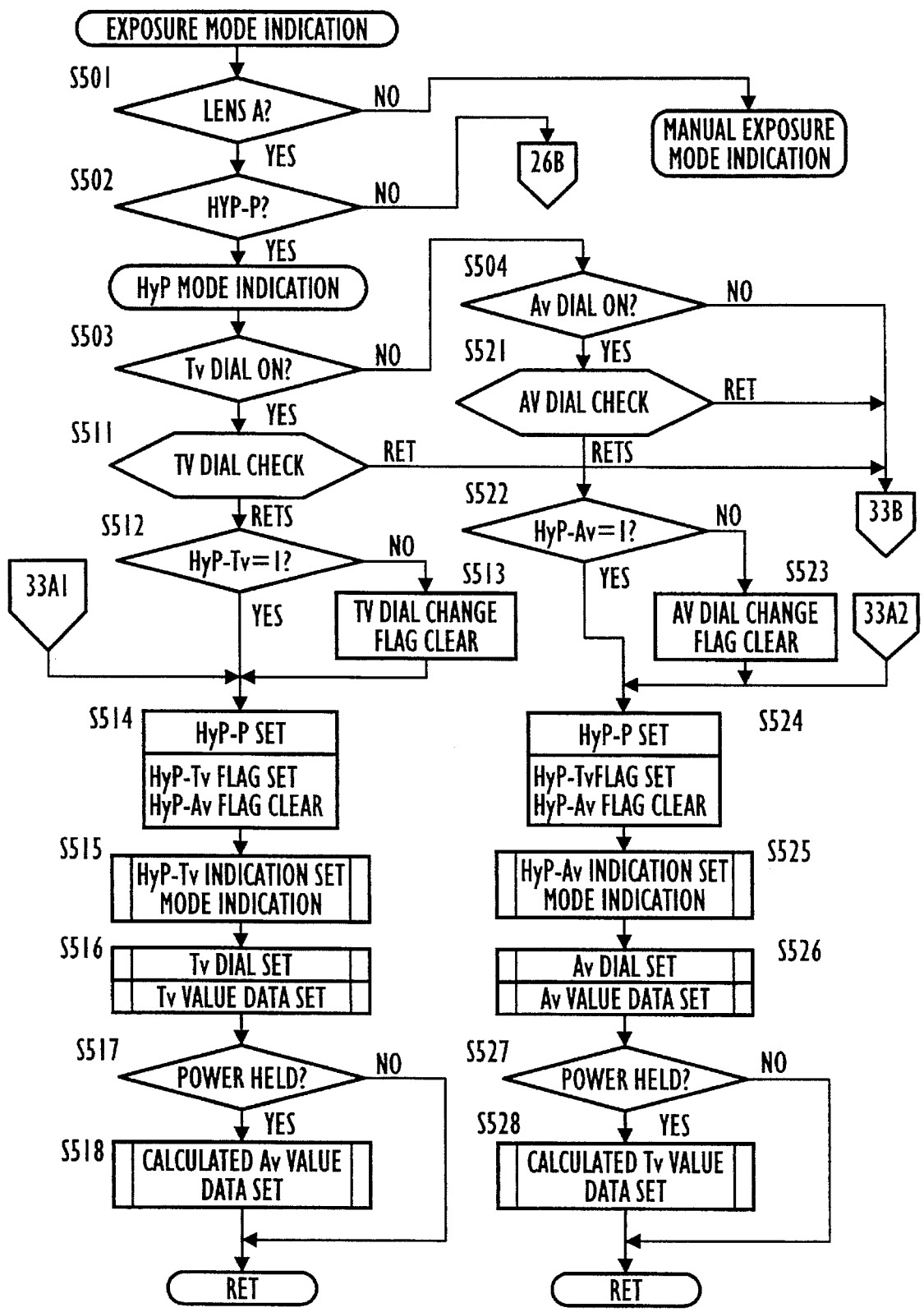
FIGS. 44A and 44B are modified flow charts of an indicating operation of a hyper-program shown in FIG. 39A.
Figure 44B:
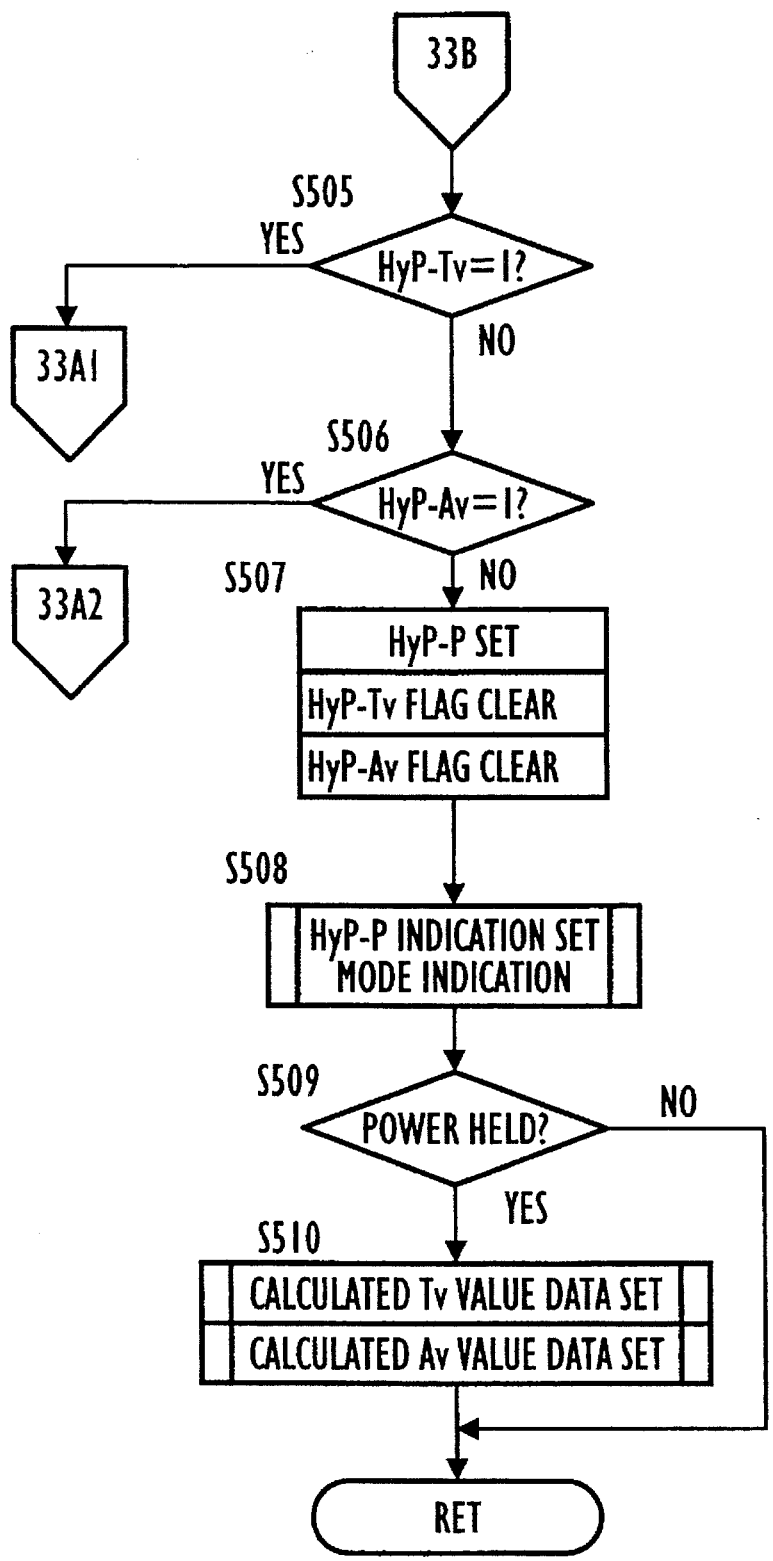

When the lens-set bulb exposure mode is selected, the shutter speed Tv is set at "B" (bulb) which is indicated in the LCD panel 69, as shown in FIG. 43C (steps S301, S371, S381, S391, S392).

Ev Checking Sub-Routine

Figure 40:
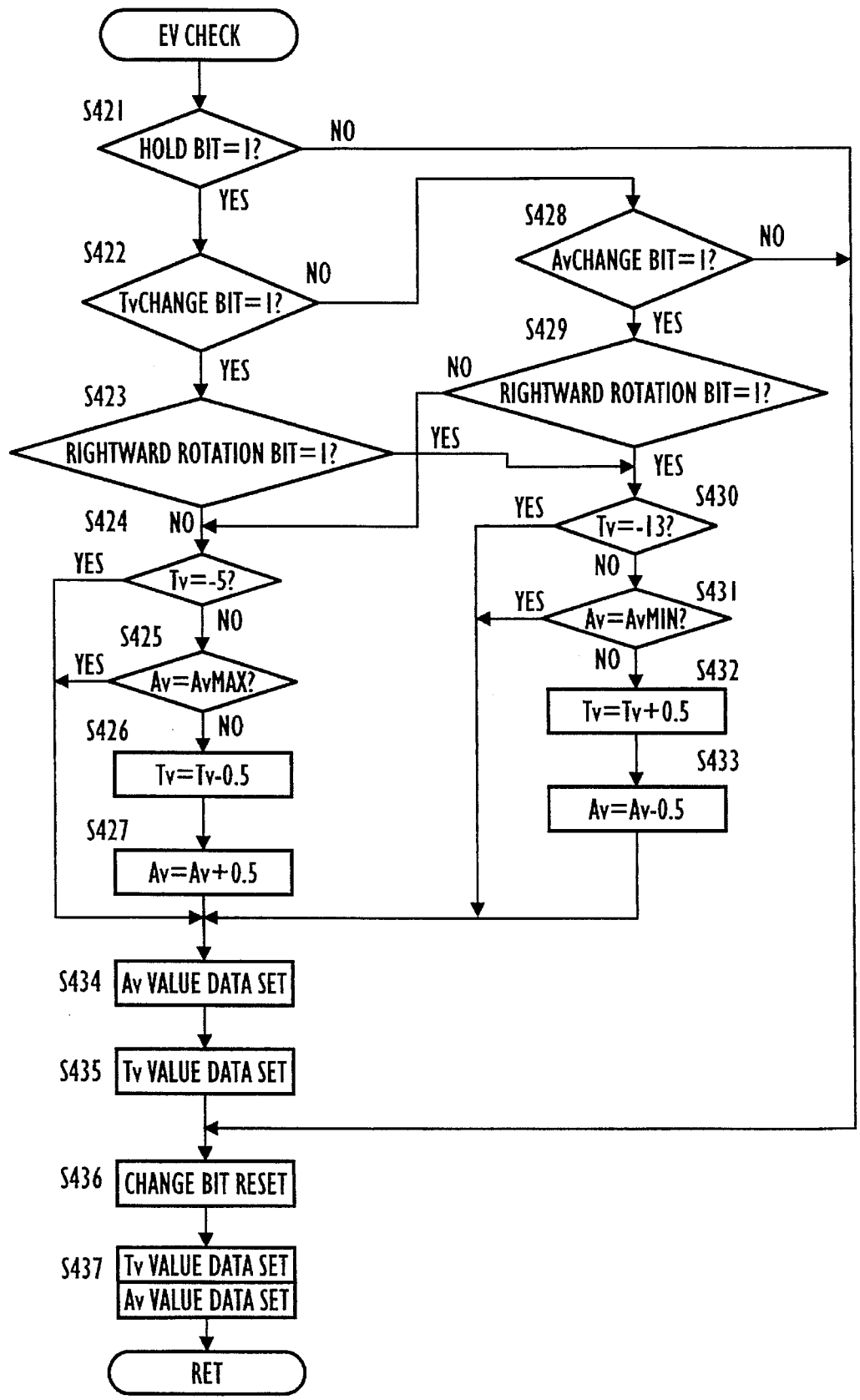
FIG. 40 is a flow chart of an Ev checking operation, according to the present invention.

In the Ev check operation, when the hold switch 25 is turned ON, the optimum exposure value at that time is locked, and if the electronic dial 17 or 19 is actuated thereafter, the associated exposure factor (shutter speed or diaphragm value) is increased or decreased in accordance with the direction of rotation of the electronic dial 17 or 19, and the other exposure factor (diaphragm value or shutter speed) is decreased or increased, respectively, to retain the locked exposure value. In the Ev checking sub-routine at step S352, every time the electronic dials 17 and 19 are rotated by one step when the hold button 25 is turned ON, the increment or decrement of the shutter speed Tv and the diaphragm value Av by ½ Tv and ½ Av takes place, respectively. The Ev checking sub-routine will be discussed below with reference to FIG. 40.

The RAM 43b of the IPU 43 has a hold bit that corresponds to the switching operation of the hold button 25. If the hold bit is "0", i.e., if the hold button 25 is not turned ON, the shutter speed Tv and the diaphragm value Av, which have already been set are not modified (steps S421, S437). Conversely, if the hold bit is "1", i.e., if the hold button 25 is turned ON, the following operation is performed;

If the Tv electronic dial 17 is rotated in the leftward direction (counterclockwise direction) by one step or more (i.e., the Tv change bit is "0") the shutter speed Tv is decreased ½ Tv by ½ Tv and the diaphragm value Av is increased ½ Av by ½ Av until the shutter speed Tv is equal to −5 (Tv=−5~30 sec.) or the diaphragm value Av is equal to the maximum diaphragm value AVMAX (steps S422~S427). If the Av electronic dial 19 is rotated in the rightward direction (clockwise direction), the same operation as above is performed (steps S422, S428, S429, S424~S427).

If the Tv electronic dial 17 is rotated in the rightward direction (clockwise direction), the shutter speed Tv is increased ½ Tv by ½ Tv and the diaphragm value Av is decreased ½ Av by ½ Av until the shutter speed Tv is equal to 13 (Tv=13~⅛₀₀₀ sec.) or the diaphragm value Av is equal to the minimum diaphragm value AVMIN (steps S422, S423, S430~S433). If the Av electronic dial 19 is rotated in the leftward direction (counterclockwise direction), the same operation as above is performed (steps S422, S428–S433). The increased or decreased shutter speed Tv and the diaphragm value Av are stored in the RAM 43b and the Tv, Av change bits are reset (steps S434–S437).

Thus, both the shutter speed Tv and the diaphragm value Av can be simultaneously adjusted by actuating one of the electronic dials 17 or 19 while maintaining the exposure value Ev constant, when the hold button 25 is turned ON after the optimum shutter speed and the diaphragm value are manually set. For instance, on the assumption that the optimum shutter speed Tv and diaphragm value Av are 1/125 sec., and F8.0, in the hyper-manual mode, respectively, if the hold button 25 is turned ON, the memory is locked. Thereafter, if for example the Tv electronic dial 17 is rotated by two steps, the shutter speed Tv and the diaphragm value Av are changed to 1/60 sec., and F11, respectively, while maintaining exposure at the optimum value. For comparison's sake, if the Tv electronic dial Tv is actuated at the ordinary hyper-manual exposure mode, only the shutter, speed is varied, resulting in a change in exposure value. This mode will be cancelled when the hold button is actuated again.

Second Exposure Mode Indication Operation

The second exposure mode indicating operation is different from the first exposure mode indicating operation in that the exposure mode can be changed only when the electronic dials 17 or 19 are rotated by more than two steps in the hyper-program exposure mode.

When neither of the electronic dials 17 or 19 is actuated and both the hyper-Tv and hyper-Av flags are "0" in the lens-auto hyper-program mode (i.e., when the hyper-program exposure mode is selected) the display in the LCD 69 and the indicator unit 71 within the finder is as shown in FIG. 42B (steps S501–S508). The transferring shutter speed TVT and the transferring diaphragm value AVT, calculated by the CPU 41, are stored in the RAM 43b (steps S509, S510), provided that power of CPU 41 is held.

When the hyper-EE automatic exposure mode is selected, the control proceeds from step S505 to step S514, since the hyper-Tv flag is set. Thereafter, in steps S514–S518, the operations similar to those in steps S311–S315 are effected. On the other hand, if the hyper ES automatic exposure mode is selected, the control proceeds from step S506 to step S524, since the hyper-Av flag is set. Thereafter, in steps S524–S528, the operations similar to those in steps S316–S320 are effected.

When the Tv electronic dial 17 or the Av electronic dial 19 is rotated, namely, when the Tv-change bit or the Av-change bit is "1", the operations in the Tv dial or Av dial checking sub-routine are effected. As can be understood from the foregoing, in the Tv dial or Av dial checking sub-routine, the exposure mode is changed only when the Tv or Av electronic dial 17 or 19 is rotated by two or more steps in the same direction.

When the Tv or Av electronic dial 17 or 19 is rotated by one step in a predetermined direction, or when the Tv or Av electronic dial 17 or 19 is rotated thereafter by one step in the opposite direction, the control proceeds to step S505 (steps S503, S511, S505 or steps S503, S521, S505).

When the Tv electronic dial 17 is rotated by two steps in the same direction, the control proceeds from step S511 to step S512 in which, if the hyper-Tv flag is "0", the Tv dial change flag is reset to permit the mode to be changed to the hyper-EE automatic exposure mode and prevent the shutter speed Tv from being changed, since the hyper-EE automatic exposure mode is not selected. Thereafter, the control proceeds to step S514 (steps S512, S513 and S514). If the hyper-Tv flag is "1", since the hyper-EE automatic exposure mode is selected, the control proceeds directly to step S514 in which the shutter speed Tv can be adjusted (steps S512, S514).

On the other hand, when the Av electronic dial 17 is rotated by two steps in the same direction, the control proceeds from step S521 to step S522 in which, if the hyper-Av flag is "0", the Av dial change flag is reset to permit the mode to be changed to the hyper-ES automatic exposure mode and prevent the diaphragm value Av from being changed, since the hyper-ES automatic exposure mode is not selected. Thereafter, control proceeds to step S524 (steps S521, S522, S523, S524). If the hyper-Av flag is "1", since the hyper-ES automatic exposure mode is selected, the control proceeds directly to step S524 in which the diaphragm value Av can be adjusted (steps S521, S522, S524).

Figure 45:
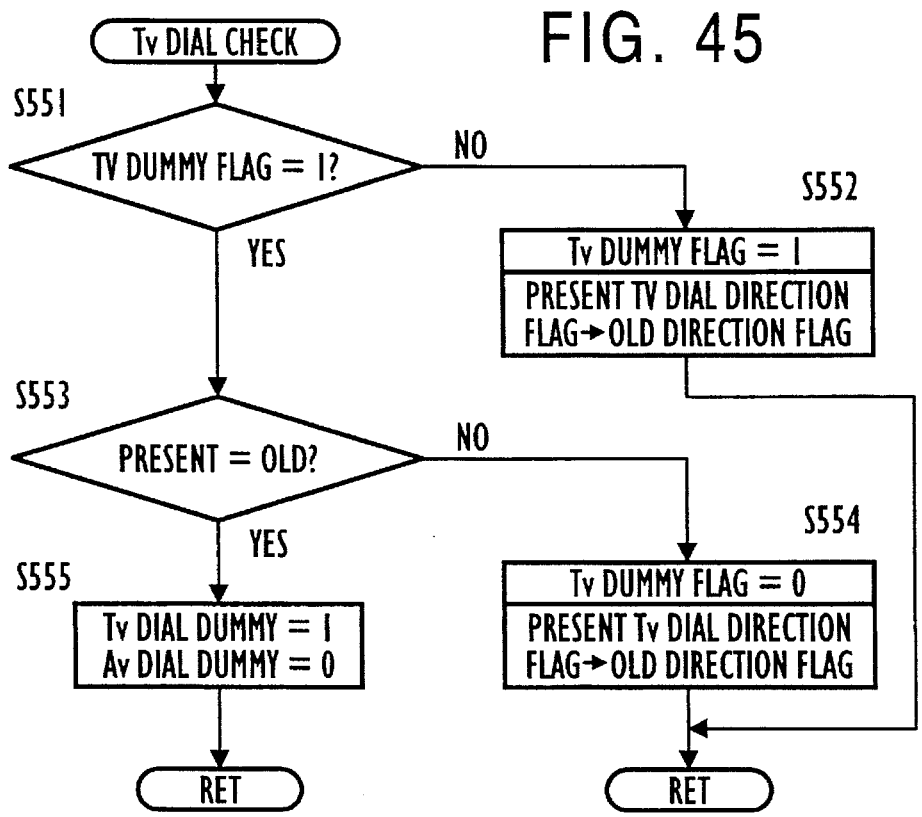
FIG. 45 is a flow chart of a sub-routine of a second Tv dial checking operation; and, FIG. 46 is a flow chart of a sub-routine of a second Av dial checking operation.
Figure 46:
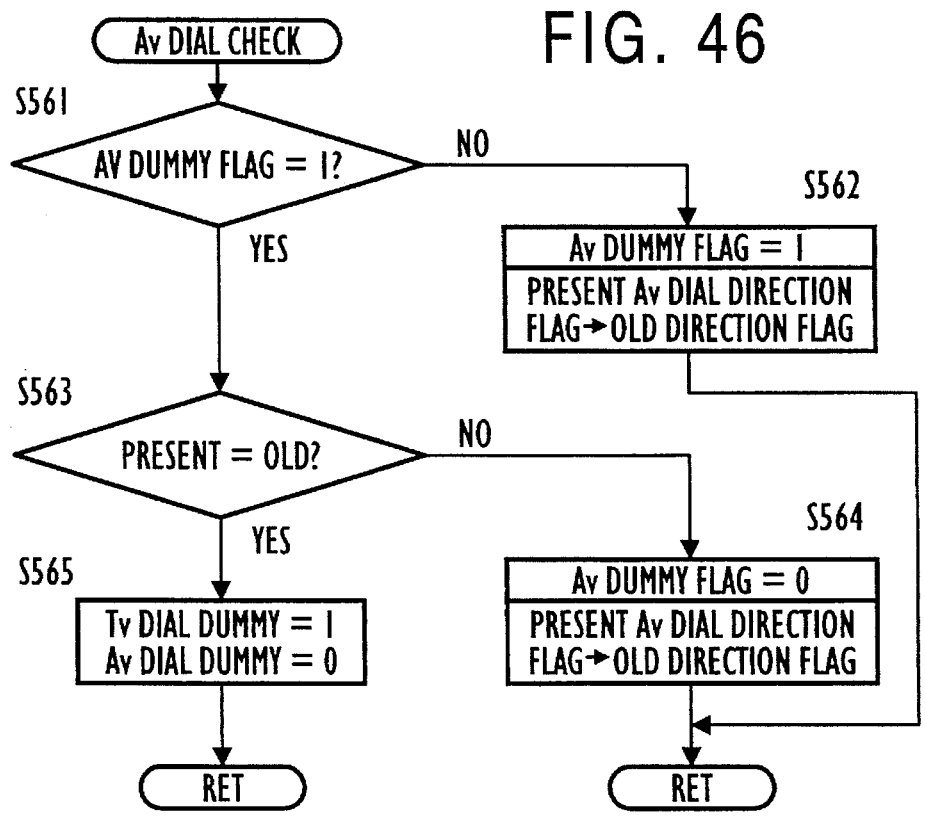
Figure 47:
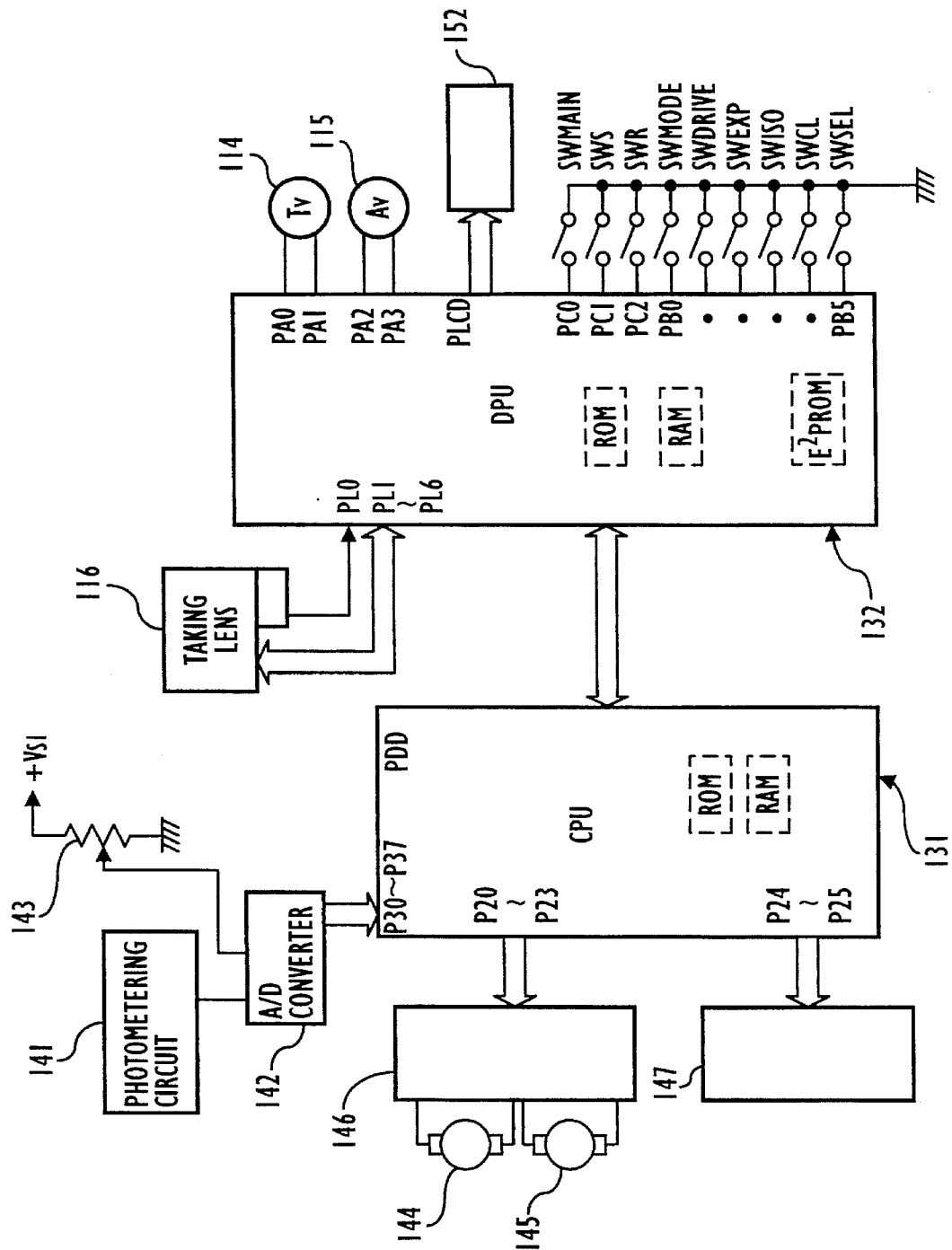
FIG. 47 is a circuit diagram of an exposure control apparatus of a camera according to the present invention.

The Tv, Av dial check sub-routines will be discussed below with reference to steps S511 and S521 in FIGS. 45 and 46. In the Tv dial check sub-routine, it is checked whether a Tv dummy flag is "1" at step S551. Since the Tv dummy flag is not initially set, the Tv dummy flag is set and the old Tv dial direction flag is replaced with the present Tv dial direction flag, and the control is then returned to step S505 (step S552). The second time through the sub-routine, if the direction of rotation of the Tv electronic dial 17 is the same as that of the first rotation, the Tv dial dummy flag is set and the Av dial dummy flag is reset, since the present Tv dial direction flag is identical to the old Tv dial direction flag (steps S553, S555). After that, the control proceeds to step S512.

Conversely, if the direction of the second rotation of the Tv electronic dial 17 is different from that of the first rotation, the Tv dial dummy flag is reset and the old Tv dial direction flag is replaced with the present dial direction flag, since the old Tv dial direction flag is different from the present flag (steps S551, S553, S554). After that, the control proceeds to step S505.

In the Av dial check sub-routine, it is checked whether the Av dummy flag is "1" at step S561. Since the Av dummy flag is not initially set, the Av dummy flag is set and the old Av dial direction flag is replaced with the present Av dial direction flag, and the control is then returned to step S505 (step S562). The second time through the sub-routine, if the direction of rotation of the Av electronic dial 19 is the same as that of the first rotation, the Av dial dummy flag is set and the Tv dial dummy flag is reset, due to the fact that the present Av dial direction flag is identical to the old Av dial direction flag (steps S563, S565). After that, the control proceeds to step S524.

Conversely, if the direction of the second rotation of the Av electronic dial 19 is different from that of the the first rotation, the Av dial dummy flag is reset and the old Av dial direction flag is replaced with the present dial direction flag, since the old Av dial direction flag is different from the present flag (steps S561, S563, S564). After that, the control proceeds to step S505.

As can be understood from the above discussion, according to the second indication sub-routine, since there is no change in the exposure mode, as long as the electronic dial 17 or 19 is not rotated by more than two steps, even if the electronic dial 17 or 19 is rotated accidentally or by mistake, the mode is not changed. In an alternative embodiment, it is possible to realize a control system in which a mode change does no take place if the electronic dial 17 or 19 is successively rotated twice within an extremely short space of time.

As can seen from the foregoing, according to the present invention, if the clear button 23 is actuated in the manual exposure mode, the exposure value can be easily adjusted to an optimum value, since the shutter speed and the diaphragm value are set in accordance with the object brightness detected by the photometering means in the body-set program exposure mode. Furthermore, since the photometering continues while the clear button 23 is turned ON, the optimum exposure value is retained unless the clear button is turned OFF. If the clear button is turned ON in the lens-set manual exposure mode, the shutter speed is automatically modified to an optimum shutter speed in accordance with the object brightness and the diaphragm value. The optimum value is held during the continuation of the photometering operation.

Furthermore, as can be understood from the above discussion, according to the present invention, if the manual shift means is actuated when a picture is taken in the manual exposure mode, one or both of the exposure factors (shutter speed and diaphragm value) is or are varied in accordance with the object brightness to maintain the optimum value(s) during the operation of the manual shift means. Accordingly, the optimum exposure value can be obtained without a mode shifting operation by the mode shifting switch. Since the mode is immediately returned to the original skate of the manual exposure mode when the manual shift means is released, the present invention is particularly useful when a temporary mode shift from the manual exposure mode is necessary, when a fast adjustment of the optimum exposure value is needed, or when the optimum exposure value should be temporarily held.

Furthermore, according to the present invention, if the clear button 23 is turned ON in the lens-auto manual exposure mode, the shutter speed and diaphragm value manually set by the electronic dials 17 and 19 are modified to be the respective optimum values in accordance with the object brightness. This is substantially equivalent to switching the mode from the manual exposure mode to the automatic exposure mode. In the illustrated embodiment, the return to the original state of the manual exposure mode takes place immediately after the clear button 23 is turned OFF, resulting in an increased efficiency of operations.

If the clear button 23 is turned ON in the lens-manual exposure mode, an effect equivalent to shifting the mode into the diaphragm priority automatic exposure mode is obtained.

It is possible to modify the exposure control system so that the automatic exposure mode, to which the lens-auto manual exposure mode is shifted when the clear button 23 is turned ON, can be selected from the program exposure mode, the shutter speed priority exposure the diaphragm priority automatic exposure mode.

As can be seen from the above-discussion, according to the present invention, the manual exposure mode can be easily shifted to the automatic exposure mode, and the mode can be easily returned to the original mode by actuating the modifying switch, thus resulting in an increased efficiency of operation.

FIGS. 47 to 55 show another embodiment of the present invention.

The CPU 131 and the DPU 132 have microcomputers which are connected to each other. The CPU 131 performs the calculation and sequence control, such as the exposure control, the shutter release control, etc., and the DPU 132 reads the signals from the various switches and performs the indication of the various data.

The photometering circuit 141 is connected to the CPU 131 through an A/D converter 142. The A/D converter 142 is connected to a diaphragm volume 143 in association with a diaphragm ring (not shown) of the taking lens 116. The diaphragm volume 143 outputs the diaphragm voltage representing a diaphragm value in accordance with an angular position of the diaphragm ring. Namely, the diaphragm value can be set not only by an AV dial 115, which will be discussed hereinafter, but also by the diaphragm ring.

A winding motor 144 winds and rewinds the film, and the mirror motor 145 moves the mirror (not shown) up and down. The motors 144 and 145 are controlled by the CPU 131 through a motor driving circuit 146. A shutter diaphragm control circuit 147 controls the releasing operation and the stop-down of the diaphragm of the taking lens 116 when a shutter button (not shown) is fully depressed.

The DPU 132 is connected to the CPU, RAM (not shown) etc., of the taking lens 116. The DPU 132 performs data communication with the taking lens 116 and reads the lens data, such as the open F number Fmin (AVMIN), the maximum F number Fmax (AVMAX), and the focal length f etc.

The DPU 132 is connected to Tv and Av electronic dials 114 and 115. The electronic dials 114 and 115 have functions similar to those of the electronic dials 17 and 19, respectively. The rotation of the Tv electronic dial 114 causes the shutter speed (i.e., Tv value) to change and the rotation of the Av electronic dial 115 causes the diaphragm value (i.e., Av value) to change, respectively. When the Tv and Av electronic dials 114 and 115 are rotated by one click, a change in the exposure value by ½ Ev takes place.

The DPU 132 is connected to an IF switch SWCL (the clear button 23), an exposure value setting mode selecting switch SWEXP and an exposure value modifying mode selecting switch SWSEL, etc., in addition to the main switch SWMAIN, the photometering switch SWS, and the release switch SWR.

The main switch SWMAIN is associated with the main switch provided on the camera body. The photometering switch SWS and the release switch SWR are normally open switches with respect to the shutter button, so that when the shutter button is depressed half-way and fully depressed, the photometering switch SWS and the release switch SWR are turned ON, respectively.

When the IF switch SWCL is depressed in the manual exposure mode, a photometering is effected, i.e., the object brightness is metered, so that the shutter speed and the diaphragm value are set based on the detected object brightness, in accordance with the program diagram. The shutter speed and the diaphragm value are set in accordance with the exposure value setting mode selected by the exposure value setting mode selecting switch SWEXP. There are three exposure value setting modes in the illustrated embodiment. The first exposure value setting mode is a shutter speed priority mode in which the diaphragm value is set in accordance with the shutter speed, which is set and fixed by the Tv electronic dial 114, and the exposure value, depending on the object brightness. The second exposure value setting mode is a diaphragm priority mode in which the shutter speed is set in accordance with the diaphragm value, which is set and fixed by the Av electronic dial 115 or the diaphragm ring, and the exposure value, depending on the object brightness. The third exposure value setting mode is a program exposure mode in which the shutter speed and the diaphragm value are set in accordance with the program diagram. The calculation for calculating the shutter speed- (TVD) and exposure value(AVT) in the shutter priority exposure mode, the diaphragm priority auto exposure mode or the program exposure mode is called "AE calculation". These modes are different from the exposure modes used in normal photographing, as mentioned above, and are effective only when the IF switch SWCL is turned ON.

The exposure value modifying mode selecting switch SWSEL is actuated to select the exposure value modifying modes in which the shutter speed and the diaphragm value are modified by the Tv and Av electronic dials 114 and 115 after the shutter speed and the diaphragm value are set by the IF switch SWCL. There are two exposure value modifying modes in the illustrated embodiment, which will be discussed hereinafter.

Explanation of the other switches is not given herein, as they have no direct relation to the subject of the present invention.

The DPU 132 is connected to an LCD panel 152 which indicates the exposure modes, the shutter speed Tv, the diaphragm value Av, and the number of taken frames of the film, etc., in accordance with the control of the DPU 132.

Figure 48:
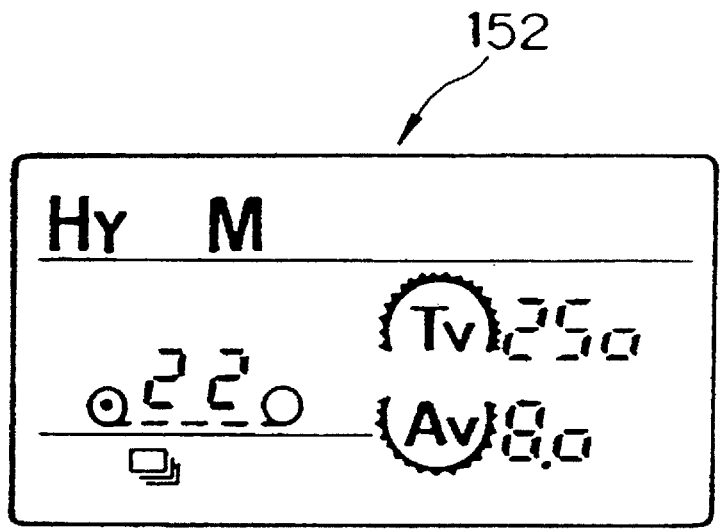
FIG. 48 is a plan view of an LCD panel showing an example of display thereof.
Figure 49:
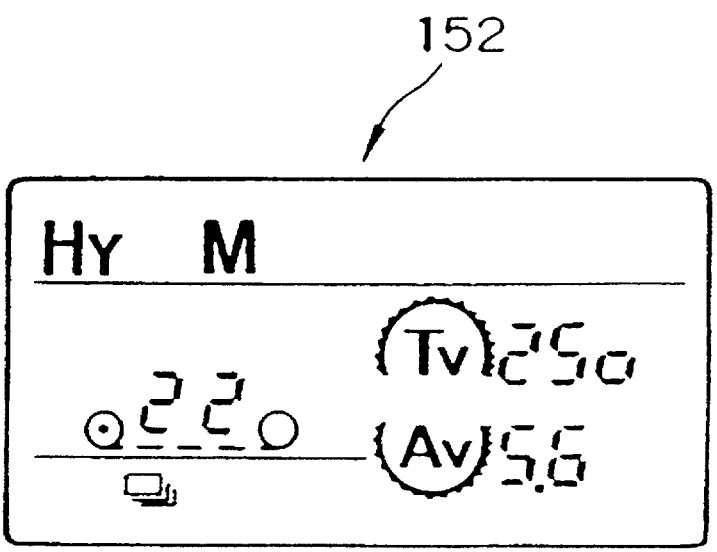
FIG. 49 is a plan view of an LCD panel showing another example of display thereof.
Figure 52:
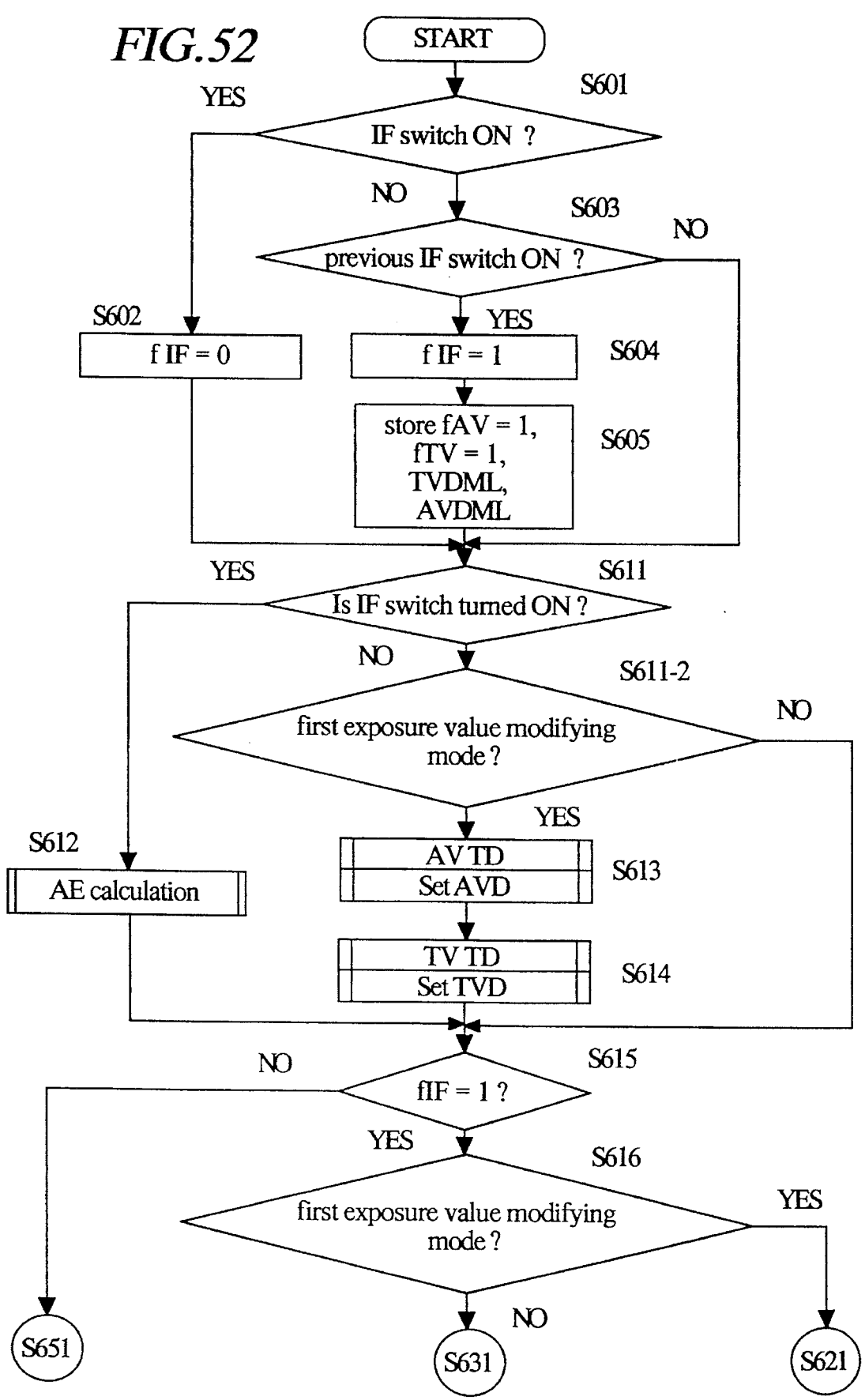
FIG. 52 is a flow chart of a control operation for the setting and modification of a shutter speed and a diaphragm value.
Figure 53:
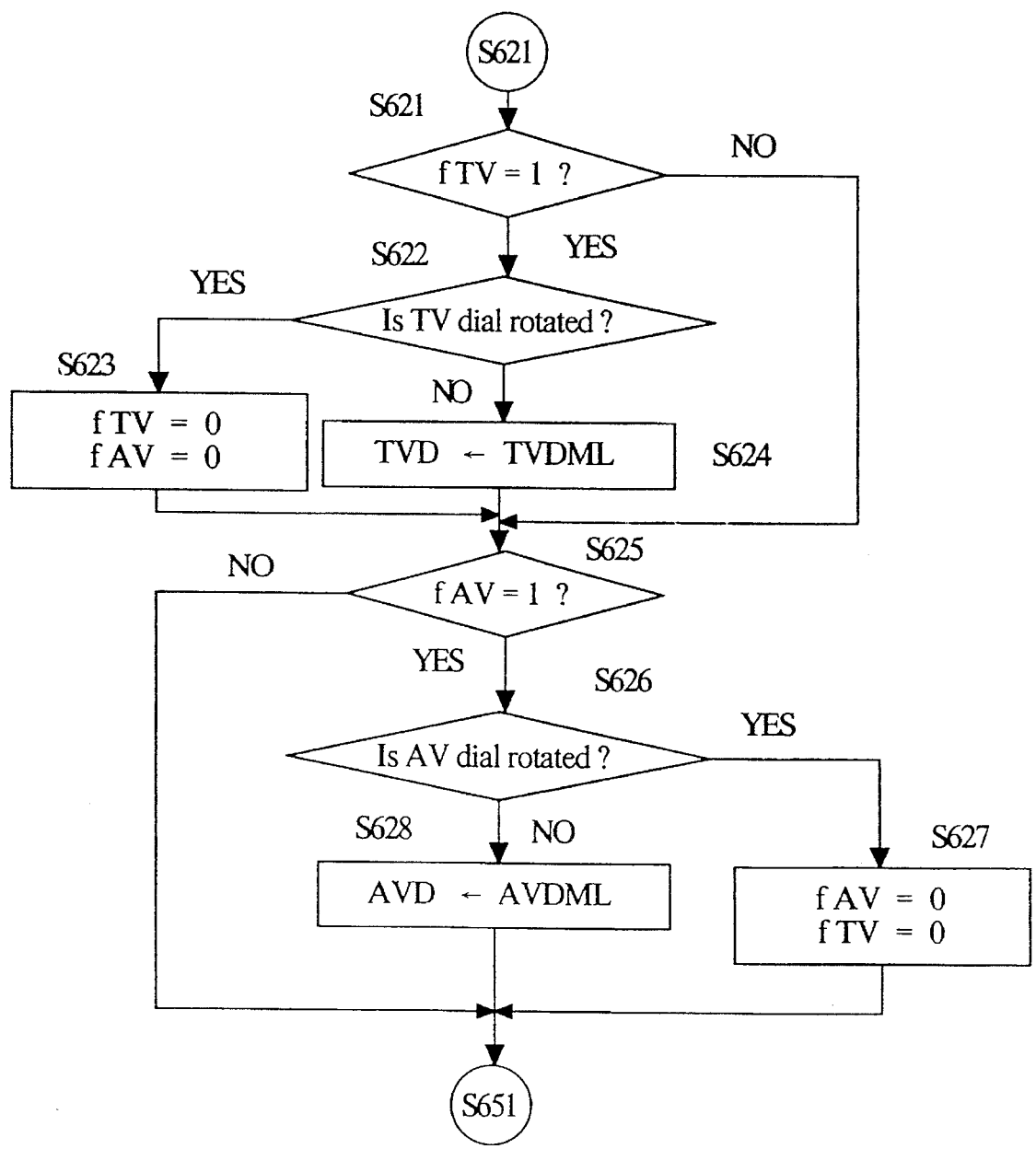
FIG. 53 is a flow chart of a control operation in a first exposure value modifying mode; and, FIGS. 54 and 55 are flow charts of a control operation in a second exposure value modifying mode.
Figure 54:
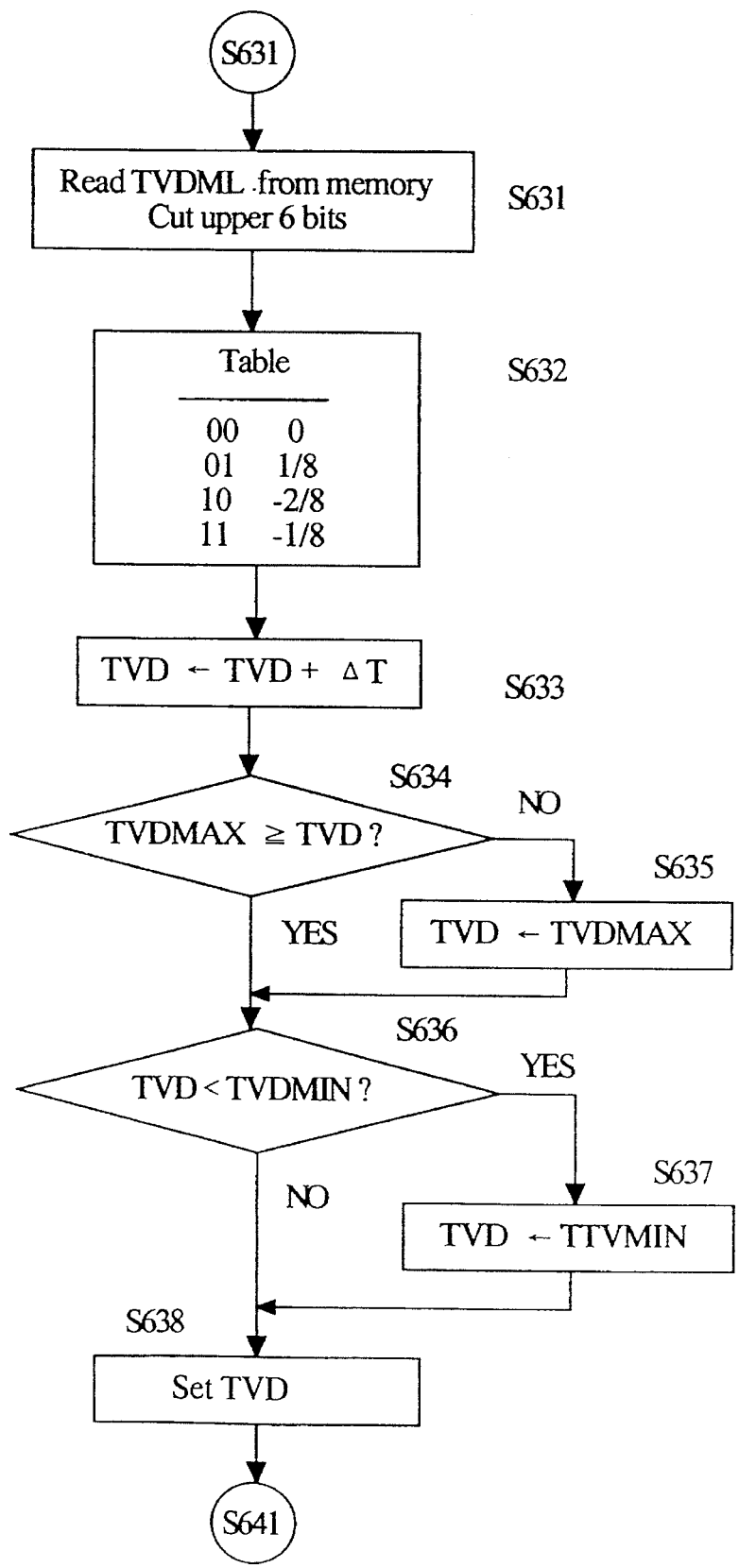
Figure 55:
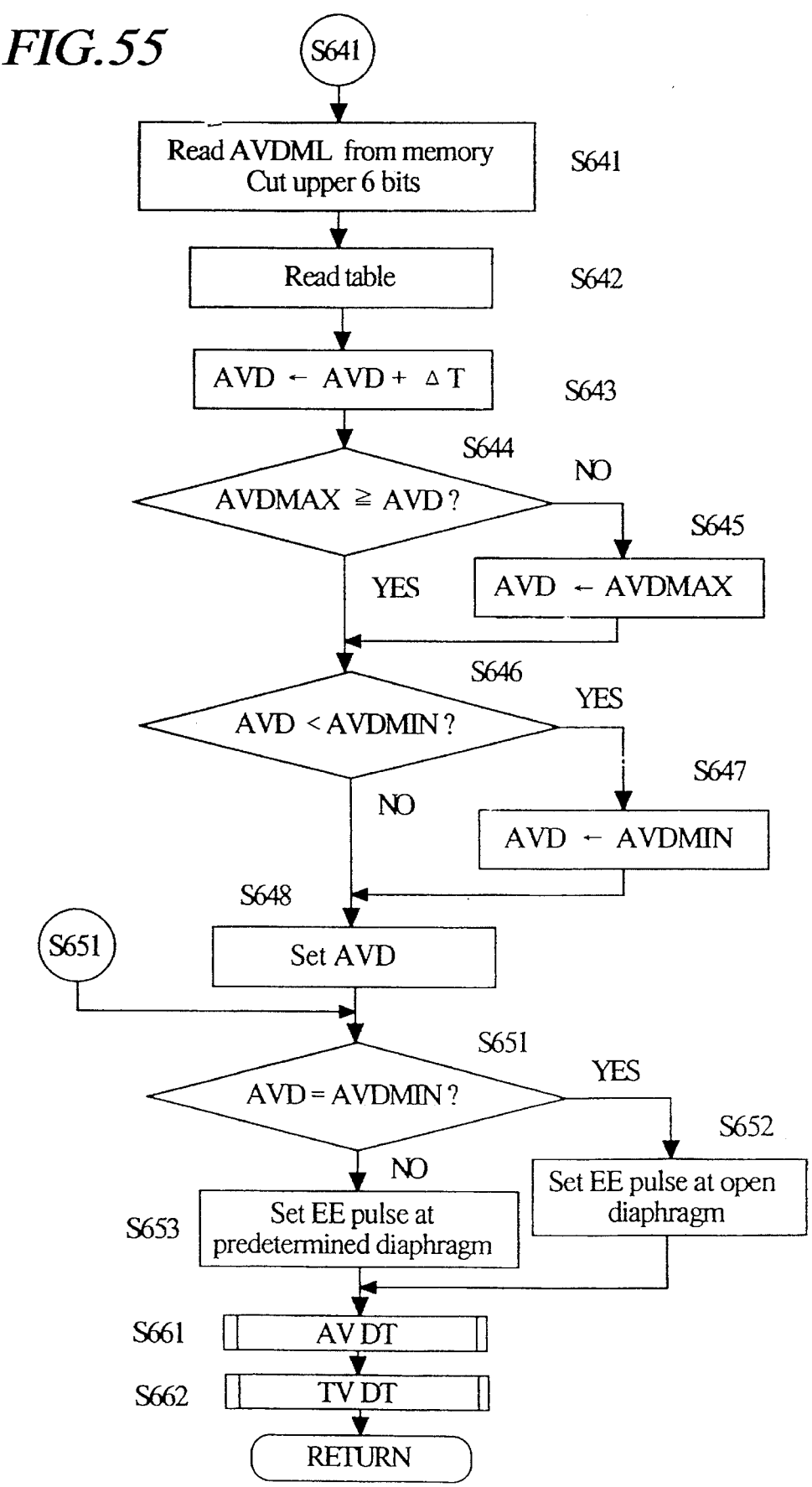

FIGS. 48 and 49 show examples of the indication of the LCD panel 152. In FIGS. 48 and 49, "M" designates the manual exposure mode in which when the IF switch SWCL is depressed, photometering is effected by the photometering circuit 141, so that the exposure value (Ev) is set in accordance with the object brightness detected by the photometering circuit. The setting of the exposure value is effected in accordance with the exposure value setting mode selected by the exposure value setting mode selecting switch SWEXP. Namely, for example, if the diaphragm value is manually set by the Av electronic dial 115, the mode is considered the diaphragm priority mode, so that the shutter speed is calculated with the second step accuracy. Thereafter, when the IF switch SWCL is released, the diaphragm and the shutter speed are simultaneously stored as optimum values in the RAM of the CPU 131.

When the shutter is released, in this state, a picture is taken in accordance with the optimum values being the control values. "250" and "8.0" in FIG. 48 denote the shutter speed (1/250 sec.) and the diaphragm value (F number), respectively.

As can be seen from the foregoing, the optimum shutter speed and diaphragm value are set by the operation of the IF switch SWCL, and are indicated in the LCD panel 152, as shown in FIG. 48, where the shutter speed and the diaphragm value are "1/250 sec." and "F 8.0", respectively. However, the indicated values of the LCD panel 152 are not always the optimum values obtained by the calculation, in view of the indication efficiency. Namely, the values in the LCD panel are indicated having the first step accuracy, which is of course less accurate than the calculated optimum values (ideal values). Namely, the indicated values are not always identical to the control values (calculated optimum values). Consequently, in the display of FIGS. 48 and 49, the optimum shutter speed and diaphragm value may be slightly different from "1/250" and "F8.0", respectively.

It is possible to modify the shutter speed and the diaphragm value by rotating the Tv and Av electronic dials 114 and 115 in the manual exposure mode, respectively. For example, the diaphragm value "F8.0" shown in FIG. 48 is modified to "F5.6" shown in FIG. 49 by rotating the Av electronic dial 115 through two clicks, so that a change in the exposure value of 1 Ev occurs. In the example shown in FIG. 49, only the diaphragm value is modified, while no modification of the shutter speed occurs. Namely, the Tv electronic dial 114 is not actuated in FIGS. 48 and 49.

In the illustrated embodiment, the indicated value varies in ½ Ev steps.

The control value of the diaphragm, i.e., the diaphragm value which can be controlled is either modified at ½ Ev intervals or is identical to the indicated value. Namely, there are two exposure value modifying modes (first and second exposure value modifying modes), which will be discussed below with reference to FIGS. 50 and 51.

FIG. 50 shows the first exposure value modifying mode. Note that the Tv and Av in FIG. 50 are APEX values.

It is assumed in FIG. 50 that the optimum Tv and Av values which are set by turning the IF switch SWCL ON are 8 (⅛) and 5 (⅞), respectively. The unit step of variation of the exposure value (step accuracy of the exposure value) in the program diagram is ⅛ Ev. A picture can be taken at the shutter speed and diaphragm value corresponding to the Tv and Av values, wherein the set optimum values are the control values. The shutter speed "1/250 sec." corresponding to Tv=8 and the diaphragm value "F8.0" corresponding to Av=6 are indicated in the LCD panel 152 in FIG. 48. The indicated values are series values having an antilogarithm portion of 0/2 or ½ Ev, obtained by rounding the optimum values to a ½ Ev step accuracy.

Thereafter, when the Av electronic dial 115 is rotated through two clicks so as to decrease the Av value by 1 Av, the indicated Av value is 5 Av. However, the Av value is not identical to the optimum value minus 1 Av, but is set to be identical to the indicated value, i.e., 5 Av. Namely, the diaphragm value is F 5.6 (FIG. 49), so that the control value is also F 5.6. The control value of the Tv value is set to be the series value of 1/250, though the Tv electronic dial 114 is not actuated. Thus, in the first exposure value modifying mode, the Tv value is modified by the operation of the electronic dial 114 and the Av value is modified by the operation of the electronic dial 115, and the control values of the Tv value and the Av value are rounded and set with the ½ step accuracy as the series values.

When the IF switch SWCL is turned OFF, the optimum $Tv(T_{VD})$ and $Av(A_{VD})$ values having ⅛ step accuracy which are calculated by the AE calculation are maintained. When the Tv electronic dial 114 and/or the Av electronic dial 115 is rotated, the Tv value and/or the Av value is rounded and is then changed to have a ½ step accuracy as the series value in accordance with the direction of rotation and the numbers of step of the Tv electronic dial 114 and/or the Av electronic dial 115, respectively (see FIG. 50).

FIG. 51 shows the second exposure value modifying mode, in which the optimum Tv and Av values set by turning the IF switch SWCL ON are 8 (⅛) and 5 (⅞), respectively, similar to FIG. 50. When the Av electronic dial 115 is rotated by two clicks after the IF switch SWCL is turned ON and OFF, the indicated Av value is F5, and the control value of the Av value is decreased by 1 Av to be 4 (⅞). No change of the Tv value occurs, since the Av electronic dial 115 is actuated. Namely, in the second exposure value modifying mode, when the IF button SWCL is turned ON and OFF, the Tv value and the Av value are modified to values having a ⅛ step accuracy. When the Tv or Av electronic dial 114 or 115 is actuated, the Tv value and the Av value are modified in ½ Ev steps (intervals), so that the control value becomes a value which is varied from the optimum value by a multiple of ½ Ev. Namely, if the antilogarithm portion of the optimum value is for example ⅛, the control value becomes a value on the arithmetic progression having a difference of ½ and consisting of a mixed number having an antilogarithm portion of ⅛ or ⅝.

FIGS. 52 through 55 show flow charts of a control routine of the setting and modification of the shutter speed and diaphragm value. This sub-routine is intermittently performed by the CPU 131.

The control values $T_{VD}$ and $A_{VD}$, which will be discussed hereinafter, are utilized for the actual exposure control, while the indicated values $T_{VT}$ and $A_{VT}$, which will be discussed hereinafter, are utilized for indication.

When the IF switch SWCL is turned ON, control proceeds to step S602 from step S601 to clear the switch flag $f_{IF}$ (fIF) (i.e. set the switch flag at "0"). After the operation of step S611 is performed, the control proceeds to step S612 in which an optimum shutter speed (Tv value) and diaphragm value (Av value) are set as the control values $T_{VD}$ (TVD) and $A_{VD}$ (AVD). The Tv value (TVD) and Av value (AVD) are renewed every time the object brightness changes. The Av value and Tv value are calculated in ⅛ step accuracy and renewed in accordance with the object brightness at the shutter speed priority mode and the diaphragm priority mode, respectively. Thereafter, at step it is determined if switch flag fIF is "0". If the switch flag fIF is "0", the control proceeds to steps S651 through S662, which will be discussed hereinafter. When the operation of steps S651 through S662 is finished, the sub-routine ends.

If the control enters the sub-routine immediately after the IF switch SWCL is released, the control proceeds to step S603 from S601 to check whether the IF switch SWCL was depressed in the previous operation of the sub-routine. If the IF switch SWCL was depressed, the control proceeds to step S604 to set the switch flag fIF to "1". Thereafter, the Av flag fAV and Tv flag fTV are set to "1", at step S605, and the Tv value (TVD) and Av value(AVD) which were set in step S612 in the previous operation are stored in the RAM of the CPU 131 as the stored data TVDML and AVDML, respectively.

At step S611, if the present IF switch is turned OFF, the control proceeds to step S613 to perform the operation of the sub-routine AVTD. In the sub-routine AVTD, the indicating Av value (indicated value $A_{VD}$, i.e., the series value which can be modified by the operation of the Av electronic dial 115) stored in the RAN of the DPU 132 is read and renewed as the control value AVD by the operation of the sub-routine AVDT (step S661), which will be discussed hereinafter. Similarly, the sub-routine TVTD is performed at step S614. In the sub-routine TVTD, the indicating Tv value (indicated value TVD, i.e., the series value which can be modified by the operation of the Tv electronic dial 114) stored in the RAM of the DPU 132 is read and renewed as the control value TVD by the operation of the sub-routine TVDT (step S662) which will be discussed hereinafter. At step 613 and 614, the control value TVD and $A_{VD}$ are stored at predetermined addresses of the RAM of the CPU 131. When the IF switch SWCL is OFF, the control proceeds from step S611-2 to step 613 if in the first exposure value modifying mode or to step 615 if not in the first exposure value modifying mode.

In another embodiment (not shown), after step S611-2, if neither the Av electronic dial 115 nor the Tv electronic dial 114 is rotated, then the sub-routines AVTD) and TVTD are skipped and the AVD and TVD values are not rounded, but are stored in the RAM of the CPU 131 as the control values (see FIG. 50).

If the IF switch SECL continues to be OFF, the operations of steps are performed in the order S601, S603, S611, S613 and S614. Consequently, the indicated values AVT and TVT, set in the sub-routine AVDT (step S661) and the sub-routine TVDT (step S662), are set as the control values AVD and TVD of the Av value and Tv value, respectively, immediately after the operation of steps S613 and S614 are carried out.

Since the switch flag fIF is set to "1" immediately after the IF switch SWCL is opened (OFF), or while the IF switch SWCL continues to be OFF, the control proceeds to step S616 from step S615 to check whether the first exposure value modifying mode is selected. If the first exposure value modifying mode is selected (FIG. 50), the operations of step S621 and steps subsequent thereto are performed.

At step S621, (FIG. 53) whether TV flag fTV is "1" is checked. The TV flag fTV is set at "1" to step S605 immediately after the IF switch SWCL is opened. Accordingly, control proceeds to step S622, where it is checked whether the Tv electronic dial 114 has been rotated. If the Tv electronic dial 114 has been rotated, the operation of step S624 is performed to set the stored data TVDML stored in the RAM of the CPU 131 to be the control value TVD of the Tv value. Namely, the control value TVD is identical to the control value (optimum value) obtained in accordance with the program diagram at step S612.

Conversely, if the Tv electronic dial 114 is rotated, i.e., if the Tv value is modified, the Tv flag fTV and the Av flag fAV are cleared at step S623. In this case, the control value TVD of the Tv value is identical to the value set in step S614, i.e., the value (series value) set by the Tv electronic dial 114. The reason that the Av flag fAV is cleared at step S623 is to convert the Av value to the series value, corresponding to the conversion of the Tv value to the series value.

When this routine is performed after the Tv dial 114 is rotated, since the Tv flag fTV is already "0" at step S621, the control skips steps S622, S623 and S624, and goes to step S625. Namely, the control value TVD of the Tv value is identical to the series value obtained in step S614.

Steps S625 through S628 relate to the process of Av value and are basically the same as the operations of step S621 through S624. Namely, at step S625, it is checked whether Av flag fAV is "1". Since the Av flag fAV is "1" immediately after the IF switch is turned OFF, the control proceeds to step S626 to check whether the Av electronic dial 115 has been rotated. If the Av electronic dial 115 has not been rotated, the control proceeds to step S628 to set the stored value AVDML stored in the RAM of the CPU 131 at step S605 as the control value AVD of the Av value. Namely, the control value AVD is identical to the control value (optimum value) obtained in accordance with the program diagram at step S612.

Conversely, if the Av electronic dial 115 is rotated, since the Av value is modified, the Av flag fAV and the Tv flag fTV are cleared (i.e., set at "0") at step S627. In this case, the control value AVD of the Av value is identical to the value set at step S613, i.e., the value (series value) set by the Av electronic dial 115. The reason why the Tv flag fTV is cleared at step S627 is to convert the Tv value to the series value corresponding to the conversion of the Av value to the series value.

When this routine is performed after the Av dial 115 is rotated, since the Av flag fAV is already "0", the control skips steps S626, S627, S628 and goes to step S629. Namely, the control value AVD of the Av value is identical to the series value obtained in step S613.

Thereafter, the operations of steps S651 through S662 are carried out to end the sub-routine.

If the second exposure value modifying mode (FIG. 51) is selected at step S616, the operations of step S631 and steps subsequent thereto are effected.

At step S633, ΔT. obtained at step S632 is added to the control value TVD of the Tv value set at step S614, so that the new control value TVD (=TVD+ΔTv) is set. The control value TVD set at step S614 is a series value identical to the indicated value. Namely, the control value TVD obtained at step S633 is obtained by adding or subtracting the variance (=ΔTv having a ½ step accuracy) of the Tv value, which is increased or decreased by actuating the Tv electronic dial 114, to or from the optimum value set by the operation of the IF switch SWCL, respectively. Namely, the control value TVD is the optimum value (FIG. 51).

After the operation at step 633, though this process is not shown in the figure, the control values $T_{VD}$ and/or $A_{VD}$ are increased or decreased with ½ step accuracy in accordance with the direction of rotation and the numbers of step of the Tv electronic dial 114 and/or the Av electronic dial 115, respectively (see FIG. 51).

At step S634, whether the control value TVD obtained at step S633 is smaller than the maximum value TVDMAX of the Tv value. If the control value TVD is above the maximum value TVDMAX, the maximum value TVDMAX is set as the control value TVD at step S635. If the control value TVD is below the maximum value TVDMAX, it is checked whether the control value TVD is smaller than the minimum value TVDMIN of the Tv value at step S636. If the control value TVD is below the minimum value TVDMIN, the minimum value TVDMIN is set as the control value TVD. Thus, the control value TVD is set between the predetermined maximum and minimum values and is stored in the RAM of the CPU 131 at step S638.

The control value AVD obtained at step S643 is obtained by adding or subtracting the variance (=Δ Av having ½ step accuracy) of the Av value, which is increased or decreased by actuating the Av electronic dial 115, to or from the optimum value set by the operation of the IF switch SWCL, respectively.

Steps S643 through S648 involve the determination of the control value of the Av value and are basically the same as the operations of steps S633 through S638.

At step S643, Δ Av is added to the control value AVD of the Av value set at step S613, so that the new control value AVD (=AVD+Δ Av) is set.

If the control value AVD is above the maximum value AVDMAX, the control proceeds to step S645 from step S644, and the maximum value AVDMAX is set as the control value AVD.

If the control value AVD is below the minimum value AVDMIN, the control proceeds to step S647 from step S646, and the minimum value AVDMIN is set as the control value AVD. Thus, the control value AVD is set between the predetermined maximum and minimum values and is stored in the RAM of the CPU 131 at step S648.

Note that the maximum value AVDMAX and the minimum value AVDMIN are inherent values of the taking lens and are input from the taking lens to the camera body through the data communication between the camera body and the taking lens.

At step S651, whether or not the control value AVD of the diaphragm value is identical to the minimum value AVDMIN is checked. If the control value AVD is identical to the minimum value AVDMIN, the EE pulse for the control of the diaphragm is set at a value corresponding to the open diaphragm at step S652. If the control value AVD is not identical to the minimum value AVDMIN, the EE pulse is set at a value corresponding to a predetermined diaphragm at step S653.

The operations of the sub-routines AVDT and TVDT are performed at steps S661 and S662. In the sub-routine AVDT, the calculated value of the Av value, i.e., the control value AVD set at step S648 is converted to the indicated value for the LCD panel 152. Namely, the value having a ⅛ Ev step accuracy is rounded to a value having a ½ Ev step accuracy. In the sub-routine TVDT, the calculated value of the Tv value, i.e., the control value TVD is converted to the indicated value for the LCD panel 152. Namely, the value of ⅛ Ev step accuracy is rounded to the value having a ½ Ev step accuracy, similarly to the sub-routine AVDT. The indicated values of the Av and Tv values thus obtained are sent to the DPU 132 and stored in the RAM thereof.

As can be seen from the above discussion, according to the present invention, at least one of the shutter speed or the diaphragm value is obtained by the program diagram and can be modified by the Tv or Av electronic dial 114 or 115 in a relatively large step (course scale). Furthermore, in the second exposure value modifying mode, since the exposure value can be modified within a relatively large step, with reference to the optimum value having a high step accuracy of ⅛ Ev (fine scale) by the program diagram before the modification by the electronic dial, the exposure value can be precisely shifted to the optimum value, for example, upon stepped-exposure.

On the other hand, in the first exposure value modifying mode, since the actual control value is identical to the indicated value, the photographer can take a picture at a desired exposure value. Consequently, the set exposure value can be easily and freely readjusted by the photographer. Furthermore, a quick modification of the exposure value to a desired value can be effected, thus resulting in an increase in efficiency of operation.

We claim:

1. An exposure control apparatus of a camera, comprising:

photometering means for metering a brightness of an object to be photographed;

means for manually setting a shutter speed;

means for manually setting an aperture value;

mode changing means for selecting an exposure mode from among a plurality of exposure modes, including a manual exposure mode in which a shutter speed and an aperture value are manually set by said manually setting shutter speed means and by said manually setting aperture value means, and an automatic exposure mode in which at least one of said shutter speed and said aperture value is automatically set in accordance with an other of said at least one of said shutter speed and said aperture value, and said object brightness;

exposure factor determining means for automatically determining at least one of said shutter speed and said diaphragm value, said exposure factor determining means being actuated when a presently selected mode is said automatic exposure mode; and a manually actuable switch for replacing said manually set shutter speed and manually set aperture value with at least one automatically set shutter speed and aperture value when said manually actuable switch is actuated while the presently selected mode is said manual exposure mode.

2. The exposure control apparatus of claim 1, wherein said shutter speed and said aperture value determined by said exposure factor determining means in said automatic exposure mode are automatically set as values for adjustment by said manually setting shutter speed means and said manually setting aperture value means on shifting to said manual exposure mode.

3. The exposure control apparatus of claim 2, wherein said camera comprises:

a camera body; and a photographing lens detachably attachable to said camera body, wherein said photometering means, said exposure factor determining means, and said manually actuable switch are provided in said camera body.

4. The exposure control apparatus of claim 3, wherein said manually setting shutter speed means and said manually setting aperture value means are provided in said camera body.

5. The exposure control apparatus of claim 3, wherein said manually setting shutter speed means is provided in said camera body, and said manually setting aperture value means is provided in said photographing lens.

6. The exposure control apparatus of claim 5, wherein said manually setting aperture value means provided in said photographing lens comprises a diaphragm ring movable between an auto-diaphragm position in which said aperture value is set on said camera body, and a manual diaphragm position in which said aperture value is set on said photographing lens.

7. The exposure control apparatus of claim 2, wherein said shutter speed and said aperture value are manually varied in accordance with said manually setting shutter speed means and said manually setting diaphragm value means, respectively, when said mode manually actuable switch is disabled while the presently selected mode is said manual exposure mode.

8. The exposure control apparatus of claim 2, wherein said manually actuable switch is actuated by depressing and holding a button.

9. The exposure control apparatus of claim 2, wherein said shutter speed and said diaphragm value are varied in accordance with said manually setting shutter speed means and said manually setting aperture value means, respectively, upon a release of said mode modifying switch.

10. The exposure control apparatus of claim 1, wherein said automatic exposure mode comprises:
a program exposure mode in which said exposure factor determining means determines said shutter speed and said aperture value in accordance with said object brightness;
a diaphragm value priority mode in which said exposure factor determining means determines said shutter speed in accordance with said object brightness detected by said photometering means and said aperture value set by said manually setting aperture value means; and
a shutter speed priority mode in which said exposure factor determining means determines said aperture value in accordance with said object brightness detected by said photometering means and said shutter speed set by said manually setting shutter speed means.

11. The exposure control apparatus of claim 10, wherein said manual exposure mode is shifted to one of said program exposure mode, said diaphragm value priority mode and said shutter speed priority mode when said manually actuable switch is actuated while the presently selected mode is said manual exposure mode.

12. The exposure control apparatus of claim 11, further comprising an indicator for indicating said exposure mode selected by said mode changing means, said selected exposure mode, said shutter speed and said aperture value.

13. The exposure control apparatus of claim 12, wherein exposure factors, including said shutter speed and said aperture value, are varied between values having one of a first APEX value accuracy and a second APEX value accuracy.

14. The exposure control apparatus of claim 13, wherein said second APEX value accuracy is higher than said first APEX value accuracy.

15. The exposure control apparatus of claim 14, wherein said exposure factors are varied by said manually setting shutter speed means and said manually setting aperture value means between values having said first APEX value accuracy.

16. The exposure control apparatus of claim 15, wherein said exposure factor determining means includes means for calculating an optimum value for at least one of said exposure factors in accordance with said object brightness detected by said photometering means, said optimum value being rounded to a value having one of said first APEX value accuracy or said second APEX value accuracy.

17. The exposure control apparatus of claim 16, wherein an optimum shutter speed and an optimum aperture value are set with said first APEX value accuracy when said manually actuable switch is actuated while the presently selected mode is said manual exposure mode.

18. The exposure control apparatus of claim 16, wherein an optimum shutter speed and an optimum aperture value are set with said second APEX value accuracy when said manually actuable switch is actuated while the presently selected mode is said manual exposure mode.

19. The exposure control apparatus of claim 16, wherein an optimum shutter speed is set with said first APEX value accuracy when said manually actuable switch is actuated and said another exposure mode is said diaphragm value priority mode.

20. The exposure control apparatus of claim 16, wherein an optimum shutter speed is set with said second APEX value accuracy when said manually actuable switch is actuated and said another exposure mode is said diaphragm value priority mode.

21. The exposure control apparatus of claim 16, wherein an optimum diaphragm value is set with said first APEX value accuracy when said manually actuable switch is actuated and said another exposure mode is said shutter speed priority mode.

22. The exposure control apparatus of claim 16, wherein an optimum diaphragm value is set with said second APEX value accuracy when said manually actuable switch is actuated and said another exposure mode is said shutter speed priority mode.

23. The exposure control apparatus of claim 16, wherein said exposure factors determined by said exposure factor determining means at one of said first APEX value accuracy or said second APEX value accuracy are retained when said manually actuable switch is disabled when said manually actuable switch is in said manual exposure mode.

24. The exposure control apparatus of claim 23, further comprising an indicator that indicates said exposure factors set at said first APEX value accuracy.

25. The exposure control apparatus of claim 2, further comprising limit value setting means, positioned on a camera body of said camera, for varying and setting at least one of an upper limit value and a lower limit value of at least one of said shutter speed and said aperture value.

26. The exposure control apparatus of claim 25, wherein said limit value setting means comprises a plurality of instructions executed by a microprocessor on said camera body.

27. The exposure control apparatus of claim 25, wherein said limit value setting means comprises means for enabling each of said limit values to be set by a single operating member on said camera body.

28. The exposure control apparatus of claim 2, wherein said manual setting means comprises means for setting said aperture value and said shutter speed independently of a luminance of an object to be photographed with said camera.

29. The exposure control apparatus of claim 2, further comprising:

means for locking an exposure value determined in accordance with said aperture value and shutter speed value set in said manual setting mode; and means for varying one of said aperture value and said shutter speed based on said locked exposure value, when the other of said aperture value and shutter speed is varied by said manual setting means so as to maintain constant said locked exposure value.

30. The exposure control apparatus of claim 2, further comprising a bulb exposure mode.

31. The exposure control apparatus of claim 2, wherein said manual setting means comprises:

means for manually setting a shutter speed while in said automatic mode; and means for manually setting an aperture value while in said automatic mode, and wherein said exposure factor determining means comprises:

means for automatically determining said shutter speed and said aperture value in accordance with said object brightness metered by said photometering means in said automatic exposure mode, wherein said automatic determining means determines said shutter speed in accordance with a manually set aperture value set by said manually setting aperture value means and said object brightness metered by said photometering means when said aperture value is manually set while in said automatic mode, and wherein said exposure factor determining means determines said aperture value in accordance with a manually set shutter speed set by said manually setting shutter speed means and said object brightness metered by said photometering means when said shutter speed is manually set while in said automatic mode; and means for returning to said automatic mode in which said shutter speed and aperture value are automatically determined, from a state in which at least one of said shutter speed and said aperture value is set by said manual setting means when said mode modifying switch is operated while in said automatic mode.

32. The exposure control apparatus of claim 31, wherein said camera comprises:

a camera body; and a photographing lens that is detachably attachable to said camera body, wherein said photometering means, said automatic determining means and said mode modifying switch are provided in said camera body.

33. The exposure control apparatus of claim 32, wherein said manually setting shutter speed means and said manually setting aperture value means are provided in said camera body.

34. The exposure control apparatus of claim 32, wherein said manually setting shutter speed means is provided in said camera body, and said manually setting aperture value means is provided in said photographing lens.

35. The exposure control apparatus of claim 33, further comprising additional means for manually setting said aperture value provided in said photographing lens.

36. The exposure control apparatus of claim 35, wherein said additional manually setting aperture value means in said photographing lens comprises a diaphragm ring movable between an auto-diaphragm position, in which said aperture value is set on said camera body, and a manual diaphragm position, in which said aperture value is set on said photographing lens.

37. The exposure control apparatus of claim 36, wherein said exposure factor determining means determines both said aperture value and said shutter speed in accordance with said object brightness when said diaphragm ring is moved to said auto-diaphragm position.

38. The exposure control apparatus of claim 36, wherein said exposure factor determining means determines said shutter speed in accordance with said object brightness metered by said photometering means and said manually set aperture value when said aperture value is set by said manually setting aperture value means of said camera body while in said automatic mode.

39. The exposure control apparatus of claim 37, wherein said exposure factor determining means determines said shutter speed in accordance with said object brightness metered by said photometering means and said manually set aperture value when said aperture value is set by said additional manually setting aperture value means in said photographing lens while in said automatic mode.

40. The exposure control apparatus of claim 2, wherein said mode modifying switch is operable without moving said camera from a photographing position.

41. The exposure control apparatus of claim 1, wherein said when said manually actuable switch is de-actuated, said at least one automatically set shutter speed and aperture value is replaced with at least one of said manually set shutter speed and aperture value.

42. An exposure control apparatus of a camera, comprising:

photometering means for metering a brightness of an object to be photographed;

manual exposure factor setting means for manually setting exposure factors, including a shutter speed and an aperture value, said shutter speed and said aperture value being set with a first APEX value accuracy;

automatic exposure factor setting means for automatically setting exposure factors with a second APEX value accuracy in accordance with said object brightness detected by said photometering means, said second APEX value accuracy being higher than said first APEX value accuracy;

exposure control means for controlling an exposure operation in accordance with said set exposure factors;

exposure factor modifying means for modifying at least one of said shutter speed and said aperture value of said manually set exposure factors to values having said second APEX value accuracy in accordance with said object brightness; and an exposure factor modifying switch for replacing said manually set exposure factors with automatically set exposure factors when a manual exposure mode is selected and said exposure factor modifying switch is actuated.

43. The exposure control apparatus of claim 42, further comprising means for selecting an exposure mode from among a first mode in which only said shutter speed is automatically set, a second mode in which only said aperture value is automatically set, and a third mode in which both said shutter speed and said aperture value are automatically set.

44. The exposure control apparatus of claim 42, wherein said exposure factor modifying means operates only when said exposure factor modifying switch is actuated.

45. The exposure control apparatus of claim 44, wherein said exposure factor modifying means rounds said automatically set exposure factors to a value with said first APEX value accuracy when said exposure factor modifying switch is deactuated.

46. The exposure control apparatus of claim 44, wherein said exposure factor modifying means retains said automatically set exposure factors, set with said second APEX value accuracy, when said exposure factor modifying switch is deactuated after having been actuated.

47. The exposure control apparatus of claim 46, wherein said automatically set exposure factors, set with said second APEX value accuracy, are retained regardless of a change in object brightness detected by said photometering means, until said manual setting means is operated.

48. The exposure control apparatus of claim 47, wherein said exposure factors are varied with said first APEX value accuracy when said manual setting means is operated after said exposure factor modifying switch is disabled after having been enabled.

49. The exposure control apparatus of claim 44, further comprising exposure factor modifying mode selecting means for selecting one of a first APEX value exposure factor modifying mode in which automatically modified exposure factors set with said second APEX value accuracy are rounded to values with said first APEX value accuracy when said exposure factor modifying switch is disabled after having been enabled, and a second exposure factor modifying mode in which automatically modified exposure factors set with said second APEX value accuracy are retained when said exposure factor modifying switch is disabled after having been enabled.

50. The exposure control apparatus of claim 42, wherein said first APEX value accuracy, settable by said manual exposure factor setting means, comprises an APEX value of ½, and said second APEX value accuracy, settable by said automatic exposure factor setting means, comprises an APEX value of ⅛.

51. The exposure control apparatus of claim 50, wherein said manually set APEX value comprises a manual series value consisting of mixed numbers having an antilogarithm portion of ⁰⁄₂ and ½.

52. The exposure control apparatus of claim 50, wherein said automatically set APEX value comprises an automatic series value consisting of mixed numbers having an antilogarithm portion of ⁰⁄₈.

53. The exposure control apparatus of claim 50, wherein said camera comprises:

a camera body; and a photographing lens selectively attachable to said camera body, wherein said manual setting means is provided in said camera body.

54. The exposure control apparatus of claim 50, wherein said camera comprises an indicator that indicates at least one of said exposure factors set with said first APEX value accuracy.

55. The exposure control apparatus of claim 50, wherein said indicator rounds said exposure factors to values having said first APEX value accuracy and indicates said exposure factors with said first APEX value accuracy when said exposure factors are set with said second APEX value accuracy.

56. The exposure control apparatus of claim 42, wherein said exposure factor modifying switch is operable without moving said camera from a photographing position.

57. An exposure control apparatus of a camera, comprising:

means for manually setting a shutter speed;

means for manually setting an aperture value;

means for selecting a desired exposure mode from among a plurality of automatic exposure modes and a manual exposure mode, said selected automatic exposure mode determining optimum exposure factors based upon at least one of said shutter speed and said aperture value in accordance with an object brightness of an object to be photographed, while said selected manual exposure mode sets said shutter speed and said aperture value in accordance with said manually setting shutter speed means and said manually setting aperture value means;

means for modifying said desired exposure mode selected by said selecting means; and means for replacing exposure factors based upon said manually set shutter speed and said manually set aperture value with said optimum exposure factors when said desired exposure mode is switched from said selected automatic exposure mode to said manual exposure mode and said modifying means is actuated.

58. The exposure control apparatus of claim 57, wherein when said automatic exposure mode is selected by said selecting means, said operation of said manually setting shutter speed means causes a change in an automatic determination of said aperture value.

59. The exposure control apparatus of claim 57, wherein when said automatic exposure mode is selected by said selecting means, said operation of said manually setting aperture value means causes a change in an automatic determination of said shutter speed.

60. The exposure control apparatus of claim 57, wherein said plurality of automatic exposure modes includes a mode wherein upper and lower limits of said shutter speed and upper and lower limits of said aperture value are modifiable by a user of said camera.

61. The exposure control apparatus of claim 57, wherein said manual modifying means is operable without moving said camera from a photographing position.

62. An exposure controlling apparatus, comprising:

means for manually setting a shutter speed with a first APEX value accuracy;

means for manually setting an aperture value with a second APEX value accuracy, a manual exposure factor being defined in accordance with said manually set shutter speed and said manually set aperture value;

means for setting a shutter speed and a diaphragm value that define an automatic exposure factor with a predetermined APEX value accuracy based upon a brightness of an object to be photographed;

means for modifying said automatically set exposure factor based upon at least one of said manually set shutter speed and said manually set aperture value; and means for switching a manual exposure factor with said automatic exposure factor to effect an exposure operation of said object in which said shutter speed and aperture value are set in accordance with said object brightness when a nonprogrammed exposure mode is selected and said switching means is actuated.

63. The exposure controlling apparatus of claim 62, wherein said first APEX value accuracy is less than said second APEX value accuracy.

64. The exposure controlling apparatus of claim 63, further comprising means for modifying at least one of said manually set shutter speed or said manually set aperture value to have said second APEX value accuracy.

65. The exposure controlling apparatus of claim 62, further comprising means for selecting an exposure mode from among a first mode in which said shutter speed is automatically set, a second mode in which said aperture value is automatically set, and a third mode in which both said shutter speed and said aperture value are automatically set.

66. The exposure control apparatus of claim 2, further comprising:
   means for calculating an optimum exposure value in accordance with said detected object brightness;
   a specific program exposure mode, in which said shutter speed and said aperture value are automatically set in accordance with said optimum exposure value; and
   means for enabling said manual setting means to manually set one of said shutter speed and said aperture value only when said manual setting means is actuated in said specific program exposure mode, said specific program exposure mode being automatically set from among a plurality of exposure modes upon the occurrence of a predetermined event.

67. The exposure control apparatus of claim 66, further comprising a main switch for controlling a power supply to various elements of said camera, said predetermined event comprising turning OFF said main switch.

68. The exposure control apparatus of claim 66, further comprising means for selectively attaching a lens to said camera, wherein said predetermined event comprises an attachment of a lens to said camera.

69. The exposure control apparatus of claim 62, wherein said modifying means is operable without moving said camera from a photographing position.

70. An exposure control apparatus of a camera, comprising:
   photometering means for metering a brightness of an object to be photographed;
   means for manually setting a shutter speed;
   means for manually setting an aperture value;
   mode changing means for selecting an exposure mode from among a plurality of exposure modes, including a manual exposure mode in which a shutter speed and an aperture value are manually set by said manually setting shutter speed means and by said manually setting aperture value means, and an automatic exposure mode in which at least one of said shutter speed and said aperture value is automatically set in accordance with an other of said at least one of said shutter speed and said aperture value, and said object brightness;
   exposure factor determining means for determining an optimum exposure value in response to said metered object brightness, said exposure factor determining means being actuated when a presently selected mode is said automatic exposure mode; and
   a manually actuable switch for replacing an exposure factor related to said manually set shutter speed and manually set aperture value with said optimum exposure factor when said manually actuable switch is actuated while the presently selected mode is said manual exposure mode.

71. The exposure control apparatus of claim 70, wherein said when said manually actuable switch is de-actuated, said at least one automatically set shutter speed and aperture value is replaced with at least one of said manually set shutter speed and aperture value.

* * * * *